US011165963B2

(12) United States Patent
Dellinger et al.

(10) Patent No.: US 11,165,963 B2
(45) Date of Patent: Nov. 2, 2021

(54) DEVICE, METHOD, AND GRAPHICAL USER INTERFACE FOR ACCESSING AN APPLICATION IN A LOCKED DEVICE

(75) Inventors: Richard R. Dellinger, San Jose, CA (US); Nikhil Bhogal, San Francisco, CA (US)

(73) Assignee: Apple Inc., Cupertino, CA (US)

(*) Notice: Subject to any disclaimer, the term of this patent is extended or adjusted under 35 U.S.C. 154(b) by 1394 days.

(21) Appl. No.: 13/243,045

(22) Filed: Sep. 23, 2011

(65) Prior Publication Data
US 2012/0311499 A1 Dec. 6, 2012

Related U.S. Application Data

(60) Provisional application No. 61/493,506, filed on Jun. 5, 2011.

(51) Int. Cl.
*G06F 3/048* (2013.01)
*H04N 5/232* (2006.01)

(52) U.S. Cl.
CPC ... *H04N 5/232935* (2018.08); *H04N 5/23216* (2013.01); *H04N 5/23225* (2013.01)

(58) Field of Classification Search
None
See application file for complete search history.

(56) References Cited

U.S. PATENT DOCUMENTS

| 5,465,084 A | 11/1995 | Cottrell |
| 5,559,961 A | 9/1996 | Blonder |
| 5,677,710 A | 10/1997 | Thompson-Rohrlich |
| 5,821,933 A | 10/1998 | Keller et al. |
| 5,907,327 A | 5/1999 | Ogura et al. |
| 6,151,208 A | 11/2000 | Bartlett |

(Continued)

FOREIGN PATENT DOCUMENTS

| AU | 2006330724 A1 | 7/2007 |
| CN | 101371258 A | 2/2009 |

(Continued)

OTHER PUBLICATIONS

Notice of Allowance received for U.S. Appl. No. 13/243,326, dated Sep. 23, 2013, 11 pages.

(Continued)

*Primary Examiner* — Thanh T Vu
(74) *Attorney, Agent, or Firm* — Dentons US LLP

(57) ABSTRACT

While an electronic device with a display and a touch-sensitive surface is in a locked, passcode-protected state, the device displays a lock screen user interface on the display. The lock screen user interface includes a plurality of restricted application launch icons, each restricted application launch icon corresponding to an application. The device also detects user input to activate a respective restricted application launch icon; and, in response to detecting the user input to activate the respective restricted application launch icon, starts a restricted session for a respective application that corresponds to the respective restricted application launch icon, wherein the respective application is configured to generate one or more content items while in the restricted session, and maintains the device in the locked, passcode-protected state for applications in the device other than the respective application.

42 Claims, 29 Drawing Sheets

(56) References Cited

U.S. PATENT DOCUMENTS

| | | |
|---|---|---|
| 6,160,555 A | 12/2000 | Kang et al. |
| 6,192,478 B1 | 2/2001 | Elledge |
| 6,249,606 B1 | 6/2001 | Kiraly et al. |
| 6,323,846 B1 | 11/2001 | Westerman et al. |
| 6,347,290 B1 | 2/2002 | Bartlett |
| 6,421,453 B1 | 7/2002 | Kanevsky et al. |
| 6,424,711 B1 | 7/2002 | Bayless et al. |
| 6,442,251 B1 | 8/2002 | Maes et al. |
| 6,570,557 B1 | 5/2003 | Westerman et al. |
| 6,573,883 B1 | 6/2003 | Bartlett |
| 6,633,310 B1 | 10/2003 | Andrew et al. |
| 6,677,932 B1 | 1/2004 | Westerman |
| 6,720,860 B1 | 4/2004 | Narayanaswami |
| 6,735,695 B1 | 5/2004 | Gopalakrishnan et al. |
| 7,124,433 B2 | 10/2006 | Little |
| 7,151,843 B2 | 12/2006 | Rui et al. |
| 7,174,462 B2 | 2/2007 | Pering et al. |
| 7,236,576 B2 | 6/2007 | Schnarel et al. |
| 7,263,670 B2 | 8/2007 | Rekimoto |
| 7,286,063 B2 | 10/2007 | Gauthey et al. |
| 7,289,063 B2 | 10/2007 | Zaghloul |
| 7,392,330 B2 | 6/2008 | Weatherspoon |
| 7,395,506 B2 | 7/2008 | Tan et al. |
| 7,414,613 B2 | 8/2008 | Simelius |
| 7,480,870 B2 | 1/2009 | Anzures et al. |
| 7,627,904 B2 | 12/2009 | Tokkonen |
| 7,657,849 B2 | 2/2010 | Chaudhri et al. |
| 7,810,105 B2 | 10/2010 | Prabandham et al. |
| 8,006,299 B2 | 8/2011 | Suominen |
| 8,046,721 B2 | 10/2011 | Chaudhri et al. |
| 8,095,879 B2 | 1/2012 | Goertz |
| 8,209,637 B2 | 6/2012 | Chaudhri et al. |
| 8,286,103 B2 | 10/2012 | Chaudhri et al. |
| 8,341,557 B2 | 12/2012 | Pisula et al. |
| 8,352,745 B2 | 1/2013 | Mckeeth |
| 8,355,698 B2 | 1/2013 | Teng et al. |
| 8,527,903 B2 | 9/2013 | Chaudhri et al. |
| 8,581,877 B2 | 11/2013 | Yoo |
| 8,627,237 B2 | 1/2014 | Chaudhri et al. |
| 8,638,385 B2 | 1/2014 | Bhogal et al. |
| 8,640,057 B2 | 1/2014 | Chaudhri et al. |
| 8,676,273 B1 | 3/2014 | Fujisaki |
| 8,694,923 B2 | 4/2014 | Chaudhri et al. |
| 8,745,544 B2 | 6/2014 | Forstall et al. |
| 8,811,948 B2 | 8/2014 | Bandyopadhyay et al. |
| 9,083,814 B2 | 7/2015 | Lee et al. |
| 9,213,822 B2 | 12/2015 | Dellinger et al. |
| 9,372,978 B2 | 6/2016 | Forstall et al. |
| 10,007,802 B2 | 6/2018 | Dellinger et al. |
| 2001/0011308 A1 | 8/2001 | Clark et al. |
| 2001/0012022 A1 | 8/2001 | Smith |
| 2002/0008691 A1 | 1/2002 | Hanajima et al. |
| 2002/0015024 A1 | 2/2002 | Westerman et al. |
| 2002/0191029 A1 | 12/2002 | Gillespie et al. |
| 2002/0196274 A1 | 12/2002 | Comfort et al. |
| 2003/0142138 A1 | 7/2003 | Brown et al. |
| 2003/0206202 A1 | 11/2003 | Moriya |
| 2003/0222913 A1 | 12/2003 | Mattila et al. |
| 2004/0030934 A1 | 2/2004 | Mizoguchi et al. |
| 2004/0034801 A1 | 2/2004 | Jaeger |
| 2004/0085351 A1 | 5/2004 | Tokkonen |
| 2004/0088564 A1 | 5/2004 | Norman |
| 2004/0088568 A1 | 5/2004 | Tokkonen |
| 2004/0101297 A1 | 5/2004 | Nonaka |
| 2004/0113819 A1 | 6/2004 | Gauthey et al. |
| 2004/0230843 A1 | 11/2004 | Jansen |
| 2004/0239648 A1 | 12/2004 | Abdallah et al. |
| 2004/0250138 A1 | 12/2004 | Schneider |
| 2004/0260955 A1 | 12/2004 | Mantyla |
| 2004/0268267 A1 | 12/2004 | Moravcsik |
| 2005/0050477 A1 | 3/2005 | Robertson et al. |
| 2005/0060554 A1 | 3/2005 | O'Donoghue |
| 2005/0079896 A1 | 4/2005 | Kokko et al. |
| 2005/0212760 A1 | 9/2005 | Marvit et al. |
| 2005/0216862 A1 | 9/2005 | Shinohara et al. |
| 2005/0216867 A1 | 9/2005 | Marvit et al. |
| 2005/0248542 A1 | 11/2005 | Sawanobori |
| 2005/0253817 A1 | 11/2005 | Rytivaara et al. |
| 2005/0264833 A1 | 12/2005 | Hiraoka et al. |
| 2005/0289476 A1 | 12/2005 | Tokkonen |
| 2006/0031776 A1 | 2/2006 | Glein et al. |
| 2006/0136087 A1 | 6/2006 | Higashiura |
| 2006/0161870 A1 | 7/2006 | Hotelling et al. |
| 2006/0174339 A1 | 8/2006 | Tao |
| 2006/0267955 A1 | 11/2006 | Hino |
| 2007/0150826 A1 | 6/2007 | Anzures et al. |
| 2007/0150842 A1 | 6/2007 | Chaudhri et al. |
| 2008/0034292 A1 | 2/2008 | Brunner et al. |
| 2008/0034307 A1 | 2/2008 | Cisler et al. |
| 2008/0055263 A1 | 3/2008 | Lemay et al. |
| 2008/0055269 A1 | 3/2008 | Lemay et al. |
| 2008/0072172 A1 | 3/2008 | Shinohara et al. |
| 2008/0082934 A1 | 4/2008 | Kocienda et al. |
| 2008/0094371 A1 | 4/2008 | Forstall et al. |
| 2008/0122796 A1 | 5/2008 | Jobs et al. |
| 2008/0134170 A1 | 6/2008 | Astheimer |
| 2008/0168290 A1 | 7/2008 | Jobs et al. |
| 2009/0005165 A1 | 1/2009 | Arezina et al. |
| 2009/0006991 A1 | 1/2009 | Lindberg et al. |
| 2009/0061837 A1 | 3/2009 | Chaudhri et al. |
| 2009/0128581 A1 | 5/2009 | Brid et al. |
| 2009/0215497 A1 | 8/2009 | Louch |
| 2009/0241072 A1 | 9/2009 | Chaudhri et al. |
| 2009/0284482 A1 | 11/2009 | Chin |
| 2009/0328162 A1 | 12/2009 | Kokumai et al. |
| 2010/0001967 A1 | 1/2010 | Yoo |
| 2010/0079380 A1 | 4/2010 | Nurmi |
| 2010/0146384 A1* | 6/2010 | Peev et al. ............ 715/255 |
| 2010/0151903 A1 | 6/2010 | Yamamoto et al. |
| 2010/0159995 A1 | 6/2010 | Stallings et al. |
| 2010/0162180 A1 | 6/2010 | Dunnam et al. |
| 2010/0164684 A1 | 7/2010 | Sasa et al. |
| 2010/0235732 A1 | 9/2010 | Bergman |
| 2010/0257490 A1 | 10/2010 | Lyon et al. |
| 2010/0306705 A1 | 12/2010 | Nilsson |
| 2010/0306718 A1 | 12/2010 | Shim et al. |
| 2011/0010672 A1 | 1/2011 | Hope |
| 2011/0028186 A1 | 2/2011 | Lee et al. |
| 2011/0047368 A1 | 2/2011 | Sundaramurthy et al. |
| 2011/0105193 A1 | 5/2011 | Lee et al. |
| 2011/0126094 A1 | 5/2011 | Horodezky et al. |
| 2011/0163972 A1 | 7/2011 | Anzures et al. |
| 2011/0247065 A1 | 10/2011 | Melnyk |
| 2011/0256848 A1 | 10/2011 | Bok et al. |
| 2011/0260829 A1 | 10/2011 | Lee |
| 2011/0283241 A1 | 11/2011 | Miller et al. |
| 2011/0296356 A1 | 12/2011 | Chaudhri et al. |
| 2012/0009896 A1* | 1/2012 | Bandyopadhyay et al. .. 455/411 |
| 2012/0021724 A1 | 1/2012 | Olsen et al. |
| 2012/0023458 A1 | 1/2012 | Chaudhri et al. |
| 2012/0084691 A1 | 4/2012 | Yun |
| 2012/0144338 A1 | 6/2012 | Hymel |
| 2012/0174042 A1 | 7/2012 | Chang et al. |
| 2012/0182226 A1 | 7/2012 | Tuli |
| 2012/0188206 A1 | 7/2012 | Sparf et al. |
| 2012/0269040 A1 | 10/2012 | Wei et al. |
| 2012/0284297 A1 | 11/2012 | Aguera-Arcas et al. |
| 2012/0291103 A1 | 11/2012 | Cohen |
| 2012/0293438 A1 | 11/2012 | Chaudhri et al. |
| 2013/0174094 A1 | 7/2013 | Heo et al. |
| 2013/0185677 A1 | 7/2013 | Chaudhri et al. |
| 2013/0185678 A1 | 7/2013 | Chaudhri et al. |
| 2013/0185680 A1 | 7/2013 | Chaudhri et al. |
| 2013/0190056 A1 | 7/2013 | Chaudhri et al. |
| 2014/0237378 A1 | 8/2014 | Gonen et al. |
| 2015/0082252 A1 | 3/2015 | Forstall et al. |
| 2016/0300072 A1 | 10/2016 | Dellinger et al. |
| 2018/0285587 A1 | 10/2018 | Dellinger et al. |
| 2019/0026003 A1 | 1/2019 | Chaudhri et al. |

FOREIGN PATENT DOCUMENTS

| | | |
|---|---|---|
| CN | 101625620 A | 1/2010 |
| CN | 101753656 A | 6/2010 |

(56) References Cited

FOREIGN PATENT DOCUMENTS

| | | | |
|---|---|---|---|
| CN | 101882046 A | 11/2010 |
| CN | 102043587 A | 5/2011 |
| CN | 102130998 A | 7/2011 |
| DE | 212006000081 U1 | 8/2008 |
| EP | 1284450 A2 | 2/2003 |
| EP | 1462920 A2 | 9/2004 |
| EP | 2060970 A1 | 5/2009 |
| EP | 2144148 A2 | 1/2010 |
| EP | 1964022 B1 | 3/2010 |
| EP | 2200306 A2 | 6/2010 |
| GB | 2313460 A | 11/1997 |
| JP | 60-171560 A | 9/1985 |
| JP | 2-249062 A | 10/1990 |
| JP | 5-127819 A | 5/1993 |
| JP | 6-214954 A | 8/1994 |
| JP | 7-84661 A | 3/1995 |
| JP | 8-263214 A | 10/1996 |
| JP | 8-263215 A | 10/1996 |
| JP | 9-18566 A | 1/1997 |
| JP | 9-128208 A | 5/1997 |
| JP | 9-221950 A | 8/1997 |
| JP | 10-69346 A | 3/1998 |
| JP | 11-203045 A | 7/1999 |
| JP | 2000-322199 A | 11/2000 |
| JP | 2000-349886 A | 12/2000 |
| JP | 2003-91370 A | 3/2003 |
| JP | 2004-252720 A | 9/2004 |
| JP | 2004-532477 A | 10/2004 |
| JP | 2004-348599 A | 12/2004 |
| JP | 2004-348600 A | 12/2004 |
| JP | 2004-348601 A | 12/2004 |
| JP | 2005-71008 A | 3/2005 |
| JP | 2005-167455 A | 6/2005 |
| JP | 2007-71008 A | 3/2007 |
| JP | 2009-123208 A | 6/2009 |
| JP | 2009-521753 A | 6/2009 |
| JP | 2010-147717 A | 7/2010 |
| JP | 2011-199637 A | 10/2011 |
| JP | 2013-25357 A | 2/2013 |
| KR | 10-2008-0079333 A | 8/2008 |
| KR | 10-2010-0005438 A | 1/2010 |
| KR | 10-2011-0114873 A | 10/2011 |
| KR | 10-2011-0139570 A | 12/2011 |
| TW | I355957 B | 3/2011 |
| TW | I339344 B | 1/2012 |
| WO | 2000/031560 A2 | 6/2000 |
| WO | 2001/077792 A2 | 10/2001 |
| WO | 2002/033882 A1 | 4/2002 |
| WO | 2002/093542 A1 | 11/2002 |
| WO | 2003/038569 A2 | 5/2003 |
| WO | 2004/001560 A1 | 12/2003 |
| WO | 2004/021108 A2 | 3/2004 |
| WO | 2005/041020 A1 | 5/2005 |
| WO | 2006/071928 A2 | 7/2006 |
| WO | 2007/076210 A1 | 7/2007 |
| WO | 2010/065752 A2 | 6/2010 |
| WO | 2011/149231 A2 | 12/2011 |
| WO | 2012/006480 A2 | 1/2012 |

OTHER PUBLICATIONS

Envio, "Tip: Quick access to camera from lock screen!" Microsoft Community, Nov. 11, 2010, http://answers.microsoft.com/en-US/winphone/forum/wp7-wptips/tip-quick-access-to-camera-from-lock-screen/3ce6b2ac-da6e-4f2e-a98f-8f8ff41f5194, 1 page.

Itachio, "Camera Icon Lock Screen & Easier Way To Organize Folders," getsatisfaction.com, 2010, https://getsatisfaction.com/apple/topics/camera_icon_lock_screen_easier_way_to_organize_folders, 2 pages.

Jsquared, "Launch Apps from Lockscreen?" MacRumors, Aug. 2, 2010, http://forums.macrumors.com/showthread.php?t=983261, 4 pages.

Mei, P., "An Introduction to Digital Camera Signal Processor," Jan. 2012, http://www.slideserve.com/lacey/an-introduction-to-digital-camera-signal-processor, 36 pages.

Miniman, B. "Windows Phone 7 Digital Photography Features (Video)," pocketnow, http://pocketnow.com/windows-phone/windows-phone-7-digital-photography-features-video, 3 pages.

Nagy, A., "HTC HD2 Camera Launch While Locked," pocketnow, Sep. 9, 2010, http://pocketnow.com/windows-phone/htc-hd2-camera-launch-while-locked, 3 pages.

Wikipedia, "Color image pipeline," Wikipedia, the free encyclopedia, updated May 24, 2010, http://en.wikipedia.org/wiki/Color_image_pipeline, 2 pages.

Windows Phone, "Locked phone: things you can still do," downloaded from the internet Jun. 18, 2013, http://www.windowsphone.com/en-us/how-to/wp7/basics/locked-phone-things-you-can-still-do, 3 pages.

YouTube, "Snappy, iPhone camera app that launches w/o exiting running app," 2:22 minute video uploaded to YouTube by kb1ooo Nov. 14, 2009, http://www.youtube.com/watch?v=67af4R5J5yY, 2 pages.

Office Action dated Feb. 14, 2013, received in U.S. Appl. No. 13/243,326, 13 pages (Bhogal).

Office Action received for Australian Patent Application No. 2012254900, dated May 29, 2015, 4 pages.

Office Action received for European Patent Application No. 09170574.9, dated Aug. 18, 2015, 6 pages.

Office Action received for European Patent Application No. 10194359.5, dated Aug. 18, 2015, 6 pages.

Office Action received for Korean Patent Application No. 10-2014-7033017, dated Jun. 24, 2015, 8 pages (3 pages of English Translation and 5 pages of Official copy).

Office Action received for Chinese Patent Application No. 200910175855.7, dated Aug. 5, 2015, 18 pages (10 pages English Translation and 8 pages of Official Copy).

Notice of Acceptance received for Australian Patent Application No. 2012254900, dated Jul. 30, 2015, 2 pages.

"N1 Quick Start Guide", available at <http://www.neonode.com/upload/DOCUMENTS/_EN/N1_Quick_Start_Guide.pdf>, Apr. 5, 2005, 25 pages.

"*Samsung Electronics GmbH* vs. *Apple Inc.*", Supplement to the Cancellation Request against utility model DE 212006000081 U1, Mar. 1, 2013, Exhibits D26-D32, 211 pages.

"*Samsung Electronics GmbH* vs. *Apple, Inc.*", Nullity action against European Patent EP 1964022 B1 granted with effect in the Federal Republic of Germany, Nov. 19, 2012, Exhibits D12-D21 and D25, 269 pages.

"Samsung Response to the Court's Notification in the Matter of *Samsung Electronics GmbH* vs *Apple, Inc.*", filed on Feb. 21, 2013, 6 pages.

"Statement on the Preliminary Opinion in the Matter of *Motorola Mobility Germany GmbH* vs *Apple Inc.*", Exhibits NK11-NK18, Feb. 21, 2013, 156 pages.

Office Action received for European Patent Application No. 06846405.6, dated Mar. 25, 2009, 6 pages.

Extended European Search Report and Search opinion received for European Patent Application No. 09170574.9, dated Oct. 13, 2009, 8 pages.

Office Action Received for European Patent Application No. 09170574.9, dated May 26, 2010, 1 page.

Extended European Search Report and Search Opinion received for European Patent Application No. 10194359.5, dated Feb. 7, 2011, 9 pages.

Office Action received for Korean Patent Application No. 10-2008-7018109, dated Mar. 5, 2010, 5 pages (2 pages of English Translation and 3 pages of Official Copy).

Office Action received for Korean Patent Application No. 10-2009-7011994, dated Aug. 8, 2013, 1 page (English Translation only).

Office Action received for Korean Patent Application No. 10-2009-7011994, dated Feb. 25, 2015, 8 pages (3 pages of English Translation and 5 pages of Official Copy).

Office Action received for Korean Patent Application No. 10-2014-7028441, dated Feb. 3, 2015, 7 pages (3 pages of English Translation and 4 pages of Official Copy).

(56) References Cited

OTHER PUBLICATIONS

Office Action received for Taiwan Patent Application No. 102102267, dated Dec. 8, 2014, 10 pages (4 pages of English Translation and 6 pages of Official Copy).
Office Action received for Taiwan Patent Application No. 102102267, dated May 7, 2015, 6 pages (Official Copy only). (See Communication under 37 CFR § 1.98(a) (3)).
Final Office Action received for U.S. Appl. No. 11/322,549, dated Sep. 26, 2008, 30 pages.
Final Office Action received for U.S. Appl. No. 11/322,549, dated Mar. 23, 2009, 39 pages.
Non Final Office Action received for U.S. Appl. No. 11/322,549, dated Feb. 7, 2008, 28 pages.
Notice of Allowance received for U.S. Appl. No. 11/322,549, dated Aug. 10, 2009, 9 pages.
Non-Final Office Action received for U.S. Appl. No. 11/322,550, dated Apr. 21, 2008, 22 pages.
Non-Final Office Action received for U.S. Appl. No. 11/322,550, dated Oct. 31, 2007, 23 pages.
Notice of Allowance received for U.S. Appl. No. 11/322,550, dated Sep. 19, 2008, 12 pages.
Office Action received for German Patent Application No. 112006003515.0, dated Dec. 7, 2009, 4 pages (2 pages of English Translation and 2 pages of Official copy).
Office Action received for German Patent Application No. 112006003515.0, dated Feb. 4, 2009, 6 pages (3 pages of English Translation and 3 pages of Official copy).
Non-Final Office Action received for U.S. Appl. No. 12/207,370, dated Oct. 17, 2013, 17 pages.
Non Final Office Action received for U.S. Appl. No. 12/345,584, dated Jul. 24, 2009, 6 pages.
Non Final Office Action received for U.S. Appl. No. 12/345,584, dated Nov. 16, 2009, 17 pages.
Notice of Allowance received for U.S. Appl. No. 12/345,584, dated Jun. 3, 2010, 6 pages.
Final Office Action received for U.S. Appl. No. 12/477,075, dated Sep. 17, 2010, 9 pages.
Non Final Office Action received for U.S. Appl. No. 12/477,075, dated Feb. 7, 2011, 10 pages.
Non-Final Office Action received for U.S. Appl. No. 12/477,075, dated Jan. 29, 2010, 13 pages.
Notice of Allowance received for U.S. Appl. No. 12/477,075, dated Aug. 10, 2011, 9 pages.
Notice of Allowance received for U.S. Appl. No. 12/842,899, dated May 2, 2013, 6 pages.
Non Final Office Action received for U.S. Appl. No. 13/204,572, dated Jan. 6, 2012, 10 pages.
Notice of Allowance received for U.S. Appl. No. 13/204,572, dated Jun. 12, 2012, 8 pages.
Non Final Office Action received for U.S. Appl. No. 13/250,659, dated Nov. 25, 2011, 11 pages.
Notice of Allowance received for U.S. Appl. No. 13/250,659, dated May 11, 2012, 9 pages.
Non Final Office Action received for U.S. Appl. No. 13/563,663, dated Nov. 19, 2012, 10 pages.
Notice of Allowance received for U.S. Appl. No. 13/563,663, dated Dec. 13, 2013, 11 pages.
Notice of Allowance received for U.S. Appl. No. 13/563,663, dated Aug. 15, 2013, 11 pages.
Final Office Action received for U.S. Appl. No. 13/744,343, dated Mar. 27, 2015, 27 pages.
Non-Final Office Action received for U.S. Appl. No. 13/744,343, dated May 29, 2014, 31 pages.
Non-Final Office Action received for U.S. Appl. No. 13/744,349, dated Apr. 9, 2014, 31 pages.
Notice of Allowance received for U.S. Appl. No. 13/744,349, dated Oct. 17, 2014, 10 pages.
Notice of Allowance received for U.S. Appl. No. 13/787,712, dated Jun. 25, 2013, 10 pages.
Notice of Allowance received for U.S. Appl. No. 13/787,716, dated Sep. 5, 2013, 10 pages.
Notice of Allowance received for U.S. Appl. No. 13/791,799, dated Apr. 1, 2014, 9 pages.
Notice of Allowance received for U.S. Appl. No. 13/791,799, dated Jan. 21, 2014, 9 pages.
Notice of Allowance received for U.S. Appl. No. 13/791,799, dated Jun. 17, 2013, 10 pages.
Notice of Allowance received for U.S. Appl. No. 13/791,799, dated Oct. 30, 2013, 11 pages.
Non Final Office Action received for U.S. Appl. No. 13/791,808, dated Sep. 11, 2013, 13 pages.
Notice of Allowance received for U.S. Appl. No. 13/791,808, dated Feb. 3, 2014, 9 pages.
1964022, *HTC Europe Co. Ltd.* vs *Apple Inc.*, Nullity Reply Brief filed on Nov. 8, 2012, 17 pages.
1964022, Translation of German Nullity Action Complaint against European Patent Application No. 1964022 (DE No. 602006012876.2), filed on Dec. 15, 2010, 37 pages.
1TAPPS, "1TapVideo", available at <http://www.1tapps.com/app/1tapvideo_one_tap_video/>, retrieved on Nov. 20, 2014, 3 pages.
1TAPPS, "New App Launch: 1TapVideo—Instant Video Recording for iOS—Quick-Start Video Camera", available at <http://www.1tapps.com/2011/10/10/new-app-launch-1tapvideo-instant-video-recording-for-ios-quick-start-video-camera/>, Oct. 10, 2011, 2 pages.
Office Action received for Chinese Patent Application No. 200680052770.4, dated Feb. 5, 2010, 4 pages (English Translation only).
Office Action received for Japanese Patent Application No. 2008-547675, dated Sep. 18, 2012, 4 pages (2 pages of English Translation and 2 pages of Official Copy).
Office Action received for Japanese Patent Application No. 2008-547675, dated Nov. 4, 2011, 6 pages (3 pages of English Translation and 3 pages of Official Copy).
Office Action received for Japanese Patent Application No. 2008-547675, dated Mar. 22, 2011, 5 pages (3 pages of English Translation and 2 pages of Official Copy).
Office Action received for Chinese Patent Application No. 200910175855.7, dated Jul. 26, 2011, 13 pages (8 pages of English Translation and 5 pages of Official Copy).
Office Action received for Chinese Patent Application No. 200910175855.7, dated Jul. 4, 2012, 15 pages (9 pages of English Translation and 6 pages of Official Copy).
Notice of Acceptance received for Australian Patent Application No. 2010200661, dated Aug. 2, 2012, 3 pages.
Office Action received for Australian Patent Application No. 2010200661, dated Jul. 20, 2011, 2 pages.
Certificate of Grant received for Australian Patent Application No. 2011101192, dated Apr. 12, 2012, 1 page.
Office Action received for Australian Patent Application No. 2011101192, dated Oct. 26, 2011, 2 pages.
Certificate of Grant received for Australian Patent Application No. 2011101193, dated Apr. 23, 2012, 1 page.
Office Action received for Australian Patent Application No. 2011101193, dated Oct. 26, 2011, 2 pages.
Notice of Allowance received for Japanese Patent Application No. 2012-091352, dated May 24, 2013, 3 pages (Official Copy only). (See Communication under 37 CFR § 1.98(a) (3)).
Office Action received for Australian Patent Application No. 2012254900, dated Nov. 28, 2013, 3 pages.
Notice of Allowance received for Japanese Patent Application No. 2013-007818, dated May 31, 2013, 4 pages (Official Copy only). (See Communication under 37 CFR § 1.98(a) (3)).
Office Action received for Japanese Patent Application No. 2013-007818 dated Mar. 11, 2013, 5 pages (English Translation only).
Notice of Allowance received for Japanese Patent Application No. 2013-101691, dated Jul. 5, 2013, 4 pages (Official Copy only). (See Communication under 37 CFR § 1.98(a) (3)).
Office Action received for Australian Patent Application No. 2013209538, dated Apr. 21, 2015, 5 pages.
Office Action received for Indian Patent Application No. 3347/CHENP/2008, dated Aug. 5, 2013, 2 pages.

(56) References Cited

OTHER PUBLICATIONS

APPLEINSIDER, "Mac OS X 10/ Lion: New Multitouch Gestures, Dock Integration for Expose, Launchpad, Mission Control", available at <http://appleinsider.com/articles/11/04/14/mac_os_x_10_7lion_new_multitouch_gestures_dock_integrationfor_expos_launchpad_mission_control>, Apr. 14, 2011, 11 pages.
Bardram, Jakob E., "The Trouble with Login: on Usability and Computer Security in Ubiquitous Computing", Journal Personal and Ubiquitous Computing, vol. 9, Jul. 23, 2005, pp. 357-367.
Baudisch et al., "Phosphor: Explaining Transitions in the User Interface Using Afterglow Effects", Proceedings of the19th Annual ACM Symposium on User Interface Software and Technology, Oct. 15-18, 2006, pp. 169-178.
DAILYTECH, "Analysis: Neonode Patented Swipe-to-Unlock 3 Years Before Apple", available at "http://www.dailytech.com/Analysis+Neonode+Patented+SwipetoUnlock+3+Years+Before+Apple/article24046.htm", Feb. 20, 2012, 4 pages.
Feng, et al., "Continuous Remote Mobile Identity Management Using Biometric Integrated Touch-Display", 45th Annual IEEE/ACM International Symposium on Microarchitecture Workshops (MICROW), 2012, pp. 55-62.
Fitzpatrick et al., "Method for Access Control via Gestural Verification", IBM Technical Disclosure Bulletin, vol. 36, No. 9B, Sep. 1993, pp. 487-488.
GRIDLOCK 1.32, "Graphical Security System for your Palm", available at <http://gridlock.en.softonic.com/palm>, Oct. 8, 2003, 2 pages.
Horry et al., "A Passive-Style Buttonless Mobile Terminal", IEEE Transactions on Consumer Electronics; vol. 49, No. 3, Aug. 2003, pp. 530-535.
IBM, "Touch Pad Authentication", Sep. 21, 2004, 2 pages.
Jansen, Wayne A., "Authenticating Users on Handheld Devices", Contribution of the National Institute of Standards and Technology, 2003, 13 pages.
Jermyn et al., "The Design and Analysis of Graphical Password", Proceedings of the 8th USENIX Security Symposium, Aug. 23-26, 1999, 15 pages.
JGUI Professional, "Touch Password Protection", available at <http://www.jgui.net/touch/index.html>, retrieved on Dec. 30, 2005, 4 pages.
McLean et al., "Access/Control Icons (Icon Keys)", IBM Technical Disclosure Bulletin, vol. 38, No. 4, Apr. 1995, pp. 407-409.
Molen, Brad, "Android 4.0 Ice Cream Sandwich Review", available at <http://www.engadget.com/2011/12/01/android-4-0-ice-cream-sandwich-review/>, retrieved on Aug. 25, 2014, 45 pages, Jan. 12, 2017.
Monrose, Newman F., "Towards Stronger User Authentication", A Dissertation Submitted in Partial Fulfilment of the Requirements for the Degree of Doctor of Philosophy Department of Computer Science, New York University, May 1999, 130 pages.
Najjar, Lawrence J., "Graphical Passwords", International Technology Disclosures, vol. 10, No. 1, Jan. 25, 1992, 1 page.
Neonode Inc., "Welcome to the N1 Guide", available at <http://www.ebookspdf.com/gadget/2818/neonode-n1m-manual/>, Jul. 2004, pp. 1-42.
Neonode.com, "N1 Quick Start Guide", Version 0.5, Apr. 5, 2005, pp. 1-24.
Ni et al., "DiffUser: Differentiated User Access Control on Smartphones", IEEE 6th International Conference on Mobile Adhoc and Sensor Systems, 2009, pp. 1012-1017.
Partizann, "Thread: Launch Native Camera App in Video Mode", available at <http://developer.nokia.com/community/discussion/showthread.php/229643-Launch-native-camera-app-in-video-mode>, Oct. 18, 2011, 2 pages.
International Preliminary Report on Patentability received for PCT Patent Application No. PCT/US20061061370, dated Jun. 24, 2008, 7 pages.
International Search Report and Written Opinion received for PCT Application No. PCT/US2006/061370, dated May 25, 2007, May 25, 2007, 9 pages.

International Search Report and Written Opinion received for PCT Application No. PCT/US2006/061380, dated Apr. 23, 2007, 7 pages.
International Preliminary Report on Patentability received for PCT Patent Application No. PCT/US20131022197, dated Jul. 31, 2014, 11 pages.
International Search Report and Written Opinion received for PCT Patent Application No. PCT/US2013/022197, dated Jul. 9, 2013, 15 pages.
Plaisant et al., "Touchscreen Toggle Design", CHI'92, May 3-7, 1992, pp. 667-668.
QT Creator, "Launching the Debugger", available at <http://doc.qt.digia.com/qtcreator-2.4/creator-debugger-operating-modes.html>, retrieved on Aug. 25, 2014, 2 pages.
Renaud et al., "My Password is Here! An Investigation into Visuo-Spatial Authentication Mechanisms", Interacting with Computers, vol. 16, 2004, pp. 1017-1041.
Wiedenbeck et al., "PassPoints: Design and Longitudinal Evaluation of a Graphical Password System", International Journal of Human-Computer Studies, vol. 63, 2005, pp. 102-127.
XDADEVELOPERS, "Launch Android Camera in Video Mode", available at <http://forum.xda-developers.com/showthread.php?t=1463070>, Jan. 25, 2012, 2 pages.
Xiao et al., "A Facial Presence Monitoring System for Information Security", IEEE Workshop on Computational Intelligence in Biometrics: Theory, Algorithms, and Applications, 2009, 8 pages.
Office Action received for Korean Patent Application No. 10-2014-7023252, dated Sep. 3, 2015, 9 pages (4 pages of English Translation and 5 pages of Official Copy).
Applicant Initiated Interview Summary received for U.S. Appl. No. 15/995,044, dated Oct. 28, 2019, 6 pages.
Notice of Acceptance received for Australian Patent Application No. 2018260823, dated Oct. 21, 2019, 3 pages.
Office Action received for Indian Patent Application No. 5932/CHENP/2014, dated Oct. 23, 2019, 7 pages.
Office Action received for Korean Patent Application No. 10-2018-7032756, dated Oct. 25, 2019, 10 pages (4 pages of English Translation and 6 pages of Official Copy).
Decision from Board of Appeal received for European Patent Application No. 10194359.5, mailed on Jun. 24, 2019, 22 pages.
Minutes of the Oral Proceedings received for European Patent Application No. 10194359.5, mailed on Jun. 4, 2019, 3 pages.
Office Action received for Korean Patent Application No. 10-2019-7008096, dated Aug. 20, 2019, 5 pages (2 pages of English Translation and 3 pages of Official Copy).
Advisory Action received for U.S. Appl. No. 13/744,343, dated Jul. 30, 2015, 4 pages.
Carr, et al., "Using Interaction Object Graphs to Specify Graphical Widgets", Available Online at <http://www.cs.umd.edu/hcil/trs/94-09/94-09.pdf>, Sep. 1994, 32 pages.
Decision on Appeal received for Korean Patent Application No. 10-2014-7023252, mailed on Feb. 27, 2019, 58 pages (9 pages of English Translation and 49 pages of Official Copy).
Decision to Grant received for European Patent Application No. 09170574.9, dated Feb. 22, 2018, 2 pages.
Decision to Grant Received for European Patent Application No. 06846405.6, dated Feb. 11, 2010, 2 pages.
Decision to Grant received for European Patent Application No. 13702856.9, dated Jun. 6, 2019, 2 pages.
Decision to Refuse received for European Patent Application No. 10194359.5, dated Jul. 19, 2017, 35 pages.
Extended European Search Report received for European Patent Application No. 18195407.4, dated Dec. 4, 2018, 12 pages.
Extended European Search Report received for European Patent Application No. 18195408.2, dated Apr. 12, 2019, 11 pages.
Heath, Alex, "Weird iOS 5 Bug Lets Prying Eyes View Saved Photos on A Locked iPhone", Online Available at <http://www.cultofmac.com/137827/weird-ios-5-bug-lets-preying-eyes-view-saved-photos-on-a-locked-iphone/>, Jan. 3, 2012, 7 pages.
Intention to Grant received for European Patent Application No. 06846405.6, dated Aug. 28, 2009, 4 pages.
Intention to Grant received for European Patent Application No. 09170574.9, dated Jun. 20, 2017, 7 pages.

(56) References Cited

OTHER PUBLICATIONS

Intention to Grant received for European Patent Application No. 09170574.9, dated Oct. 5, 2017, 9 pages.
Intention to Grant received for European Patent Application No. 13702856.9, dated Jan. 29, 2019, 8 pages.
Kotov, Anton, "Review GSM phone Neonode N1m", Available at <http://web.archive.org/web/20050730004341/http://www.mobile-review.com/review/neonode-n1m-en.shtml>, Jul. 30, 2005, 18 pages.
Nakamura, Asami, "iPhone 4S & iOS 5 Start Guide", Mynavi Corporation, MacFan, Special Supplement, Dec. 2011, pp. 26, 54, 77 and 114-115 (Official Copy Only) 37 CFR § 1.98(a) (3).
Neonode N1m, Available online at: <https://www.mobilmania.cz/clanky/neonode-n1m-svedsky-smartphonetest/fotogalerie-i-nepublikovane-snimky/sc-3-a-1110516-ch-1029652/default.aspx#articleStart2005.07.20>, Jul. 20, 2005, 6 pages (Official Copy Only) 37 CFR § 1.98(a) (3).
Neonode N1m, available online at: <http://www.gsmarena.com/neonode_n1m-pictures-1137.php>, May 18, 2005, 4 pages.
Non-Final Office Action received for U.S. Appl. No. 14/248,255, dated Aug. 10, 2017, 32 pages.
Non-Final Office Action received for U.S. Appl. No. 15/187,463, dated Jun. 27, 2017, 14 pages.
Non-Final Office Action received for U.S. Appl. No. 15/187,463, dated Nov. 4, 2016, 11 pages.
Notice of Acceptance received for Australian Patent Application No. 2015255304, dated Jan. 27, 2017, 3 pages.
Notice of Acceptance received for Australian Patent Application No. 2017203078, dated Jul. 31, 2018, 3 pages.
Notice of Acceptance received for Australian Patent Application No. 2013209538, dated Mar. 2, 2016, 3 pages.
Notice of Allowance Action received for U.S. Appl. No. 15/187,463, dated Mar. 7, 2018, 10 pages.
Notice of Allowance received for Chinese Patent Application No. 200910175855.7, dated Dec. 6, 2017, 2 pages (1 page of English Translation and 1 page of Official Copy).
Notice of Allowance received for Chinese Patent Application No. 201380015521.8, dated Dec. 1, 2017, 2 pages (1 page of English Translation and 1 page of official copy).
Notice of Allowance received for Japanese Patent Application No. 2014-553464, dated Sep. 16, 2016, 3 pages (Official Copy only) 37 CFR § 1.98(a) (3).
Notice of Allowance received for Japanese Patent Application No. 2016-160214, dated Mar. 30, 2018, 4 pages (1 page of English Translation and 3 pages of Official copy).
Notice of Allowance received for Korean Patent Application No. 10-2009-7011994, dated Nov. 27, 2015, 4 pages (1 page of English Translation and 3 pages of Official Copy).
Notice of Allowance received for Korean Patent Application No. 10-2014-7028441, dated Dec. 23, 2015, 4 pages (1 page of English Translation and 3 pages of Official Copy).
Notice of allowance received for Korean Patent Application No. 10-2014-7033017, dated Dec. 23, 2015, 4 pages (1 page of English Translation and 3 pages of Official Copy).
Notice of Allowance received for Korean Patent Application No. 10-2017-7018196 dated Sep. 29, 2017, 3 pages (Official Copy only) 37 CFR § 1.98(a) (3).
Notice of Allowance received for Korean Patent Application No. 10-2018-7000899, dated Dec. 26, 2018, 4 pages (1 page of English Translation and 3 pages of Official Copy).
Notice of Allowance received for Korean Patent Application No. 10-2016-7005576, dated Mar. 29, 2017, 5 pages (2 pages of English Translation and 3 pages of Official Copy).
Notice of Allowance received for Taiwanese Patent Application No. 102102267, dated Mar. 13, 2018, 5 pages (2 pages of English Translation and 3 pages of Official Copy).
Notice of Allowance received for U.S. Appl. No. 13/744,343, dated Oct. 1, 2015, 13 pages.
Notice of Allowance received for U.S. Appl. No. 13/744,343, dated Aug. 28, 2015, 16 pages.
Notice of Allowance received for U.S. Appl. No. 13/744,343, dated Feb. 17, 2016, 7 pages.
Notice of Allowance received for U.S. Appl. No. 13/744,349, dated Aug. 12, 2015, 9 pages.
Notice of Allowance received for U.S. Appl. No. 14/248,255, dated Jun. 7, 2018, 5 pages.
Nozawa, Naoki, "iPad Perfect Manual for iOS 4", First Edition Second Issue, Sotechsha Co., Ltd, Jun-Ichi Yanagisawa, Jan. 31, 2011, 5 pages (Official Copy only) 37 CFR § 1.98(a) (3).
Numata, Satoshi, "Advanced Guide to iOS 5 Programming", Answer Book iOS Programming First Edition, Shuwa System Co., Ltd., First Edition First Issue, Jan. 1, 2012, 5 pages (Official Copy only) 37 CFR § 1.98(a) (3).
Office Action received for Australian Patent Application No. 2015255304, dated Dec. 2, 2016, 2 pages.
Office Action received for Australian Patent Application No. 2016203731, dated Mar. 23, 2017, 4 pages.
Office Action received for Australian Patent Application No. 2017203078, dated Apr. 26, 2018, 2 pages.
Office Action received for Australian Patent Application No. 2018260823, dated Jan. 24, 2019, 2 pages.
Office Action received for Chinese Patent Application No. 200910175855.7, dated Apr. 10, 2017, 12 pages (5 pages of English translation and 7 pages of Official Copy).
Office Action received for Chinese Patent Application No. 200910175855.7, dated Sep. 26, 2016, 6 pages (3 pages of English translation and 3 pages of Official Copy).
Office Action received for Chinese Patent Application No. 201380015521.8, dated Apr. 1, 2017, 14 pages (3 pages of English Translation and 11 pages of Official Copy).
Office Action received for Chinese Patent Application No. 201380015521.8, dated Aug. 1, 2017, 6 pages (3 pages of English Translation and 3 pages of Official Copy).
Office Action received for Chinese Patent Application No. 201380015521.8, dated Jul. 27, 2016, 16 pages (3 pages of English Translation and 13 pages of Official copy).
Office Action received for European Patent Application No. 09170574.9, dated May 3, 2016, 6 pages.
Office Action received for European Patent Application No. 13702856.9, dated Dec. 14, 2016, 9 pages.
Office Action received for European Patent Application No. 13702856.9, dated Sep. 18, 2018, 4 pages.
Office Action received for European Patent Application No. 18195408.2, dated Jan. 3, 2019, 3 pages.
Office Action received for Japanese Patent Application No. 2014-553464, dated Oct. 2, 2015, 10 pages (5 pages of English Translation and 5 pages of Official Copy).
Office Action received for Japanese Patent Application No. 2014-553464, dated Apr. 22, 2016, 6 pages (3 pages of English Translation and 3 pages of Official copy).
Office Action received for Japanese Patent Application No. 2016-160214, dated Jul. 3, 2017, 7 pages (3 pages of English Translation and 4 pages of Official Copy).
Office Action received for Korean Patent Application No. 10-2014-7023252, dated Apr. 29, 2016, 9 pages (4 pages of English Translation and 5 pages of Official Copy).
Office Action received for Korean Patent Application No. 10-2014-7023252, dated Mar. 15, 2017, 10 pages (5 pages of English Translation and 5 pages of Official Copy).
Office Action received for Korean Patent Application No. 10-2014-7023252, dated Nov. 24, 2016, 8 pages (3 pages of English Translation and 5 pages of Official Copy).
Office Action received for Korean Patent Application No. 10-2016-7005576, dated May 20, 2016, 9 pages (4 pages of English Translation and 5 pages of Official Copy).
Office Action received for Korean Patent Application No. 10-2017-7010440, dated Aug. 10, 2018, 7 pages (3 pages of English Translation and 4 pages of Official Copy).
Office Action received for Korean Patent Application No. 10-2017-7010440, dated Feb. 20, 2018, 10 pages (4 pages of English Translation and 6 pages of Official Copy).

(56) References Cited

OTHER PUBLICATIONS

Office Action received for Korean Patent Application No. 10-2018-7000899, dated Apr. 9, 2018, 7 pages (3 pages of English Translation and 4 pages of Official Copy).
Office Action received for Taiwanese Patent Application No. 102102267, dated Aug. 23, 2017, 6 pages (3 pages of English Translation and 3 pages of Official Copy).
Office Action received for Taiwanese Patent Application No. 102102267, dated Feb. 26, 2016, 7 pages (2 pages of English Translation and 4 pages of Official Copy).
Plaisant et al., "Touchscreen Toggle Switches: Push or Slide? Design Issues and Usability Study", Available online at : <http://hcil2.cs.umd.edu/trs/90-08/90-08.pdf>, Nov. 1990, 11 pages.
Shima, Toru, "Galaxy Nexus with Android 4.0 Released!", Ascii Media Works Co., Ltd., vol. 23, No. 860, Dec. 6, 2011, 5 pages(Official Copy only) 37 CFR § 1.98(a) (3).
Summons to attend Oral proceedings received for European Patent Application No. 09170574.9, mailed on Dec. 23, 2016, 10 pages.
Summons to attend Oral proceedings received for European Patent Application No. 10194359.5, mailed on Feb. 2, 2017, 8 pages.
Summons to attend Oral proceedings received for European Patent Application No. 10194359.5, mailed on Oct. 12, 2018, 14 pages.
Supplemental to the Summons for Oral Proceedings received for German Patent Application No. 112006003515.0, mailed on Jun. 3, 2017, 15 pages (7 pages of English Translation and 8 pages of Official Copy).
Extended European Search Report received for European Patent Application No. 19173909.3, dated Sep. 13, 2019, 4 pages.
Office Action received for European Patent Application No. 18195407.4, dated Sep. 26, 2019, 7 pages.
Non-Final Office Action received for U.S. Appl. No. 15/995,044, dated Jun. 27, 2019, 17 pages.
Office Action received for Korean Patent Application No. 10-2020-7021254, dated Jun. 17, 2021, 7 pages (3 pages of English Translation and 4 pages of Official Copy).
Decision of Appeal received for Japanese Patent Application No. 2008-547675, mailed on Dec. 3, 2013, 29 pages (13 pages of English Translation and 16 pages of Official Copy).
Decision on Appeal received for Korean Patent Application No. 10-2017-7010440, mailed on Jan. 22, 2020, 20 pages (3 pages of English Translation and 17 pages of Official Copy).
Decision to Grant received for Japanese Patent Application No. 2012-091352, dated May 17, 2013, 5 pages (2 pages of English Translation and 3 pages of Official Copy).
Decision to Grant received for Japanese Patent Application No. 2013-101691, dated Jun. 26, 2013, 4 pages (Official Copy only). (See Communication under 37 CFR § 1.98(a) (3)).
Decision to Refuse received for European Patent Application No. 18195407.4, dated Oct. 22, 2020, 8 pages.
Minutes of the Oral Proceedings received for European Patent Application No. 18195407.4, mailed on Oct. 8, 2020, 5 pages.

Notice of Acceptance received for Australian Patent Application No. 2006330724, dated Nov. 18, 2009, 1 page.
Notice of Acceptance received for Australian Patent Application No. 2019283970, dated Dec. 15, 2020, 3 pages.
Notice of Allowance received for Korean Patent Application No. 10-2017-7010440, dated Feb. 10, 2020, 5 pages (2 pages of English Translation and 3 pages of Official Copy).
Notice of Allowance received for Korean Patent Application No. 10-2018-7032756, dated May 6, 2020, 4 pages (1 page of English Translation and 3 pages of Official Copy).
Notice of Allowance received for Korean Patent Application No. 10-2019-7008096, dated Feb. 25, 2020, 5 pages (2 pages of English Translation and 3 pages of Official Copy).
Notice of Allowance received for Korean Patent Application No. 10-2020-7014870, dated Sep. 11, 2020, 4 pages (1 page of English Translation and 3 pages of Official Copy).
Office Action received for Australian Patent Application No. 2006330724, dated Aug. 17, 2009, 2 pages.
Office Action received for Australian Patent Application No. 2019283970, dated Sep. 30, 2020, 4 pages.
Office Action received for Chinese Patent Application No. 200910175855.7, dated Apr. 9, 2013, 9 pages (4 pages of English Translation and 5 pages of Official Copy).
Office Action received for European Patent Application No. 18195408.2, dated Dec. 21, 2020, 7 pages.
Office Action received for European Patent Application No. 19173909.3, dated Mar. 17, 2020, 6 pages.
Office Action received for Indian Patent Application No. 201848033396, dated Feb. 26, 2021, 5 pages.
Office Action received for Indian Patent Application No. 5930/CHENP/2014, dated Mar. 11, 2020, 7 pages.
Office Action received for Indian Patent Application No. 5931/CHENP/2014, dated Jan. 13, 2020, 8 pages.
Office Action received for Japanese Patent Application No. 2012-091352, dated Feb. 25, 2013, 33 pages (19 pages of English Translation and 14 pages of Official Copy).
Office Action received for Japanese Patent Application No. 2013-007818, dated Mar. 11, 2013, Mar. 11, 2013, 10 pages (5 pages of English Translation and 5 pages of Official Copy).
Office Action received for Korean Patent Application No. 10-2020-7021254, dated Aug. 28, 2020, 10 pages (4 pages of English Translation and 6 pages of Official Copy).
Office Action received for Korean Patent Application No. 10-2020-7035982, dated Apr. 12, 2021, 5 pages (2 pages of English Translation and 3 pages of Official Copy).
Plaisant et al., "Touchscreen Toggle Switches: Push or slide? Design Issues and Usability Study", Technical Report CAR-TR-521, CS-TR-2557, Nov. 1990, pp. 1-10.
Summons to Attend Oral Proceedings received for European Patent Application No. 18195407.4, mailed on Jul. 21, 2020, 5 pages.
Summons to Attend Oral Proceedings received for European Patent Application No. 18195407.4, mailed on Mar. 18, 2020, 12 pages.

* cited by examiner

700

702 — While an electronic device with a display and a touch-sensitive surface is in a locked, passcode-protected state:

704 — Display a lock screen user interface on the display, the lock screen user interface including a plurality of restricted application launch icons, each restricted application launch icon corresponding to an application

706 — Detect user input to activate a respective restricted application launch icon

708 — In response to detecting the user input to activate the respective restricted application launch icon:

710 — Start a restricted session for a respective application that corresponds to the respective restricted application launch icon, wherein the respective application is configured to generate one or more content items while in the restricted session

712 — Maintain the device in the locked, passcode-protected state for applications in the device other than the respective application

714 — While the respective application is in the restricted session:

716 — The respective application is enabled to present one or more content items generated by the respective application while in the restricted session

718 — The respective application is disabled from presenting any content items in the respective application that were not generated while in the restricted session

720 — The plurality of restricted application launch icons include one or more of a restricted note taking application launch icon, a restricted calendar application launch icon, a restricted contact list application launch icon, and a restricted voice recorder application launch icon

- 746 — The respective restricted application launch icon is a restricted voice recorder application launch icon, the respective application is a voice recorder application, and the voice recorder application is configured to generate voice recordings while in the restricted session

- 748 — While the voice recorder application is in the restricted session:

- 750 — the voice recorder application is enabled to play one or more voice recordings generated by the voice recorder application while in the restricted session

- 752 — The voice recorder application is disabled from playing any voice recordings in the voice recorder application that were not generated while in the restricted session

- 754 — The plurality of restricted application launch icons are user configurable

Figure 7C

DEVICE, METHOD, AND GRAPHICAL USER INTERFACE FOR ACCESSING AN APPLICATION IN A LOCKED DEVICE

RELATED APPLICATIONS

This application claims priority to U.S. Provisional Application Ser. No. 61/493,506, filed Jun. 5, 2011, entitled "Device, Method, and Graphical User Interface for Accessing an Application in a Locked Device," which is incorporated herein by reference in its entirety.

This application is related to U.S. application Ser. No. 13/243,326, filed Sep. 23, 2011, entitled "Device, Method, and Graphical User Interface for Accessing an Application in a Locked Device," which is incorporated herein by reference in its entirety.

TECHNICAL FIELD

This relates generally to electronic devices with touch-sensitive surfaces, including but not limited to electronic devices with touch-sensitive surfaces that enable restricted access to an application while the device is locked.

BACKGROUND

The use of portable devices with touch-sensitive surfaces as input devices has increased significantly in recent years. Such portable devices have greatly increased the number of content generation opportunities for users, including taking pictures or writing down notes, contact information, or appointments, just to name a few examples. Often, in such content generation opportunities, time is critical, as a user may want to take advantage of a fresh memory or a fleeting event.

But existing methods for accessing applications are slow and a hindrance to fast content generation, particularly when the device is in a locked, passcode-protected state. Accessing applications on a device while the device is locked requires multiple steps, which prevent immediate use of applications when rapid use is beneficial or desired. Further, certain applications such as the camera application require multiple hardware and software operations during startup. These multiple operations may delay the moment when the application is ready to use, and thus also hinder quick content generation.

SUMMARY

Accordingly, there is a need for electronic devices with faster, more efficient methods and interfaces for quickly accessing an application in a locked device, without unlocking other applications on the device. Such methods and interfaces may complement or replace conventional methods for accessing an application in a locked device. Such methods and interfaces reduce the cognitive burden on a user and produce a more efficient human-machine interface.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a non-transitory computer readable storage medium or other computer program product configured for execution by one or more processors.

In accordance with some embodiments, a method is performed at an electronic device with a display and a touch-sensitive surface. The method includes: while the electronic device is in a locked, passcode-protected state: displaying a lock screen user interface on the display, the lock screen user interface including a plurality of restricted application launch icons, each restricted application launch icon corresponding to an application; detecting user input to activate a respective restricted application launch icon; and, in response to detecting the user input to activate the respective restricted application launch icon: starting a restricted session for a respective application that corresponds to the respective restricted application launch icon, where the respective application is configured to generate one or more content items while in the restricted session; and maintaining the device in the locked, passcode-protected state for applications in the device other than the respective application.

In accordance with some embodiments, an electronic device includes a display, a touch-sensitive surface, one or more processors, memory, and one or more programs. The one or more programs are stored in the memory and configured to be executed by the one or more processors. The one or more programs include instructions for: while the electronic device is in a locked, passcode-protected state: displaying a lock screen user interface on the display, the lock screen user interface including a plurality of restricted application launch icons, each restricted application launch icon corresponding to an application; detecting user input to activate a respective restricted application launch icon; and, in response to detecting the user input to activate the respective restricted application launch icon: starting a restricted session for a respective application that corresponds to the respective restricted application launch icon, where the respective application is configured to generate one or more content items while in the restricted session; and maintaining the device in the locked, passcode-protected state for applications in the device other than the respective application.

In accordance with some embodiments, a computer readable storage medium has stored therein instructions which when executed by an electronic device with a display and a touch-sensitive surface, cause the device to: while the electronic device is in a locked, passcode-protected state: display a lock screen user interface on the display, the lock screen user interface including a plurality of restricted application launch icons, each restricted application launch icon corresponding to an application; detect user input to activate a respective restricted application launch icon; and, in response to detecting the user input to activate the respective restricted application launch icon: start a restricted session for a respective application that corresponds to the respective restricted application launch icon, where the respective application is configured to generate one or more content items while in the restricted session; and maintain the device in the locked, passcode-protected state for applications in the device other than the respective application.

In accordance with some embodiments, a graphical user interface on an electronic device with a display, a touch-sensitive surface, a memory, and one or more processors to execute one or more programs stored in the memory includes, while the electronic device is in a locked, passcode-protected state: a lock screen user interface on the display, the lock screen user interface including a plurality of restricted application launch icons, each restricted application launch icon corresponding to an application. User input to activate a respective restricted application launch icon is detected. In response to detecting the user input to activate the respective restricted application launch icon: a restricted session for a respective application that corresponds to the respective restricted application launch icon is started, where the respective application is configured to generate one or more content items while in the restricted session; and the device is maintained in the locked, passcode-protected state for applications in the device other than the respective application.

In accordance with some embodiments, an electronic device includes: a display; a touch-sensitive surface; while the electronic device is in a locked, passcode-protected state: means for displaying a lock screen user interface on the display, the lock screen user interface including a plurality of restricted application launch icons, each restricted application launch icon corresponding to an application; means for detecting user input to activate a respective restricted application launch icon; and, in response to detecting the user input to activate the respective restricted application launch icon: means for starting a restricted session for a respective application that corresponds to the respective restricted application launch icon, where the respective application is configured to generate one or more content items while in the restricted session; and means for maintaining the device in the locked, passcode-protected state for applications in the device other than the respective application.

In accordance with some embodiments, an information processing apparatus for use in an electronic device with a display and a touch-sensitive surface includes: while the electronic device is in a locked, passcode-protected state: means for displaying a lock screen user interface on the display, the lock screen user interface including a plurality of restricted application launch icons, each restricted application launch icon corresponding to an application; means for detecting user input to activate a respective restricted application launch icon; and, in response to detecting the user input to activate the respective restricted application launch icon: means for starting a restricted session for a respective application that corresponds to the respective restricted application launch icon, where the respective application is configured to generate one or more content items while in the restricted session; and means for maintaining the device in the locked, passcode-protected state for applications in the device other than the respective application.

In accordance with some embodiments, a method is performed at an electronic device with a display and a touch-sensitive surface and a plurality of applications. The method includes: starting a restricted session for a first application while maintaining the device in a locked, passcode-protected state for applications in the device other than the first application; while the first application is in the restricted session: generating one or more content items in the first application; receiving a request to present one or more content items in the first application; and, in response to receiving the request to present one or more content items in the first application: presenting content items or representations thereof that meet restricted session access criteria for the first application; and not presenting content items or representations thereof that fail to meet the restricted session access criteria for the first application.

In accordance with some embodiments, an electronic device includes a display, a touch-sensitive surface, a plurality of applications, one or more processors, memory, and one or more programs. The one or more programs are stored in the memory and configured to be executed by the one or more processors. The one or more programs include instructions for: starting a restricted session for a first application while maintaining the device in a locked, passcode-protected state for applications in the device other than the first application; while the first application is in the restricted session: generating one or more content items in the first application; receiving a request to present one or more content items in the first application; and, in response to receiving the request to present one or more content items in the first application: presenting content items or representations thereof that meet restricted session access criteria for the first application; and not presenting content items or representations thereof that fail to meet the restricted session access criteria for the first application.

In accordance with some embodiments, a computer readable storage medium has stored therein instructions which when executed by an electronic device with a with a display and a touch-sensitive surface and a plurality of applications, cause the device to: start a restricted session for a first application while maintaining the device in a locked, passcode-protected state for applications in the device other than the first application; while the first application is in the restricted session: generate one or more content items in the first application; receive a request to present one or more content items in the first application; and, in response to receiving the request to present one or more content items in the first application: present content items or representations thereof that meet restricted session access criteria for the first application, and not present content items or representations thereof that fail to meet the restricted session access criteria for the first application.

In accordance with some embodiments, a graphical user interface on an electronic device with a display, a touch-sensitive surface, a plurality of applications, a memory, and one or more processors to execute one or more programs stored in the memory includes a user interface of a first application in a restricted session, where the restricted session for the first application is started while maintaining the device in a locked, passcode-protected state for applications in the device other than the first application. While the first application is in the restricted session: one or more content items is generated in the first application; a request to present one or more content items in the first application is received; and, in response to receiving the request to present one or more content items in the first application: content items or representations thereof that meet restricted session access criteria for the first application are presented; and content items or representations thereof that fail to meet the restricted session access criteria for the first application are not presented.

In accordance with some embodiments, an electronic device includes: a display; a touch-sensitive surface; a plurality of applications; means for means for starting a restricted session for a first application while maintaining the device in a locked, passcode-protected state for applications in the device other than the first application; while the first application is in the restricted session: means for generating one or more content items in the first application; means for receiving a request to present one or more content items in the first application; and, in response to receiving the request to present one or more content items in the first application: means for presenting content items or representations thereof that meet restricted session access criteria for the first application; and means for not presenting content items or representations thereof that fail to meet the restricted session access criteria for the first application.

In accordance with some embodiments, an information processing apparatus for use in an electronic device with a display and a touch-sensitive surface and a plurality of applications, includes: means for means for starting a restricted session for a first application while maintaining the device in a locked, passcode-protected state for applications in the device other than the first application; while the first application is in the restricted session: means for generating one or more content items in the first application; means for receiving a request to present one or more content items in the first application; and, in response to receiving the request to present one or more content items in the first application: means for presenting content items or representations thereof that meet restricted session access criteria for the first application; and means for not presenting content items or representations thereof that fail to meet the restricted session access criteria for the first application.

In accordance with some embodiments, a method is performed at an electronic device with a display, a touch-sensitive surface, one or more processors, random access memory, and a camera. The method includes: detecting an input to launch a camera application that controls the camera; in response to detecting the input to launch the camera application, concurrently: loading instructions for controlling a user interface for the camera application in the random access memory, allocating a portion of the random access memory to instructions for a digital image pipeline, and initializing one or more hardware components in the camera; and when loading instructions for controlling the user interface, allocating the portion of the random access memory, and initializing one or more hardware components are complete, displaying a live image preview in the user interface for the camera application on the display.

In accordance with some embodiments, an electronic device includes a display, a touch-sensitive surface, one or more processors, memory, including random access memory, a camera, and one or more programs. The one or more programs are stored in the memory and configured to be executed by the one or more processors. The one or more programs include instructions for: detecting an input to launch a camera application that controls the camera; in response to detecting the input to launch the camera application, concurrently: loading instructions for controlling a user interface for the camera application in the random access memory, allocating a portion of the random access memory to instructions for a digital image pipeline, and initializing one or more hardware components in the camera; and when loading instructions for controlling the user interface, allocating the portion of the random access memory, and initializing one or more hardware components are complete, displaying a live image preview in the user interface for the camera application on the display.

In accordance with some embodiments, a computer readable storage medium has stored therein instructions which when executed by an electronic device with a display, a touch-sensitive surface, one or more processors, random access memory, and a camera, cause the device to: detect an input to launch a camera application that controls the camera; in response to detecting the input to launch the camera application, concurrently: load instructions for controlling a user interface for the camera application in the random access memory, allocate a portion of the random access memory to instructions for a digital image pipeline, and initialize one or more hardware components in the camera; and when loading instructions for controlling the user interface, allocating the portion of the random access memory, and initializing one or more hardware components are complete, display a live image preview in the user interface for the camera application on the display.

In accordance with some embodiments, an electronic device includes: a display; a touch-sensitive surface; one or more processors; random access memory; a camera; means for detecting an input to launch a camera application that controls the camera; in response to detecting the input to launch the camera application, concurrently: means for loading instructions for controlling a user interface for the camera application in the random access memory, means for allocating a portion of the random access memory to instructions for a digital image pipeline, and means for initializing one or more hardware components in the camera; and when loading instructions for controlling the user interface, means for allocating the portion of the random access memory, and initializing one or more hardware components are complete, means for displaying a live image preview in the user interface for the camera application on the display.

In accordance with some embodiments, an information processing apparatus for use in an electronic device with a display and a touch-sensitive surface, one or more processors, random access memory, and a camera includes: means for detecting an input to launch a camera application that controls the camera; in response to detecting the input to launch the camera application, concurrently: means for loading instructions for controlling a user interface for the camera application in the random access memory, means for allocating a portion of the random access memory to instructions for a digital image pipeline, and means for initializing one or more hardware components in the camera; and when loading instructions for controlling the user interface, means for allocating the portion of the random access memory, and initializing one or more hardware components are complete, means for displaying a live image preview in the user interface for the camera application on the display.

In accordance with some embodiments, an electronic device includes a display unit configured to display a lock screen user interface on the display unit while the electronic device is in a locked, passcode-protected state, the lock screen user interface including a plurality of restricted application launch icons, each restricted application launch icon corresponding to an application; a touch-sensitive surface unit configured to receive user inputs; and a processing unit coupled to the display unit and the touch-sensitive surface unit. The processing unit is configured to: while the electronic device is in a locked, passcode-protected state: detect user input to activate a respective restricted application launch icon; and, in response to detecting the user input to activate the respective restricted application launch icon: start a restricted session for a respective application that corresponds to the respective restricted application launch icon, wherein the respective application is configured to generate one or more content items while in the restricted session; and maintain the device in the locked, passcode-protected state for applications in the device other than the respective application.

In accordance with some embodiments, an electronic device includes a display unit; a touch-sensitive surface unit configured to receive requests; a plurality of applications; and a processing unit coupled to the display unit and the touch-sensitive unit and the plurality of applications. The processing unit is configured to: start a restricted session for a first application while maintaining the device in a locked, passcode-protected state for applications in the device other than the first application; while the first application is in the restricted session: generate one or more content items in the first application; receive a request to present one or more content items in the first application; and, in response to receiving the request to present one or more content items in the first application: present content items or representations thereof that meet restricted session access criteria for the first application; and not present content items or representations thereof that fail to meet the restricted session access criteria for the first application.

In accordance with some embodiments, an electronic device includes a display unit; a touch-sensitive surface unit configured to receive inputs; a random access memory unit; a camera unit; and a processing unit coupled to the display unit and the touch-sensitive surface unit and the random access memory unit and a camera unit. The processing unit is configured to: detect an input to launch a camera application that controls the camera unit; in response to detecting the input to launch the camera application, concurrently: load instructions for controlling a user interface for the camera application in the random access memory unit; allocate a portion of the random access memory unit to instructions for a digital image pipeline; and initialize one or more hardware components in the camera unit; and when loading instructions for controlling the user interface, allocating the portion of the random access memory unit, and initializing one or more hardware components are complete, enable display of a live image preview in the user interface for the camera application on the display unit.

Thus, electronic devices with displays and touch-sensitive surfaces are provided with faster, more efficient methods and interfaces for quickly accessing an application on a locked device without unlocking other applications on the device, thereby increasing the effectiveness, efficiency, and user satisfaction with such devices. Such methods and interfaces may complement or replace conventional methods for accessing an application on a locked device.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIGS. 7A-7C are flow diagrams illustrating a method of accessing one restricted application in a plurality of restricted applications on a locked device in accordance with some embodiments.

DESCRIPTION OF EMBODIMENTS

Typically, accessing an application in a locked device takes several steps and corresponding user inputs. For example, the steps may include unlocking the device with a passcode, navigating to an icon corresponding to the application, and activating the icon. While having to unlock the device with a passcode first provides device security, there are times when having to unlock the device first to access an application is a hindrance, such as during content generation opportunities where time is critical. The embodiments described below enable a user to access to one of several applications without the user entering the passcode; the passcode protection is bypassed. When the device is locked, an interface with multiple icons corresponding to respective applications is displayed. When one of these icons is activated, the corresponding application is started in a restricted session and the device remains locked with respect to the other applications. This provides for fast application access (e.g., by bypassing passcode input) and also maintains device security in light of the fast application access (e.g., by placing restrictions on use of the application and maintaining the device in a locked state with respect to other applications). Fast application access when the device is in a locked, passcode protected state is particular useful for portable devices (e.g., smart phones), but can also be used with other devices (e.g., desktop computers).

Typically, applications on a device are accessed when a device is unlocked, e.g., after the user has entered a passcode to unlock the device. However, when application access with bypass of the passcode protection is allowed, there is a risk that content may be exposed to unauthorized persons. Some of the embodiments described below reduce such risk by restricting the content that an application may present based on predefined restricted session access criteria.

When a camera application is launched, several operations are performed in order to start up the hardware and software components needed to run the camera application. Some of the embodiments described below provide a faster way to launch a camera application. By performing the various operations involved in launching the camera application concurrently, there is less delay between the user input to launch the camera application and the camera application being ready for use.

Figure 7B:
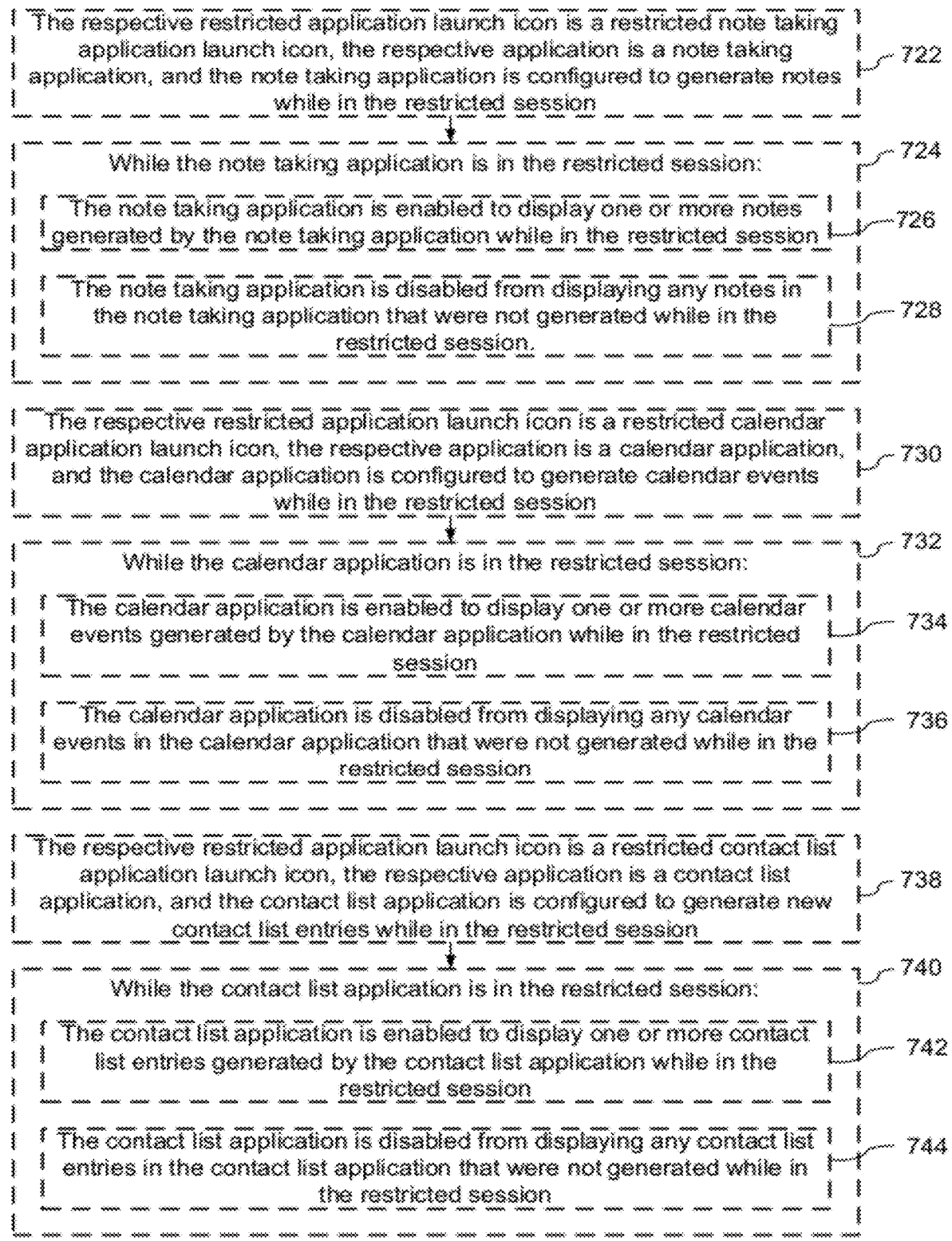
Figure 8:
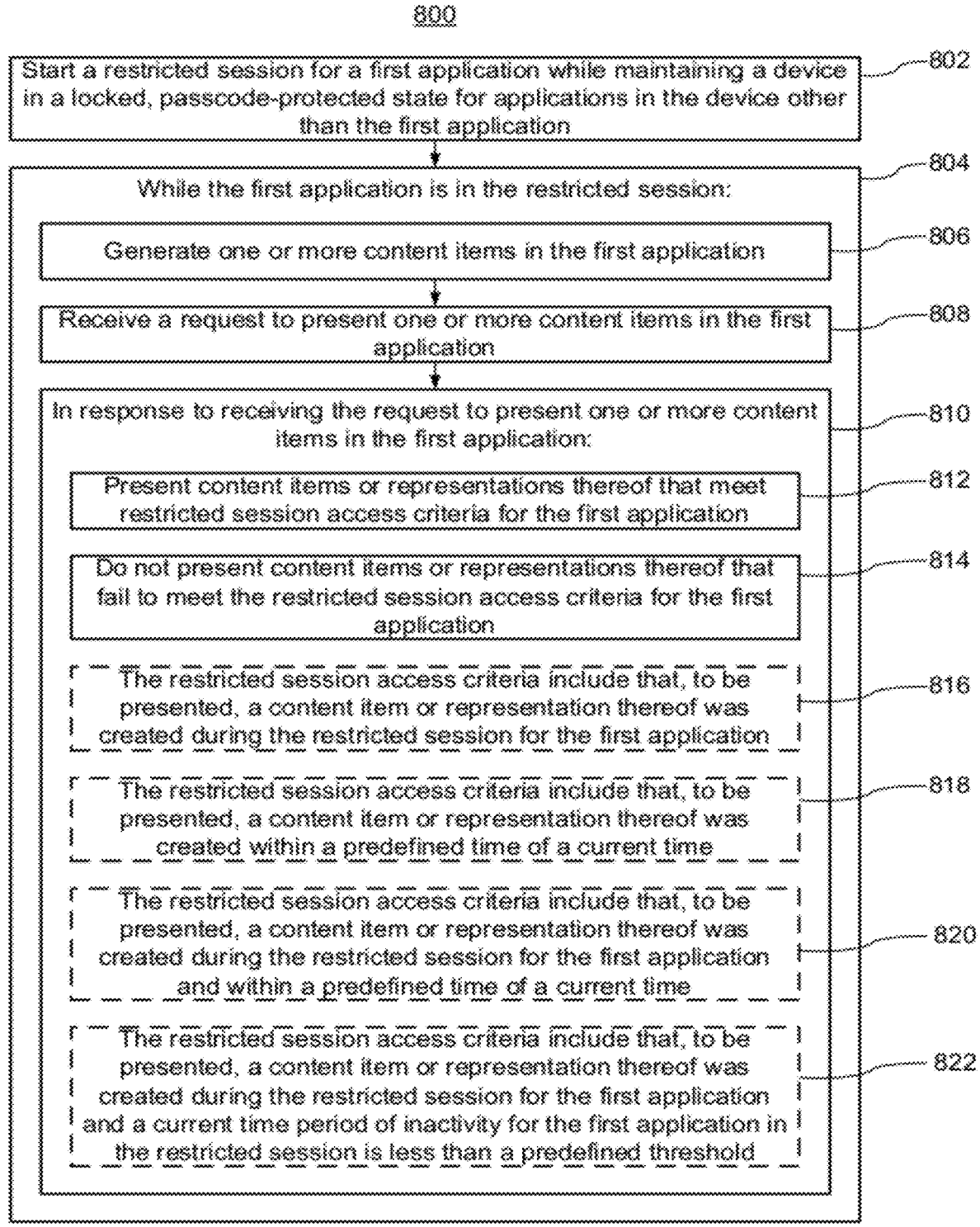
FIG. 8 is a flow diagram illustrating a method of presenting content generated in a restricted application session in accordance with some embodiments.
Figure 9:
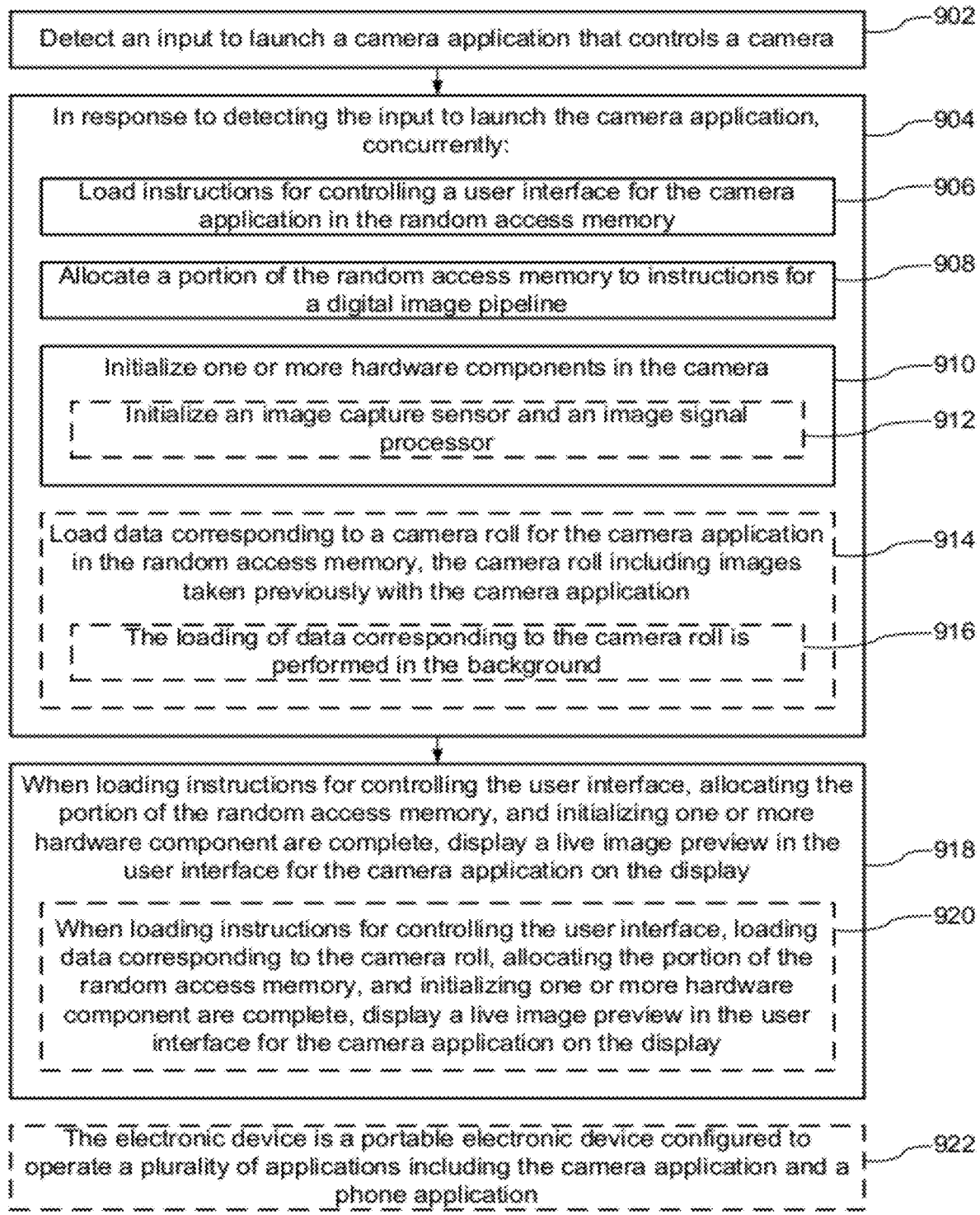
FIG. 9 is a flow diagram illustrating a method of launching a camera application in accordance with some embodiments.

Below, FIGS. 1A-1B, 2, 3, and 10-12 provide a description of exemplary devices. FIGS. 4A-4B and 5A-5O illustrate exemplary user interfaces for accessing an application on a locked device. FIGS. 7A-7C are flow diagrams illustrating a method of accessing one restricted application in a plurality of restricted applications on a locked device. FIG. 8 is a flow diagram illustrating a method of presenting content generated in a restricted application session. FIG. 9 is a flow diagram illustrating a method of launching a camera application. The user interfaces in FIGS. 5A-5O are used to illustrate the processes in FIGS. 7A-7C and 8.

Exemplary Devices

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Figure 1A:
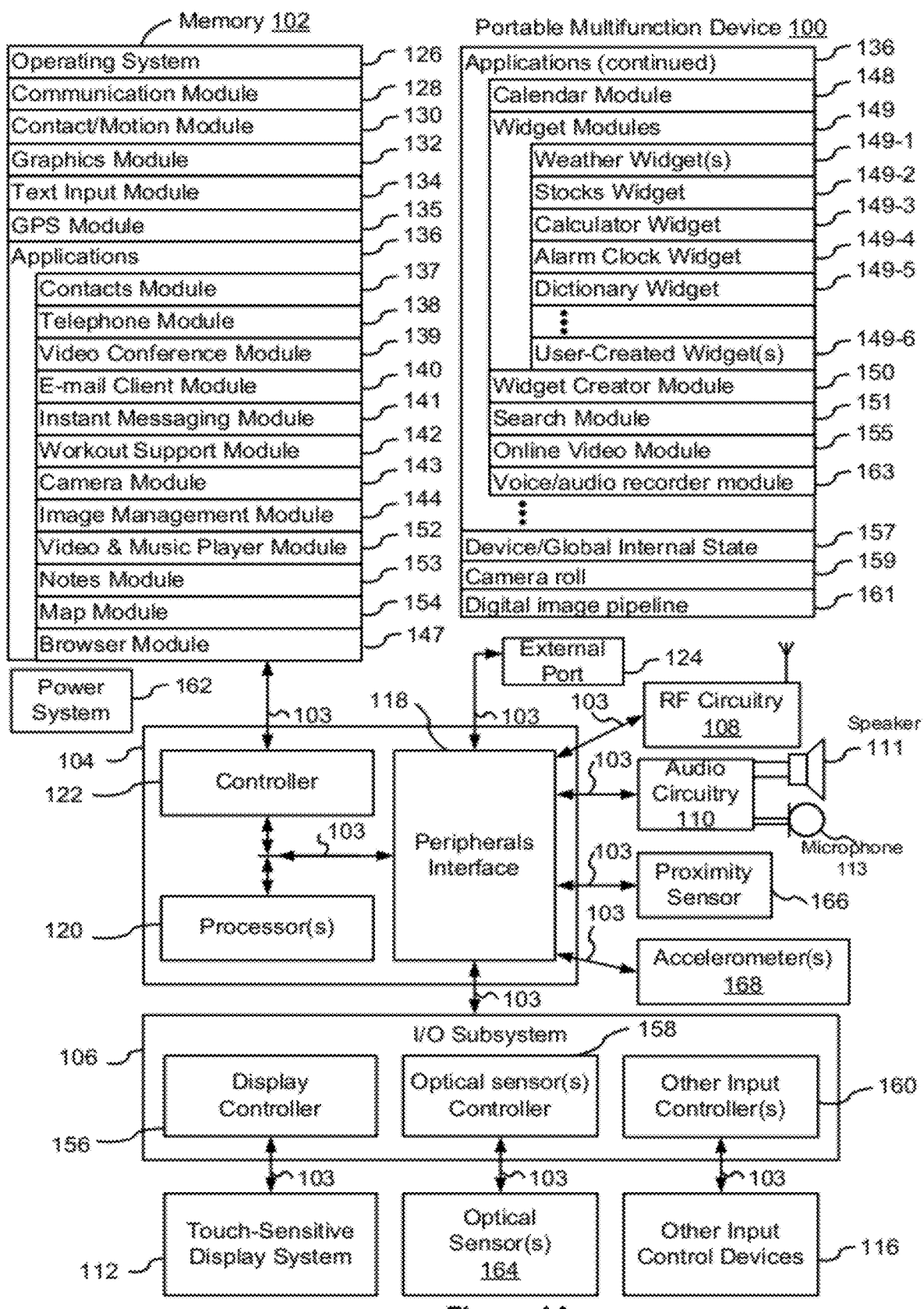
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 1A may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, the one or more processors 120 include an image signal processor and a dual-core or multi-core processor.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 may also include one or more accelerometers 168. FIG. 1A shows accelerometer 168 coupled to peripherals interface 118. Alternately, accelerometer 168 may be coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
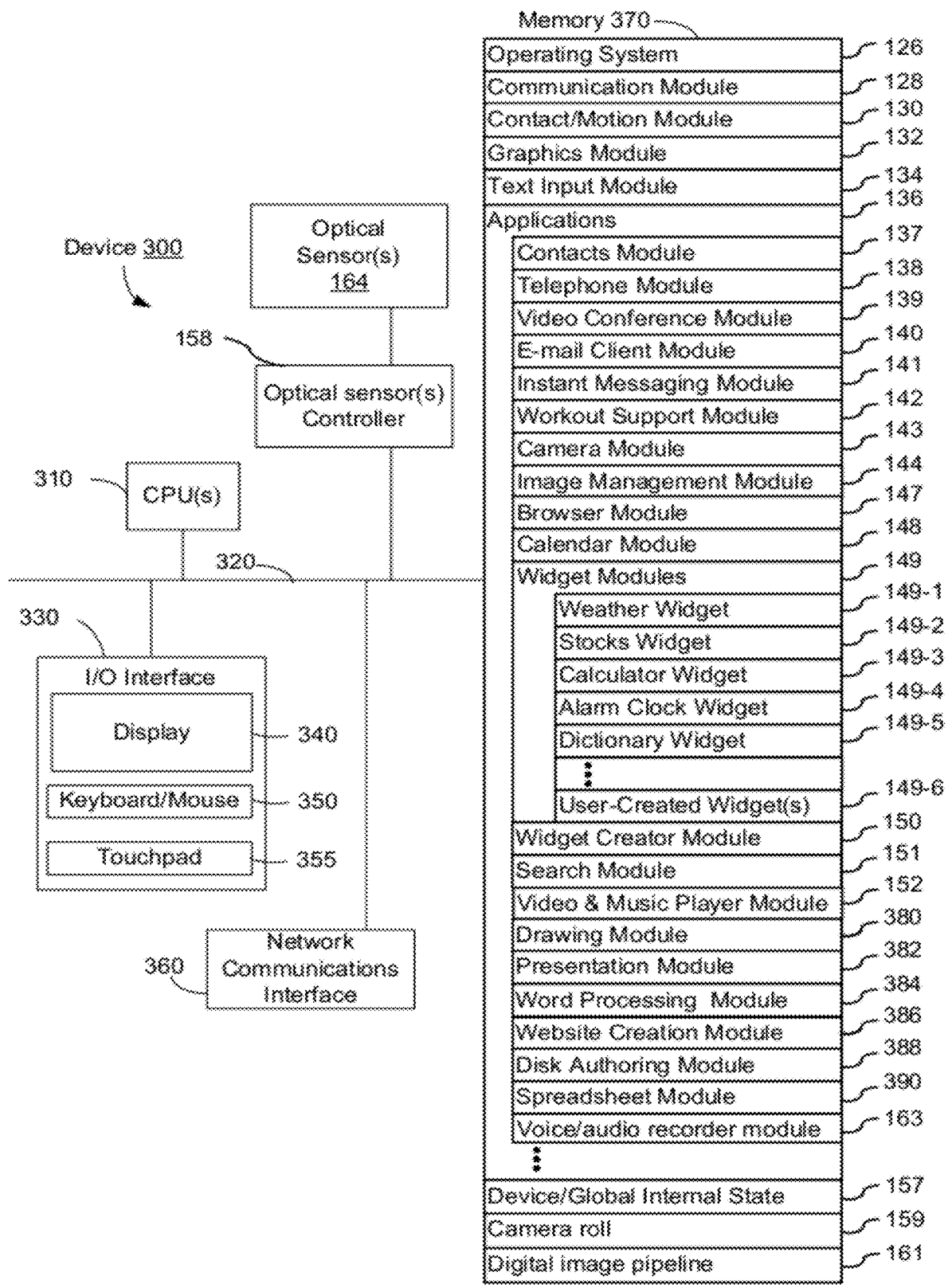
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude. Further, in some embodiments, memory 102 stores camera roll 159 and digital image pipeline 161.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which may be made up of a video player module and a music player module;
  notes module 153;
  map module 154;
  online video module 155; and/or
  voice/audio recorder module 163.

Examples of other applications 136 that may be stored in memory 102 include other word processing applications, other image editing applications, drawing applications, presentation applications, JAVA-enabled applications, encryption, digital rights management, voice recognition, voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, digital image pipeline 161 (which converts raw data from the optical sensor into a final image or video), and image management module 144, camera module 143 includes executable instructions to capture still images or video (including a video stream) and store them into camera roll 159, modify characteristics of a still image or video, or delete a still image or video from camera roll 159.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images, including images stored in camera roll 159.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

In conjunction with audio circuitry 110, speaker 111, microphone 113, touch screen 112, display controller 156, graphics module 132, and text input module 134, voice/audio recorder module 163 may be used record sounds (e.g., voice memos and other speech) and play back the recorded sounds.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1B:
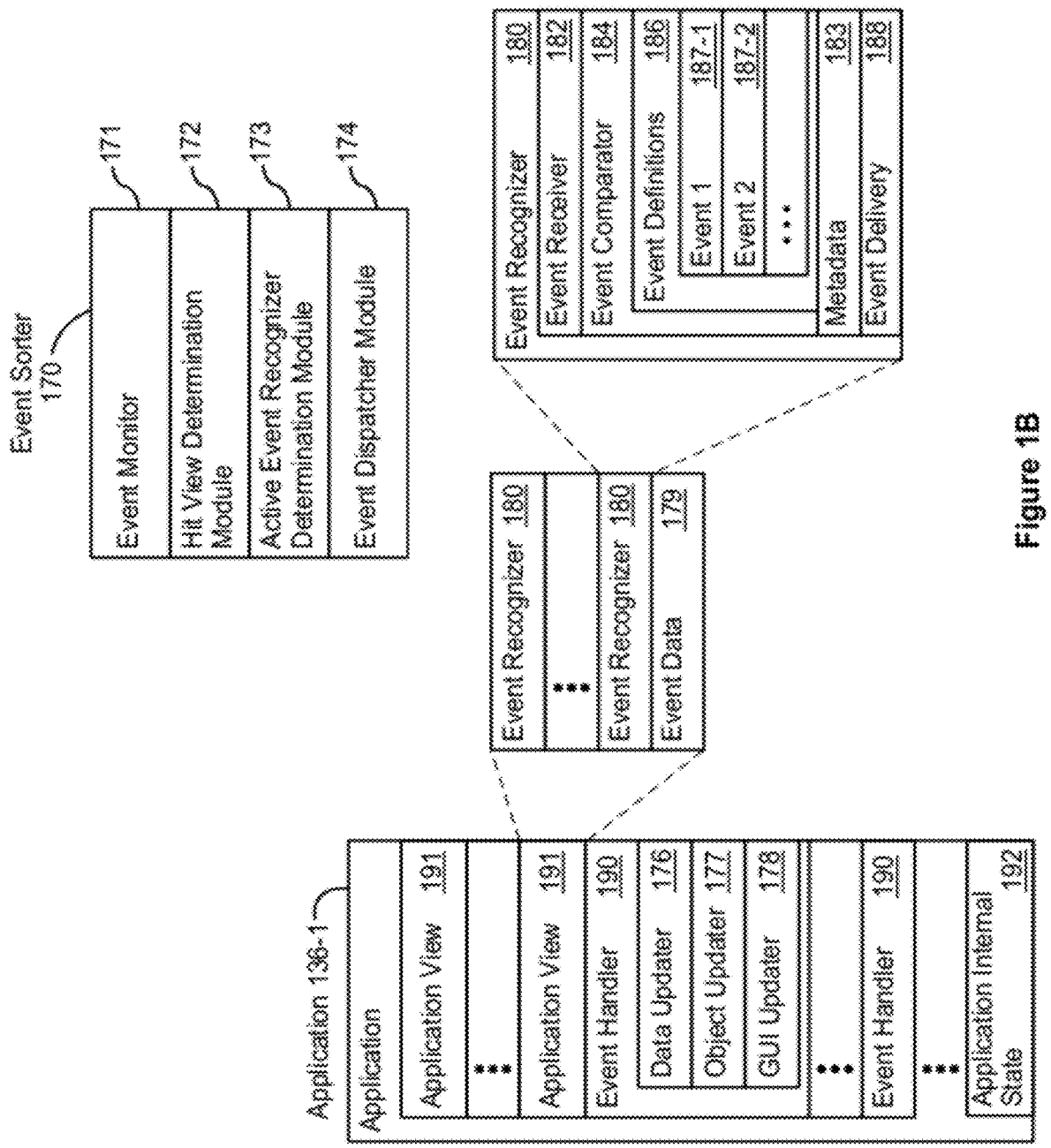
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
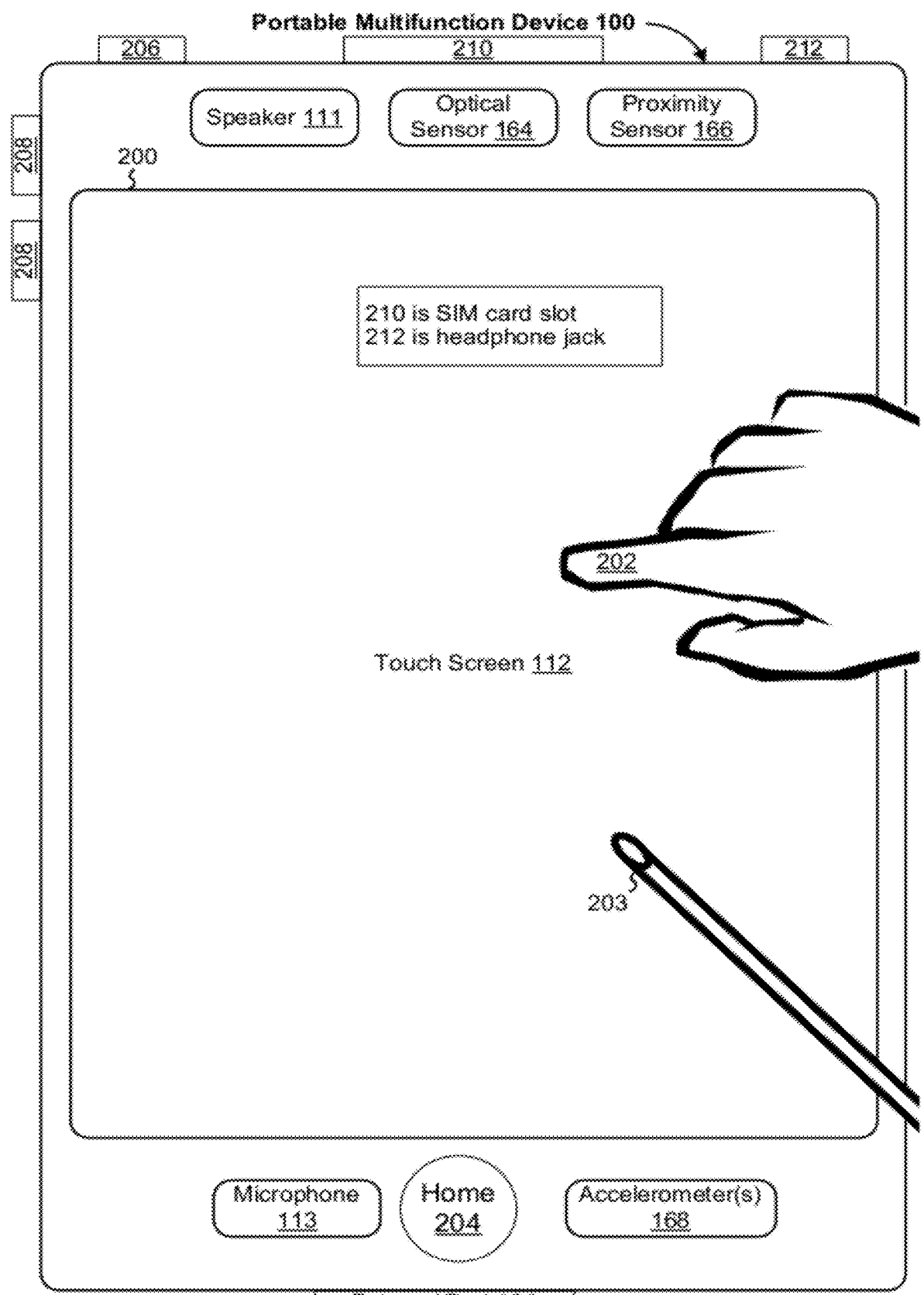
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture may include one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, headset jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. In some embodiments, processing unit(s) 310 include an image signal processor and a dual-core or multi-core processor. Communication buses 320 may include circuitry (sometimes called a chipset) that interconnects and controls communications between system components. Device 300 includes input/output (I/O) interface 330 comprising display 340, which is typically a touch screen display. I/O interface 330 also may include a keyboard and/or mouse (or other pointing device) 350 and touchpad 355. Device 300 also includes optical sensor(s) 164 and optical sensor(s) controller 158. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in memory 102 of portable multifunction device 100 (FIG. 1), or a subset thereof. Furthermore, memory 370 may store additional programs, modules, and data structures not present in memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on portable multifunction device 100.

Figure 4A:
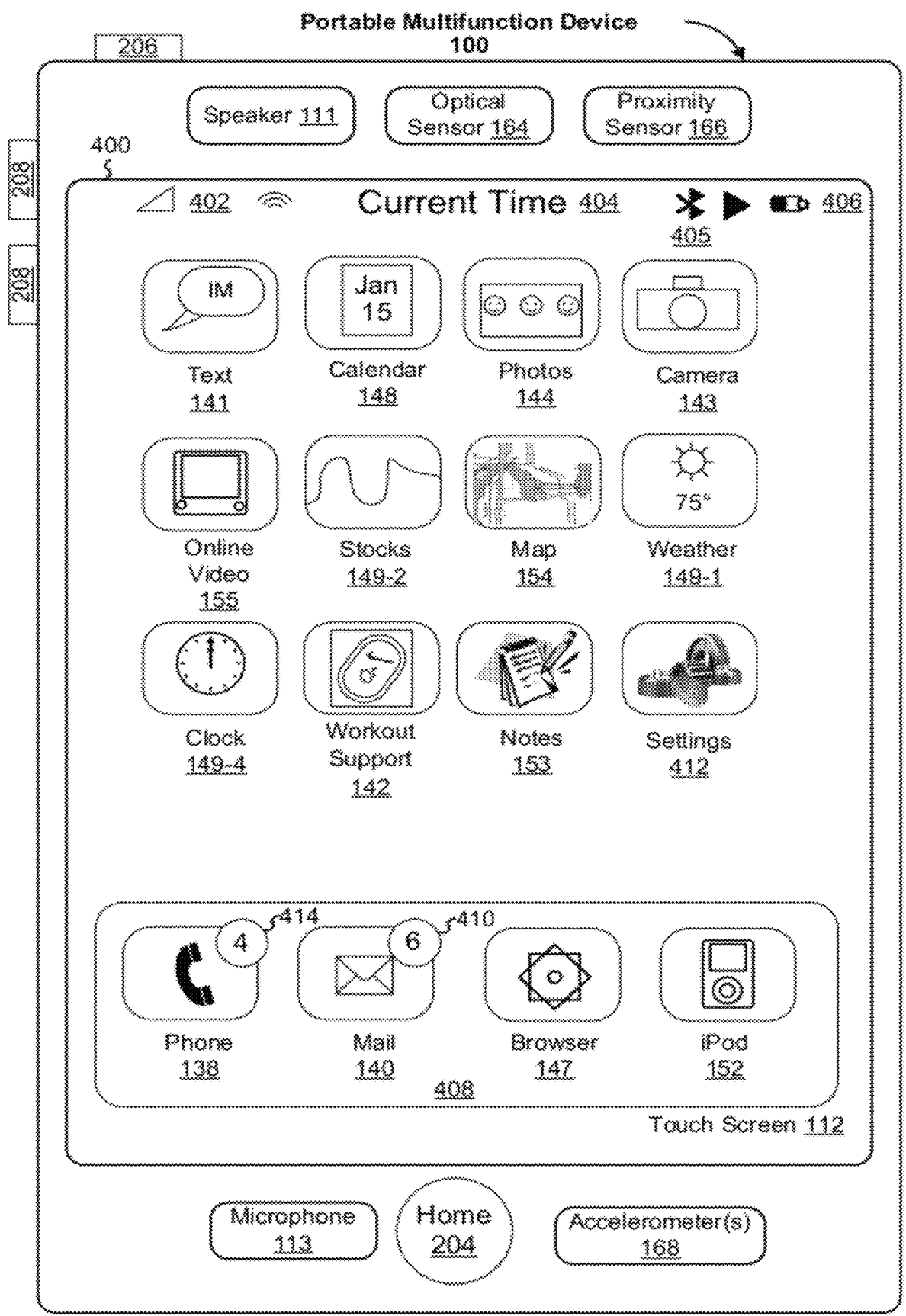
FIG. 4A illustrates an exemplary user interface for a menu of applications on a portable multifunction device in accordance with some embodiments.
Figure 5A:
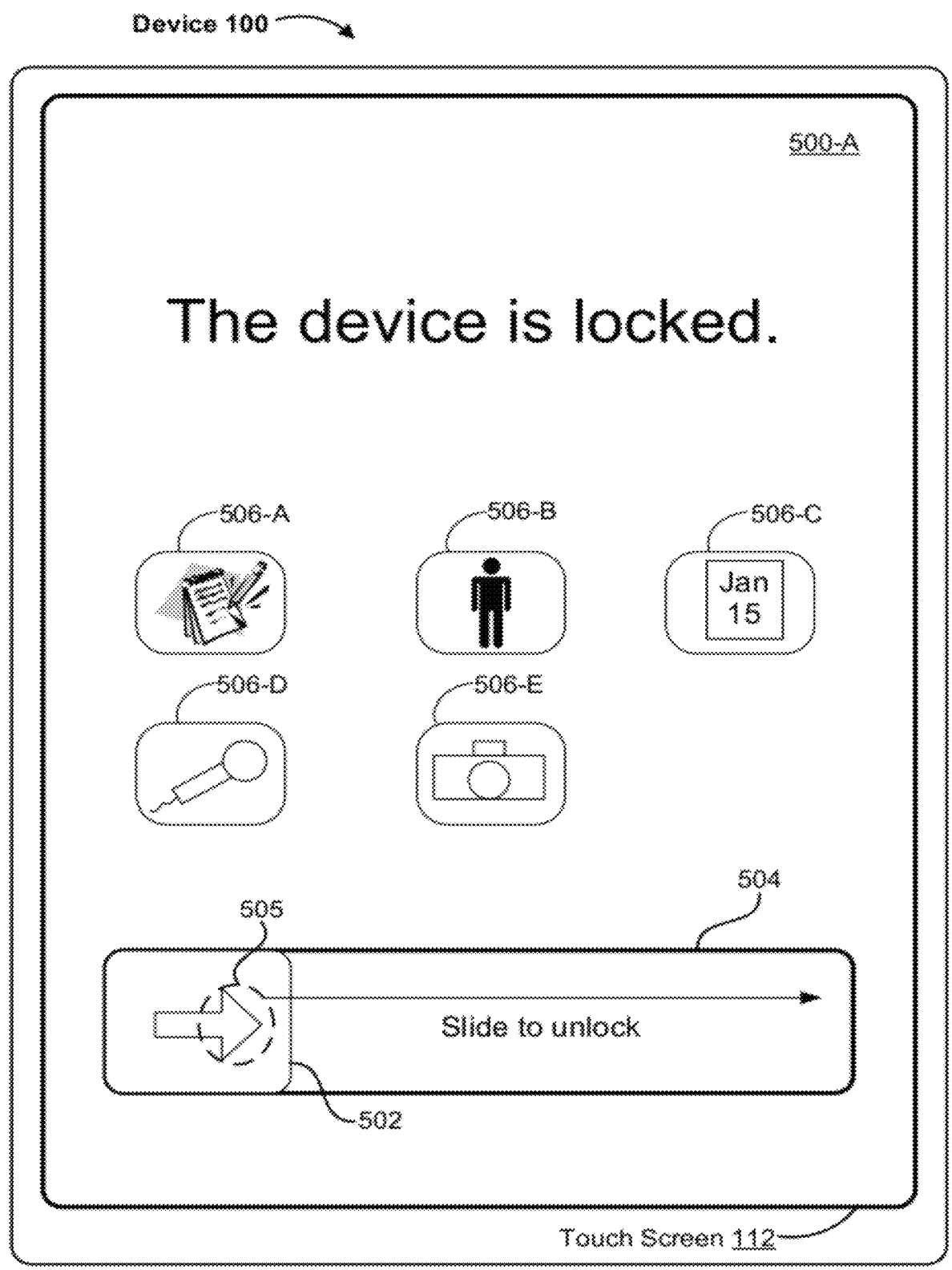
FIGS. 5A-5O illustrate exemplary user interfaces for accessing an application on a locked device in accordance with some embodiments.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Phone 138, which may include an indicator 414 of the number of missed calls or voicemail messages;
  E-mail client 140, which may include an indicator 410 of the number of unread e-mails;
  Browser 147; and
  Video and music player 152, also referred to as iPod (trademark of Apple Inc.) module 152; and
Icons for other applications, such as:
  IM 141;
  Image management 144;
  Camera 143;
  Weather 149-1;
  Stocks 149-2;
  Workout support 142;
  Calendar 148;
  Alarm clock 149-4;
  Map 154;

Notes 153;

Settings 412, which provides access to settings for device 100 and its various applications 136; and Online video module 155, also referred to as YouTube (trademark of Google Inc.) module 155.

Figure 4B:
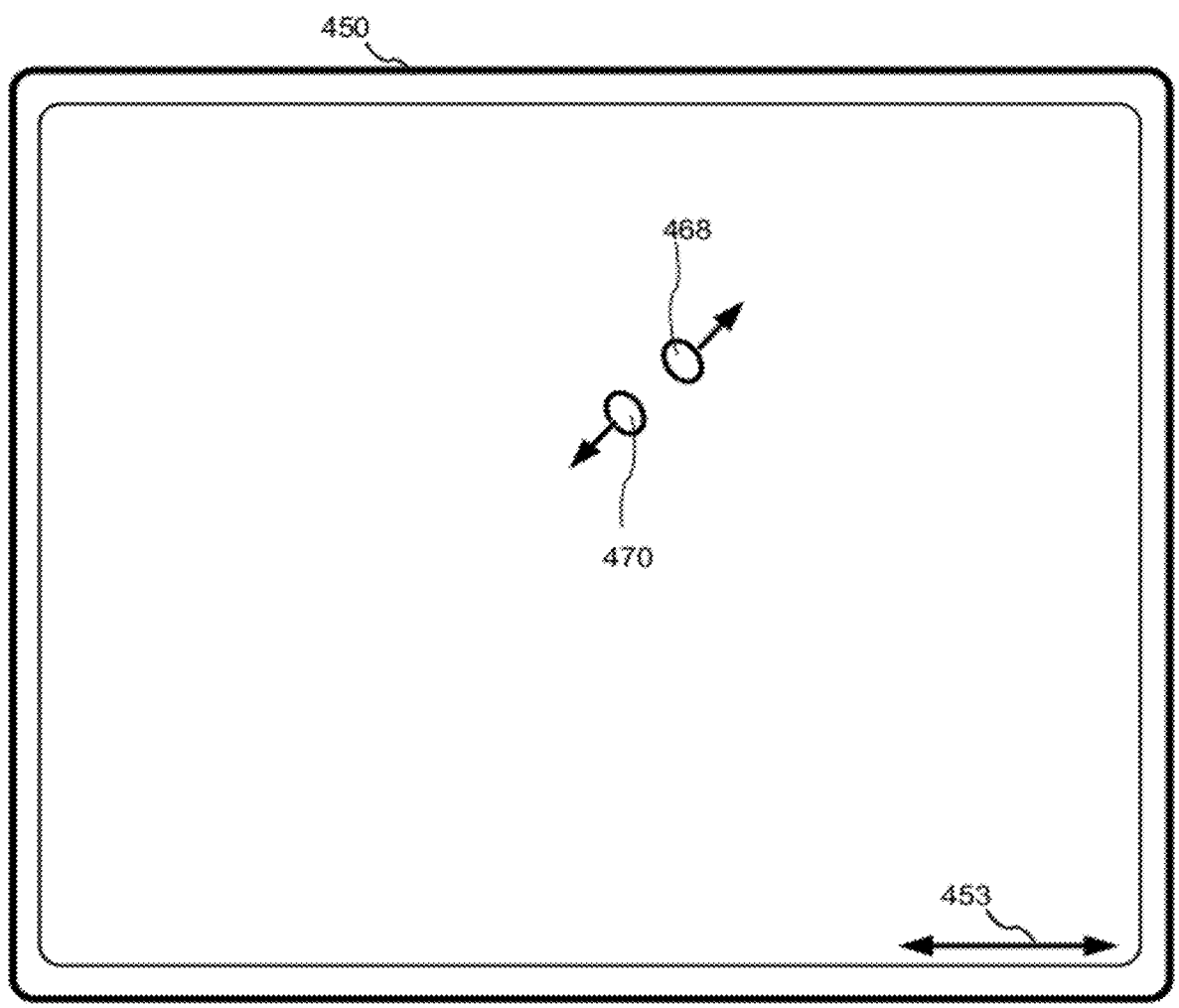
FIG. 4B illustrates an exemplary user interface for a multifunction device with a touch-sensitive surface that is separate from the display in accordance with some embodiments.
Figure 4B:
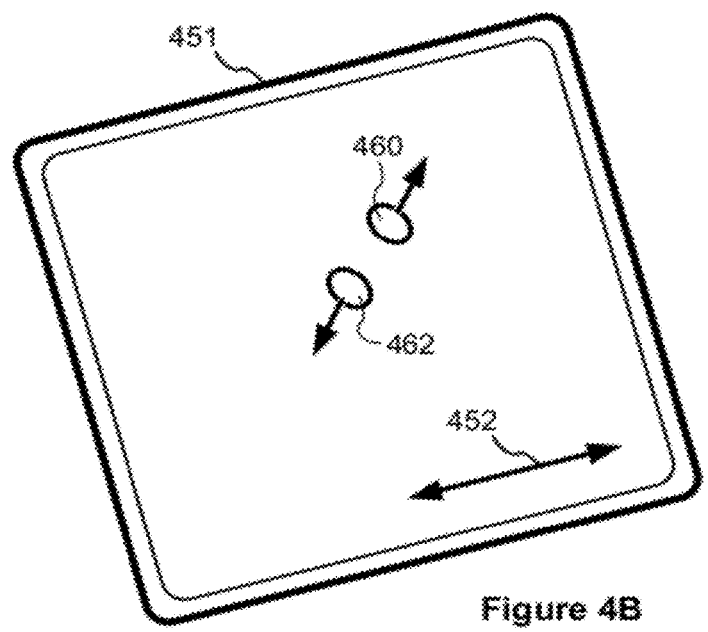

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Although many of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods may be used for other user interfaces described herein.

User Interfaces and Associated Processes

Attention is now directed towards embodiments of user interfaces ("UI") and associated processes that may be implemented on an electronic device with a display and a touch-sensitive surface, such as device 300 or portable multifunction device 100.

FIGS. 5A-5O illustrate exemplary user interfaces for accessing an application on a locked device in accordance with some embodiments. The user interfaces in these figures are used to illustrate the processes described below, including the processes in FIGS. 7A-7C and 8.

FIG. 5A illustrates locked device interface 500-A displayed on touch screen 112 of device 100. Locked device interface 500-A may be displayed when a physical button (e.g., push button 206, home or menu button 204) on device 100 is activated by a user while device 100 is in a locked state. Locked device interface 500-A may include a message informing the users that the device is locked and other information.

Figure 5B:
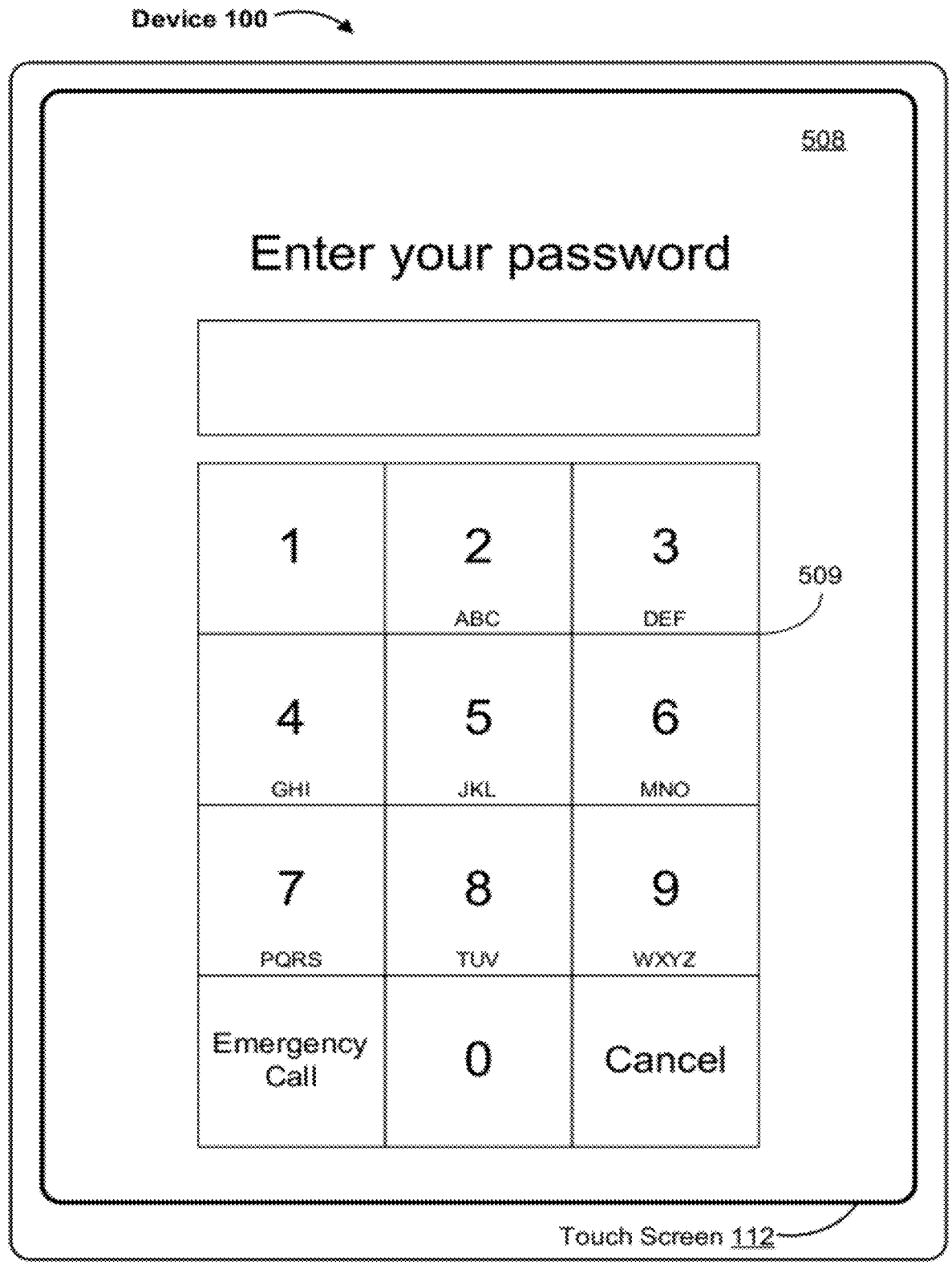

Locked device interface 500-A may also include user interface objects for unlocking the device or accessing one or more applications. For example, locked device interface 500-A includes unlock image object 502 in virtual channel 504. Device 100 may be unlocked by dragging unlock image object 502 across channel 504, from one end to the other, using a gesture (e.g., dragging gesture 505). If device 100 is password-protected, when object 502 is dragged across channel 504, password entry user interface 508 is displayed, as shown in FIG. 5B. The user may use keypad 509 to enter a password. If the correct password is entered, device 100 is unlocked and a user interface with a menu of applications (e.g., user interface 400, FIG. 4A) is displayed on touch screen 112.

Figure 5C:
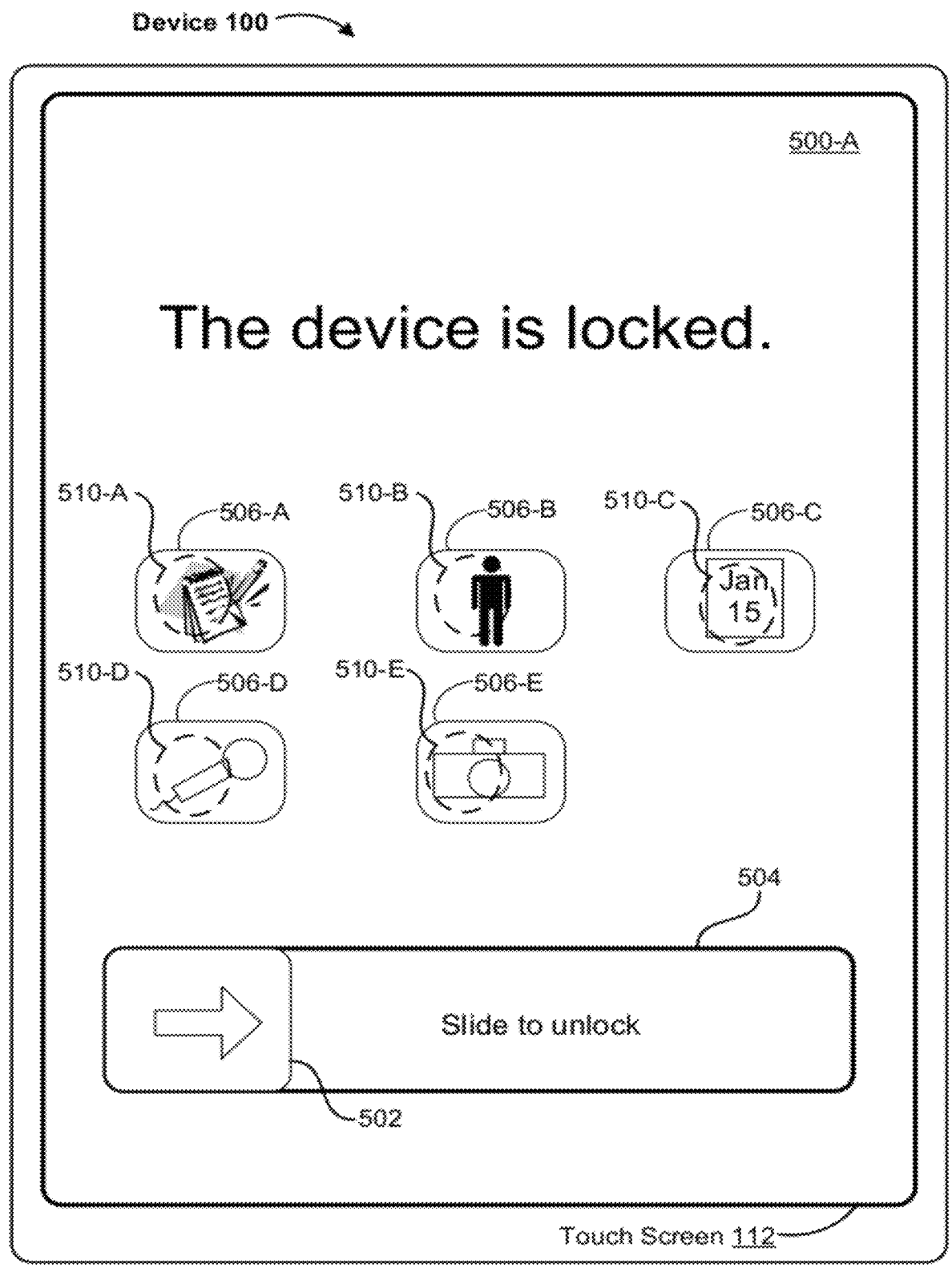

Returning to FIG. 5A and referring to FIG. 5C as well, also displayed in locked device interface 500-A are multiple icons 506 corresponding to respective applications. These respective applications are particular applications (e.g., contacts 137, calendar 148, notes 153, camera 143, voice/audio recorder application 163 (e.g., a "voice memos" application)) that may be accessed in a restricted session or restricted mode while device 100 is locked (and thus device 100 remains locked with respect to the other applications). When a respective application is accessed in a restricted session or restricted mode, the application may have different and/or reduced functionality and/or rights than when the application is accessed while device 100 is unlocked.

In FIGS. 5A and 5C, icon 506-A corresponds to notes application 153. Icon 506-B corresponds to contacts application 137. Icon 506-C corresponds to calendar application 148. Icon 506-D corresponds to voice/audio recorder application 163. Icon 510-E corresponds to camera application 143.

A respective application icon 506 may be activated by performance of a gesture (e.g., a tap gesture) on the respective icon 506. In response to the detection of a gesture on a respective icon 506, device 100 starts a restricted session for the corresponding application and password entry interface 508 is bypassed.

Figure 5D:
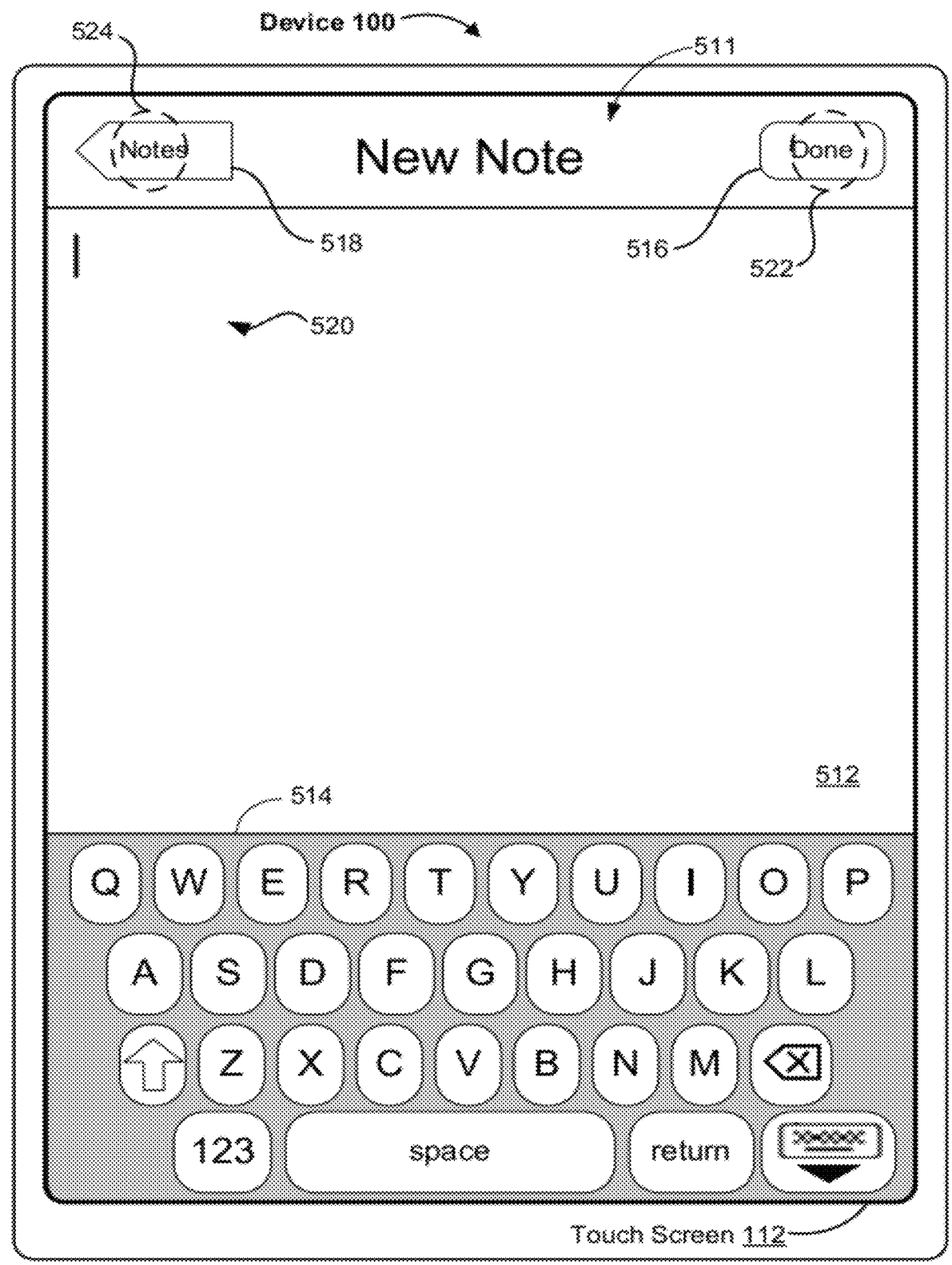

For example, in response to the detection of gesture 510-A on icon 506-A (FIG. 5C), new note entry user interface 511 of notes application 153 is displayed on touch screen 112, as shown in FIG. 5D. New note entry user interface 511 includes text entry area 512 and keyboard 514. A user may enter a textual note using keyboard 514, and the entered text is displayed in text entry area 512. Also included in new note entry user interface 511 are navigation icon 518 and "done" icon 516. In some embodiments, when a gesture (e.g., gesture 522) is detected on "done" icon 516, keyboard 514 is dismissed so that the user can view more of the newly created note. In some embodiments, when a gesture (e.g., gesture 524) is detected on navigation icon 518, notes list interface 526 (FIG. 5E) of notes application 153 is displayed while still in the restricted session.

Notes list interface 526 includes a listing of zero or more notes 530 that are generated by notes application 153 (e.g., created or saved by notes application 153) and which satisfy one or more predefined presentation criteria. In response to selection of respective note 530 (e.g., by performing a gesture on the respective note 530 in notes list interface 526, such as a finger tap gesture), an interface similar to new note entry user interface 511 is displayed, where the contents of the respective note 530 are displayed in text entry area 512. Also included in notes list interface 526 is new item icon 528. In response to the detection of a gesture (e.g., gesture 532) on new note icon 528, new note entry user interface 511 is displayed while still in the restricted session and a new note may be created.

The notes 530 that are displayed or presented in notes list interface 526 satisfy one or more predefined presentation criteria. In some embodiments, the presentation criterion is that a note, in order to be presented in notes list interface 526, and thus viewable and/or editable in notes application 153 while in the restricted session, must be generated by notes application 153 while in a restricted session. In other words, only notes generated in notes application 153 in a restricted session (i.e., created in notes application 153 while device 100 is locked with respect to the other applications) are presented in notes list interface 526 while in the restricted session, whereas notes generated in notes application 153 while device 100 is unlocked are not presented in notes list interface 526, and thus are inaccessible for viewing or editing while in the restricted session. Notes generated in any restricted session are accessible for viewing and editing in notes application 153 while device 100 is unlocked.

In some embodiments, the presentation criterion goes further, in that the note must be generated in the current restricted session. Notes generated in a prior restricted session are not presented in notes list interface 526.

Figure 5E:
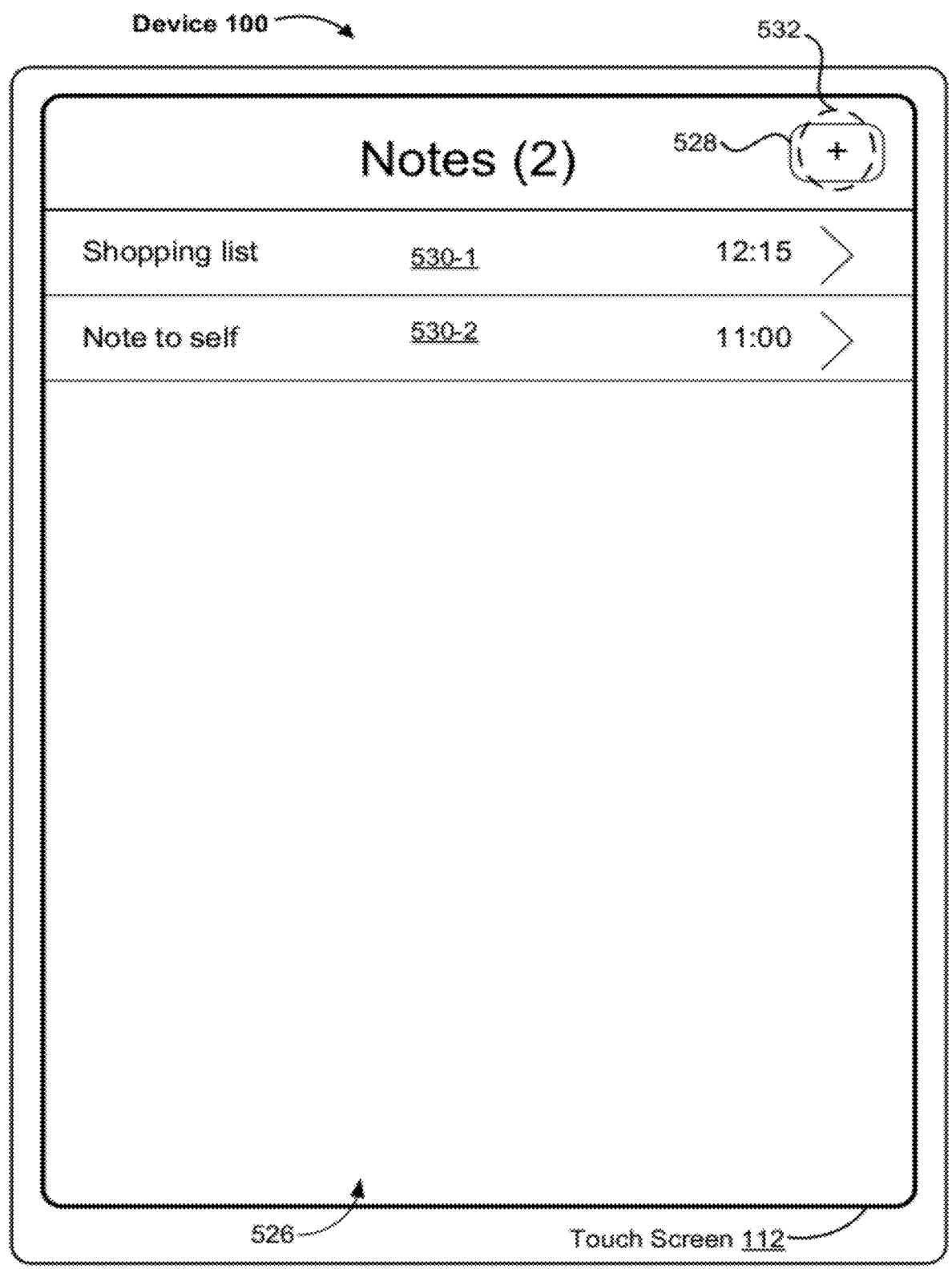

The notes application 153 may be deactivated, and the restricted session ended, by activating, for example, push button 206 or home/menu button 204 while new note entry user interface 511 or notes list interface 526 is displayed in the restricted session, as in FIGS. 5D and 5E, respectively. In response to activation of push button 206 or home/menu button 204, the restricted session is ended and device 100 is locked with respect to notes application 153 as well as the other applications. Activation of push button 206 or home/menu button 204 while device 100 is locked results in the display of locked device interface 500-A, as in FIG. 5A or 5C.

Figure 5F:
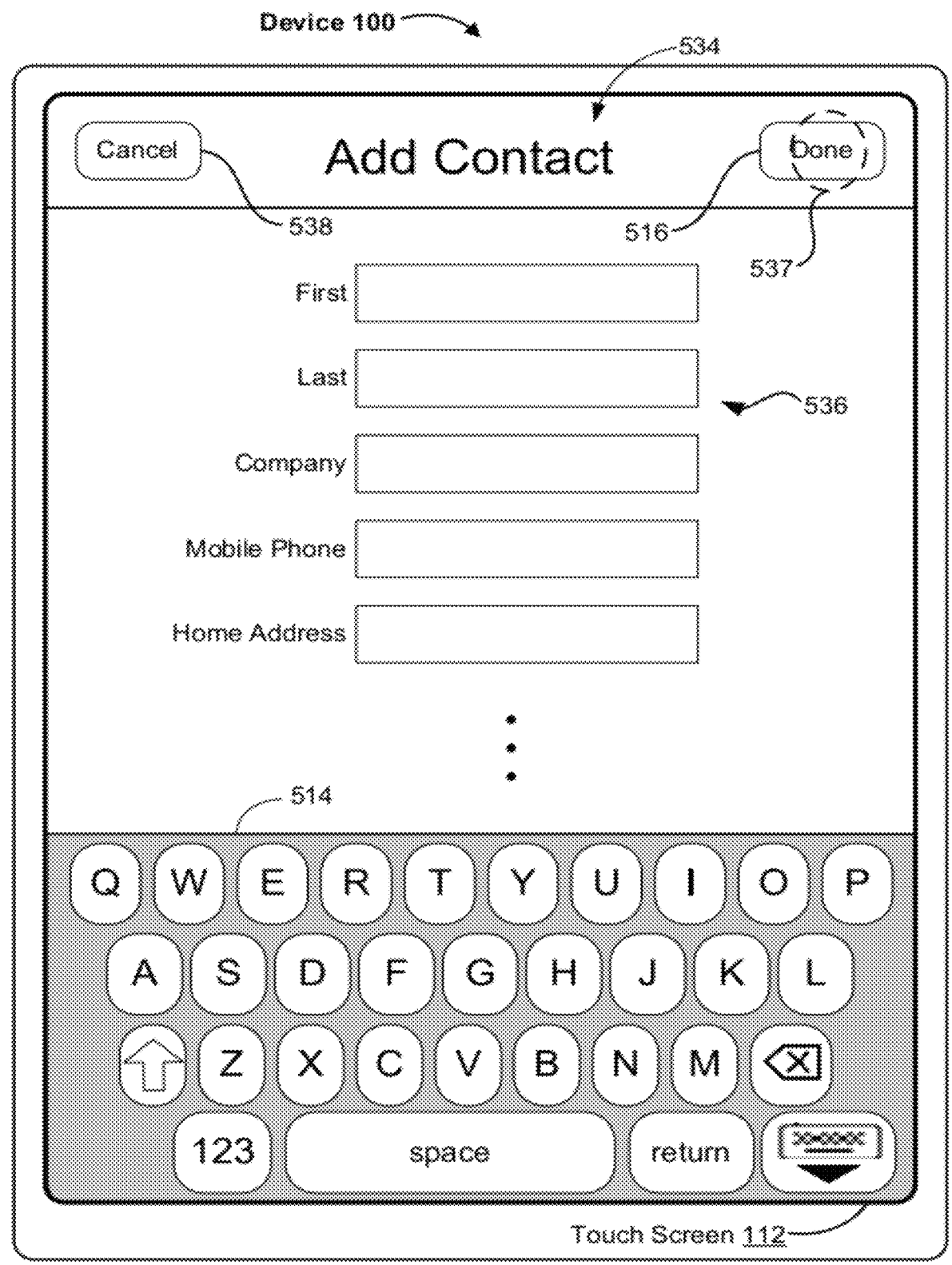

Returning to FIG. 5C, in response to the detection of gesture 510-B on icon 506-B, new contact entry user interface 534 of contacts application 137 is displayed on touch screen 112, as shown in FIG. 5F. New contact entry user interface 534 includes multiple fields 536 corresponding to various items of contact information and keyboard 514. A user may enter information into a field 536 using keyboard 514. Also included in new contact entry user interface 534 are "cancel" icon 538 and "done" icon 516. In some embodiments, when a gesture (e.g., gesture 537) is detected on "done" icon 516, in response to the detection of the gesture on "done" icon 516, information entered into fields 536 are saved as a contact in contacts application 137, and the newly made contact or contact list interface 540 of contacts application 137 (FIG. 5G) is displayed while still in the restricted session. When a gesture is detected on cancel icon 538, information entered into fields 536 is not saved (i.e., new contact creation is cancelled). In some embodiments, in response to the gesture on cancel icon 538, contact list interface 540 of contacts application 137 is displayed while still in the restricted session. In some other embodiments, in response to the gesture on cancel icon 538, contacts application 137 is deactivated and the restricted session is ended.

Contact list interface 540 in the restricted session includes a listing of zero or more contacts 542 that are generated by contacts application 137 (e.g., created or saved by contacts application 137) and which satisfy one or more predefined presentation criteria. In response to selection of a respective contact 542 (e.g., by performing a gesture on the respective contact 542 in contacts list interface 540), information for the respective contact 542 is displayed. Also included in contact list interface 540 is new item icon 528. In response to the detection of a gesture (e.g., gesture 544) on new item icon 528, new contact entry user interface 534 is displayed while still in the restricted session and a new contact may be created.

The contacts 542 that are displayed or presented in contact list interface 540 satisfy one or more predefined presentation criteria. In some embodiments, the presentation criterion is that a contact, in order to be presented in contact list interface 540, and thus viewable and/or editable in contacts application 137 while in the restricted session, must be generated by contacts application 137 while in a restricted session. In other words, only contacts generated in contacts application 137 in a restricted session (i.e., created in contacts application 137 while device 100 is locked with respect to the other applications) are presented in contact list interface 540 while in the restricted session, and contacts generated in contacts application 137 while device 100 is unlocked are not presented in contact list interface 540, and thus are inaccessible for viewing or editing while in a restricted session. Contacts generated in any restricted session are accessible for viewing and editing in contacts application 137 while device 100 is unlocked.

In some embodiments, the presentation criterion goes further, in that the contact must be generated in the current restricted session. Contacts generated in a prior restricted session are not presented in contact list interface 540.

Figure 5G:
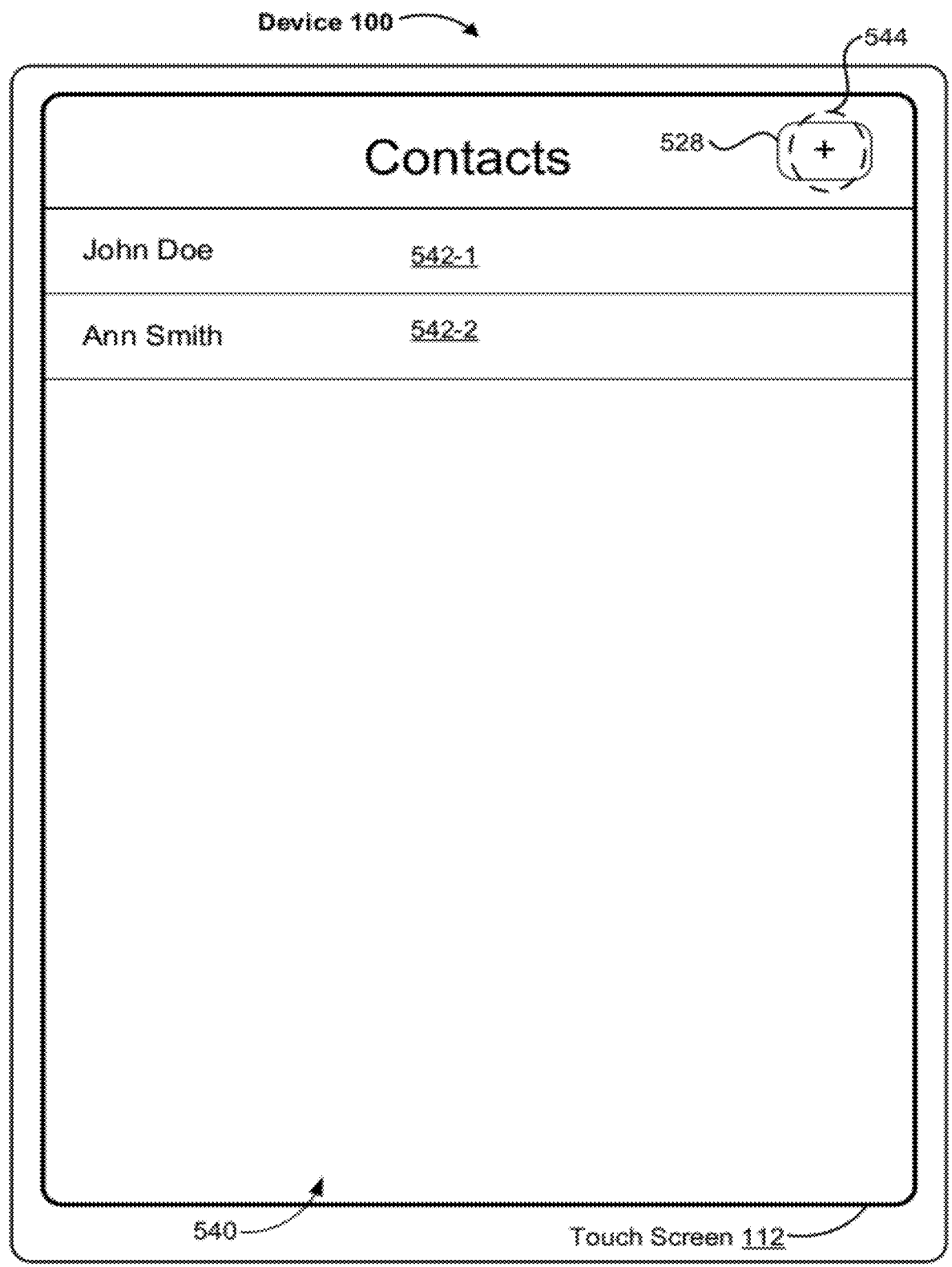

The contacts application 137 may be deactivated, and the restricted session ended, by activating, for example, push button 206 or home/menu button 204 while new contact entry user interface 534 or contact list interface 540 is displayed in the restricted session, as in FIGS. 5F and 5G, respectively. In response to activation of push button 206 or home/menu button 204, the restricted session is ended and device 100 is locked with respect to contacts application 137 as well as to other applications. Activation of push button 206 or home/menu button 204 while device 100 is locked results in the display of locked device interface 500-A, as in FIG. 5A or 5C.

Figure 5H:
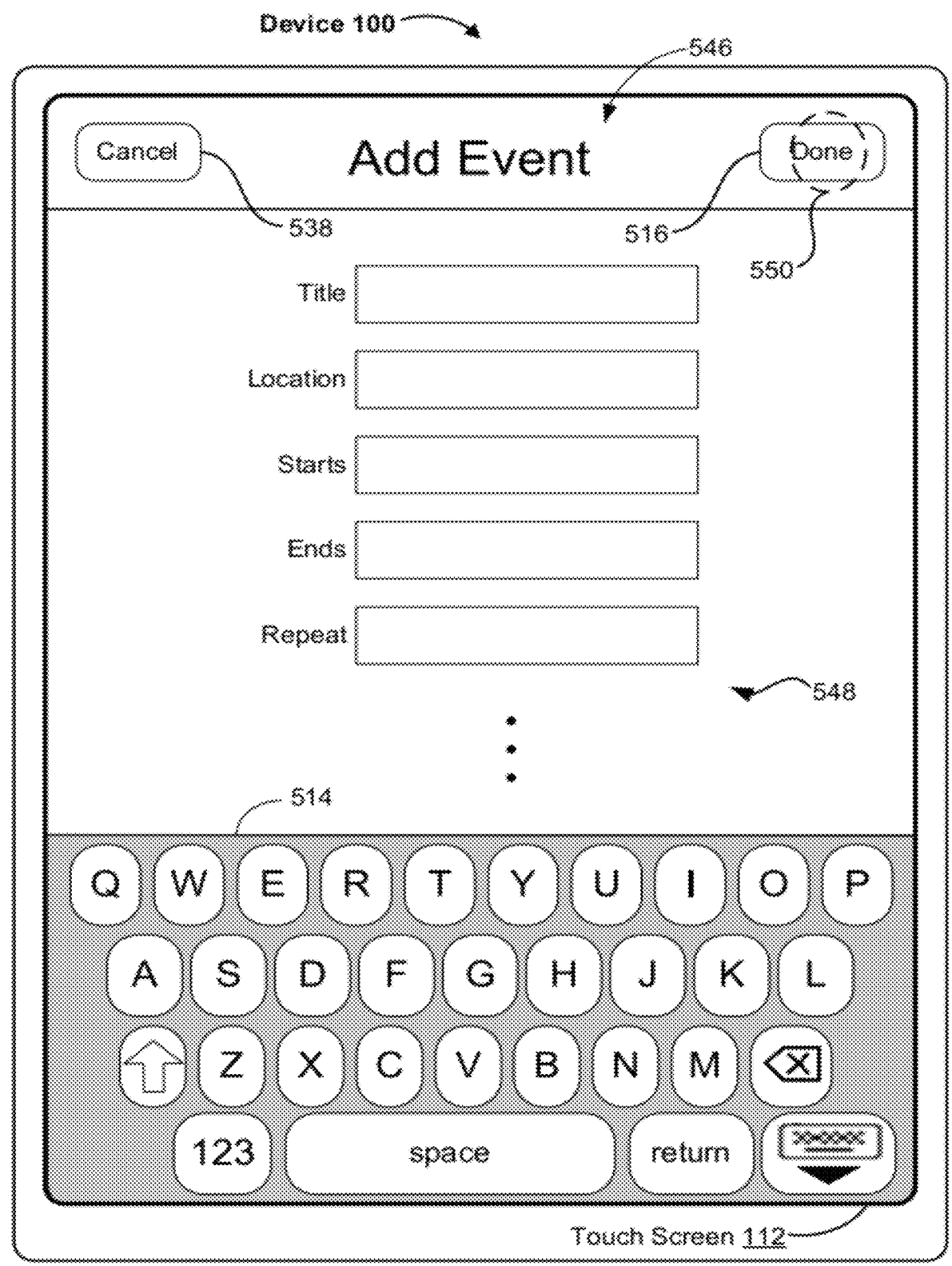

Returning to FIG. 5C, in response to the detection of gesture 510-C on icon 506-C, new calendar event user interface 546 of calendar application 148 is displayed on touch screen 112, as shown in FIG. 5H. New calendar event user interface 546 includes multiple fields 548 corresponding to various items of calendar event information and keyboard 514. A user may enter information into a field 548 using keyboard 514. Also included in new calendar event user interface 546 are "cancel" icon 538 and "done" icon 516. When a gesture (e.g., gesture 550) is detected on "done" icon 516, in response to the detection of the gesture on "done" icon 516, information entered into fields 548 are saved as a calendar event in calendar application 148, and the newly created calendar event or calendar events interface 552 (FIG. 5I) of calendar application 148 is displayed while still in the restricted session. When a gesture is detected on cancel icon 538, in response to the detection of the gesture on cancel icon 538, information entered into fields 548 is not saved (i.e., new calendar event creation is cancelled). In some embodiments, in response to the gesture on cancel icon 538, calendar events interface 552 of calendar application 148 is displayed while still in the restricted session. In some other embodiments, in response to the gesture on cancel icon 538, calendar application 148 is deactivated and the restricted session is ended.

Calendar events interface 552 includes a listing of zero or more calendar events 554 that are generated by calendar application 148 (e.g., created or saved by calendar application 148) and which satisfy one or more predefined presentation criteria. In response to selection of a respective event 554 (e.g., by performing a gesture on the respective event 554 in calendar events interface 552), information for the respective event 554 is displayed. Also included in calendar events interface 552 is new item icon 528. In response to the detection of a gesture (e.g., gesture 556) on new item icon 528, new calendar event user interface 546 is displayed while still in the restricted session and a new event may be created.

The events 554 that are displayed or presented in calendar events interface 552 satisfy one or more predefined presentation criteria. In some embodiments, the presentation criterion is that an event, in order to be presented in calendar events interface 552, and thus viewable and/or editable in calendar application 148 while in the restricted session, must be generated by calendar application 148 while in a restricted session. In other words, only events generated in calendar application 148 in a restricted session (i.e., created in calendar application 148 while device 100 is locked with respect to the other applications) are presented in calendar events interface 552 while in the restricted session, and events generated in calendar application 148 while device 100 is unlocked are not presented in calendar events interface 552, and thus are inaccessible for viewing or editing while in a restricted session. Events generated in any restricted session are accessible for viewing and editing in calendar application 148 while device 100 is unlocked.

In some embodiments, the presentation criterion goes further, in that the event must be generated in the current restricted session. Events generated in a prior restricted session are not presented in calendar events interface 552.

Figure 5I:
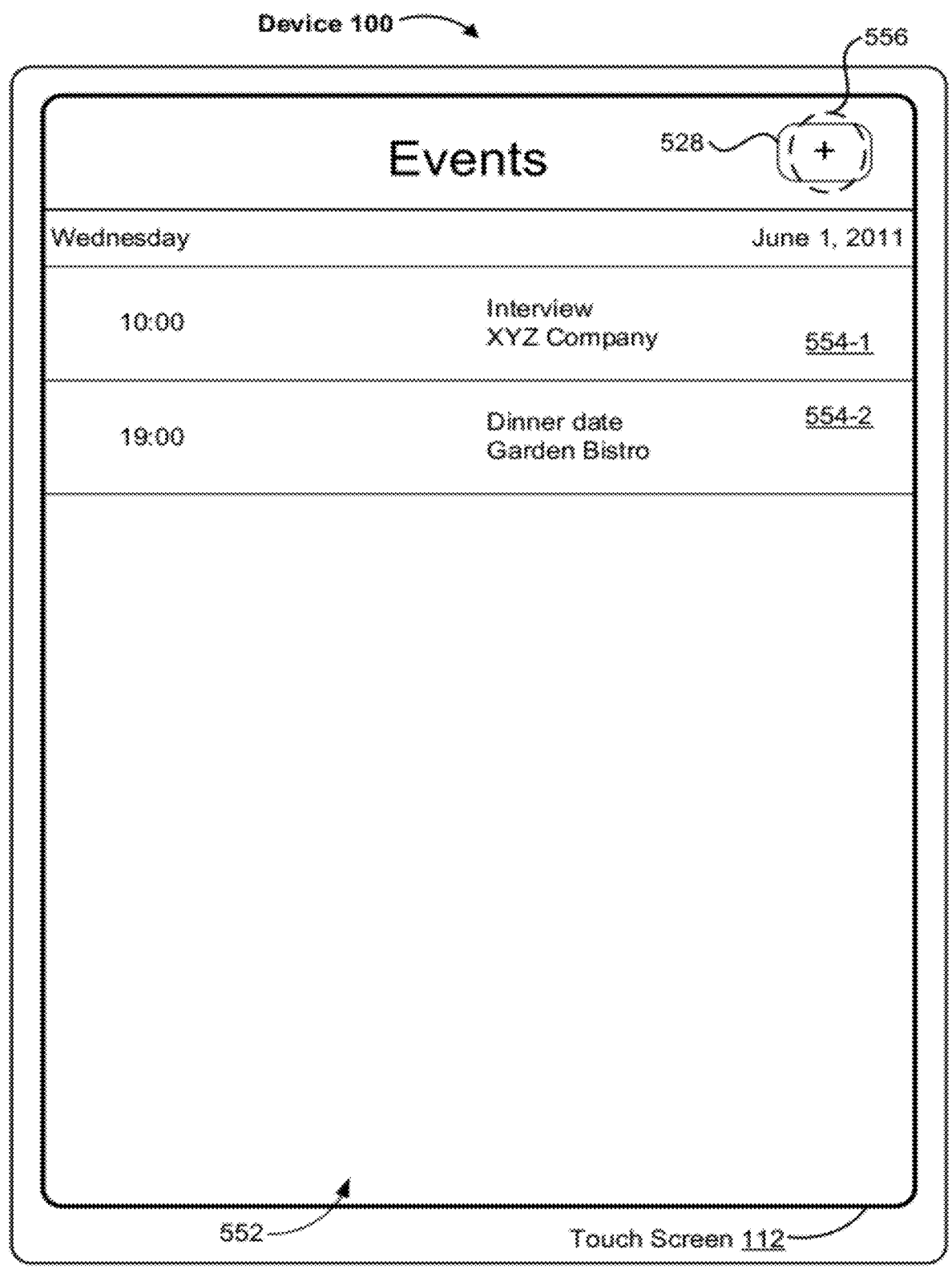

The calendar application 148 may be deactivated, and the restricted session ended, by activating, for example, push button 206 or home/menu button 204 while new calendar event user interface 546 or calendar events interface 552 is displayed in the restricted session, as in FIGS. 5H and 5I, respectively. In response to activation of push button 206 or home/menu button 204, the restricted session is ended and device 100 is locked with respect to calendar application 148 as well as to other applications. Activation of push button 206 or home/menu button 204 while device 100 is locked results in the display of locked device interface 500-A, as in FIG. 5A or 5C.

Figure 5J:
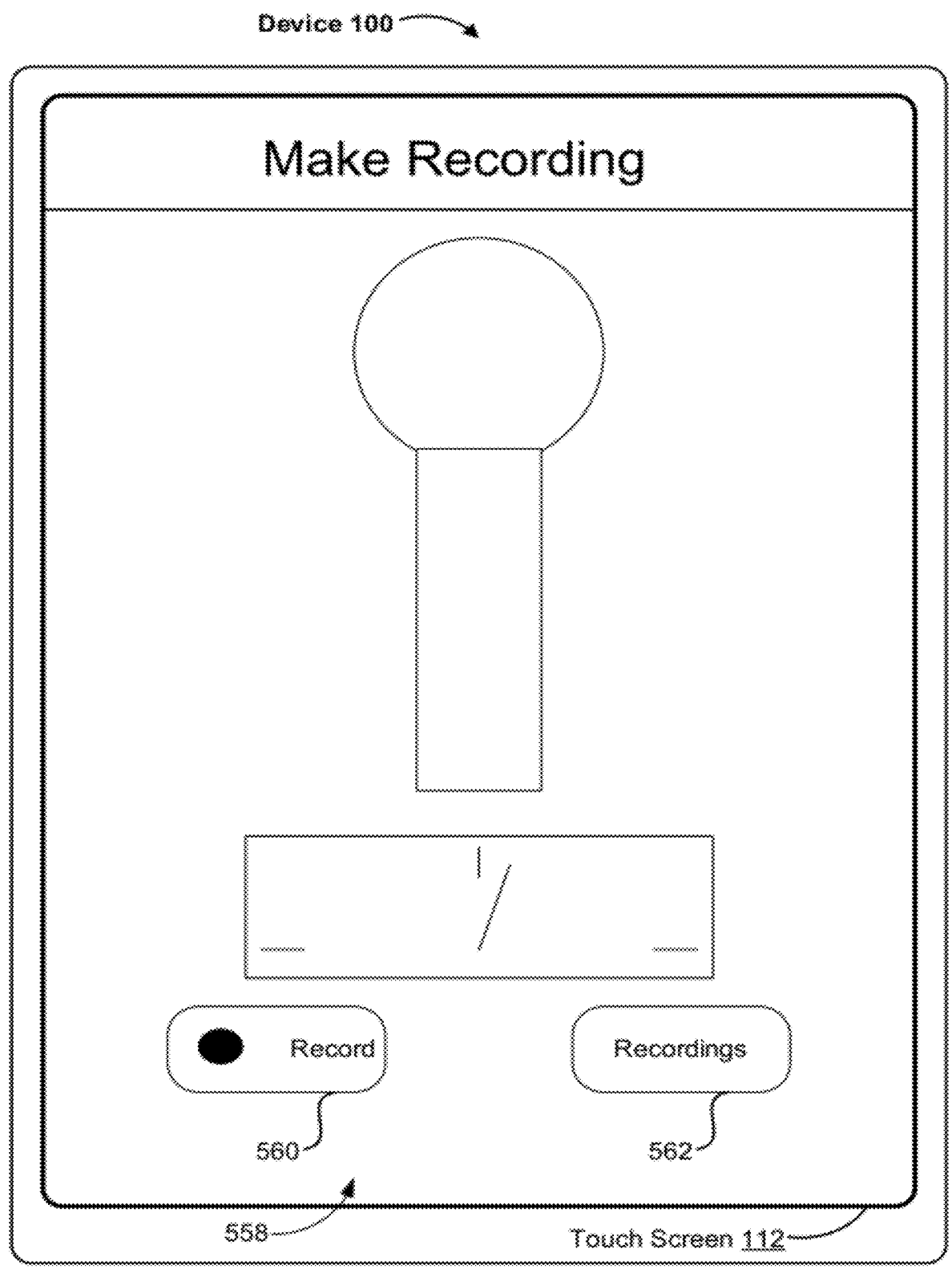

Returning to FIG. 5C, in response to the detection of gesture 510-D on icon 506-D, new voice recording user interface 558 of voice/audio recorder application 163 is displayed on touch screen 112, as shown in FIG. 5J. New voice recording user interface 558 includes "record" icon 560 and "recordings" icon 562. A user begins recording by performing a gesture (e.g., a tap gesture) on "record" icon 560 and then begin speaking or making sounds. The "record" icon 560 becomes a pause icon and "recordings" icon becomes a stop icon. The user may pause the recording by performing a gesture on the pause icon. The user may stop the recording (and save the recording as an audio file) by performing a gesture on the stop icon, at which point the pause and stop icons revert back to "record" icon 560 and "recordings" icon 562, respectively.

Figure 5K:
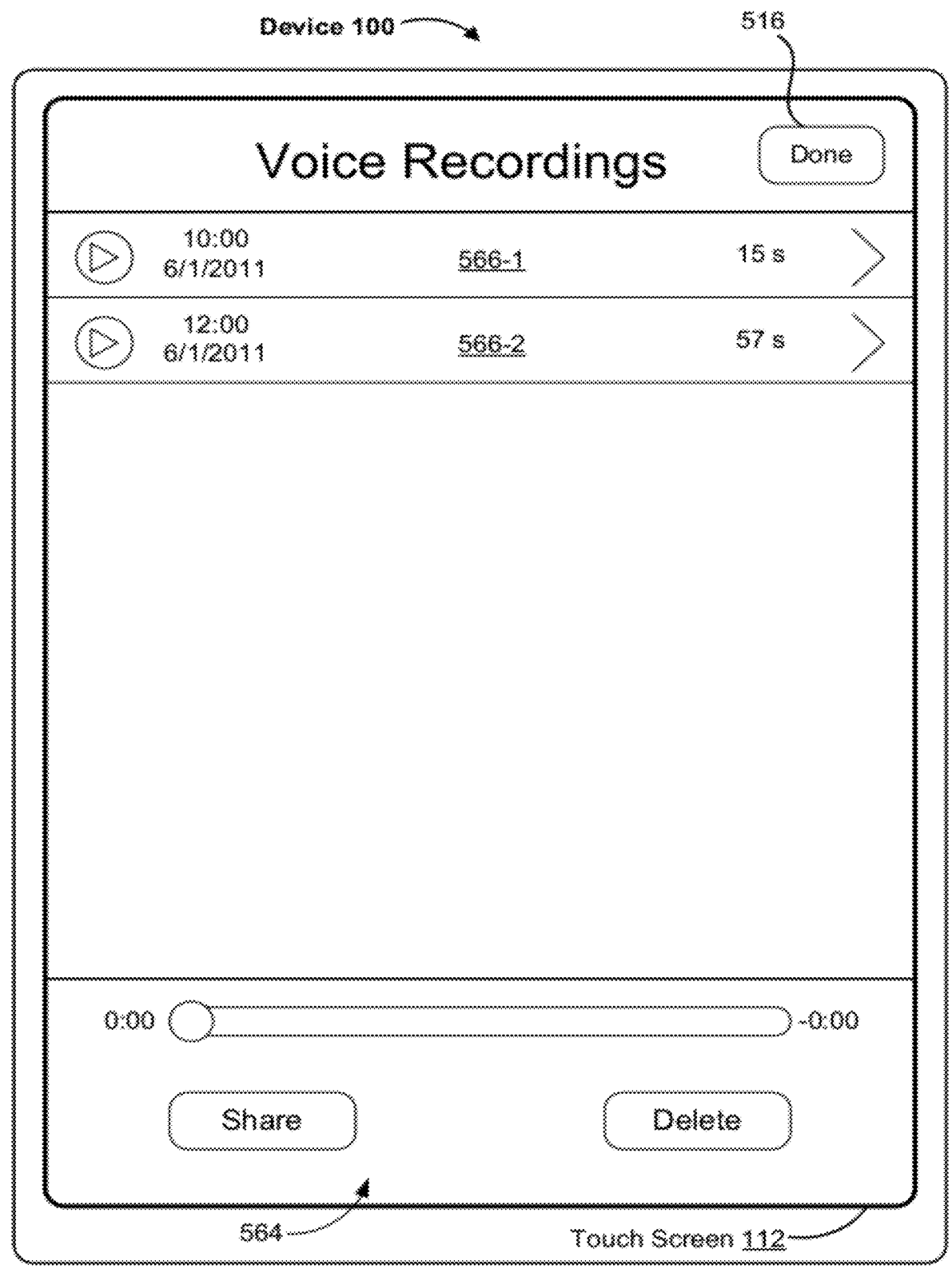

When a gesture (e.g., a tap gesture) is detected on "recordings" icon 562, in response to the detection of the gesture on "recordings" icon 562, recordings interface 564 of voice/audio recorder application 163 is displayed while still in the restricted session, as shown in FIG. 5K.

Recordings interface 564 includes a listing of zero or more recordings 566 that are generated by voice/audio recorder application 163 (e.g., created or saved by voice/audio recorder application 163) and which satisfy one or more predefined presentation criteria. In response to selection of a respective recording 566 (e.g., by performing a gesture on the respective recording 566 in recordings interface 564), the respective recording 566 may be played back, shared, or deleted. Also included in recordings interface 564 is "done" icon 516. In response to the detection of a gesture (e.g., a tap gesture) on "done" icon 516, new voice recording user interface 558 is displayed while still in the restricted session and a new recording may be created.

The recordings 566 that are displayed or presented in recordings interface 564 satisfy one or more predefined presentation criteria. In some embodiments, the presentation criterion is that a recording, in order to be presented in recordings interface 564, and thus viewable or editable in voice/audio recorder application 163 while in the restricted session, must be generated by voice/audio recorder application 163 while in a restricted session. In other words, only recordings generated in voice/audio recorder application 163 in a restricted session (i.e., created in voice/audio recorder application 163 while device 100 is locked with respect to the other applications) are presented in recordings interface 564 while in the restricted session, and recordings generated in voice/audio recorder application 163 while device 100 is unlocked are not presented in recordings interface 564, and thus are inaccessible for playback or other manipulation while in a restricted session. Recordings generated in any restricted session are accessible for playback or other manipulation in voice/audio recorder application 163 while device 100 is unlocked.

In some embodiments, the presentation criterion goes further, in that the recording must be generated in the current restricted session. Recordings generated in a prior restricted session are not presented in recordings interface 564.

Voice/audio recorder application 163 may be deactivated, and the restricted session ended, by activating, for example, push button 206 or home/menu button 204 while new voice recording user interface 558 or recordings interface 564 is displayed in the restricted session, as in FIGS. 5J and 5K, respectively. In response to activation of push button 206 or home/menu button 204, the restricted session is ended and device 100 is locked with respect to voice/audio recorder application 163 as well as to other applications. Activation of push button 206 or home/menu button 204 while device 100 is locked results in the display of locked device interface 500-A, as in FIG. 5A or 5C.

Figure 5L:
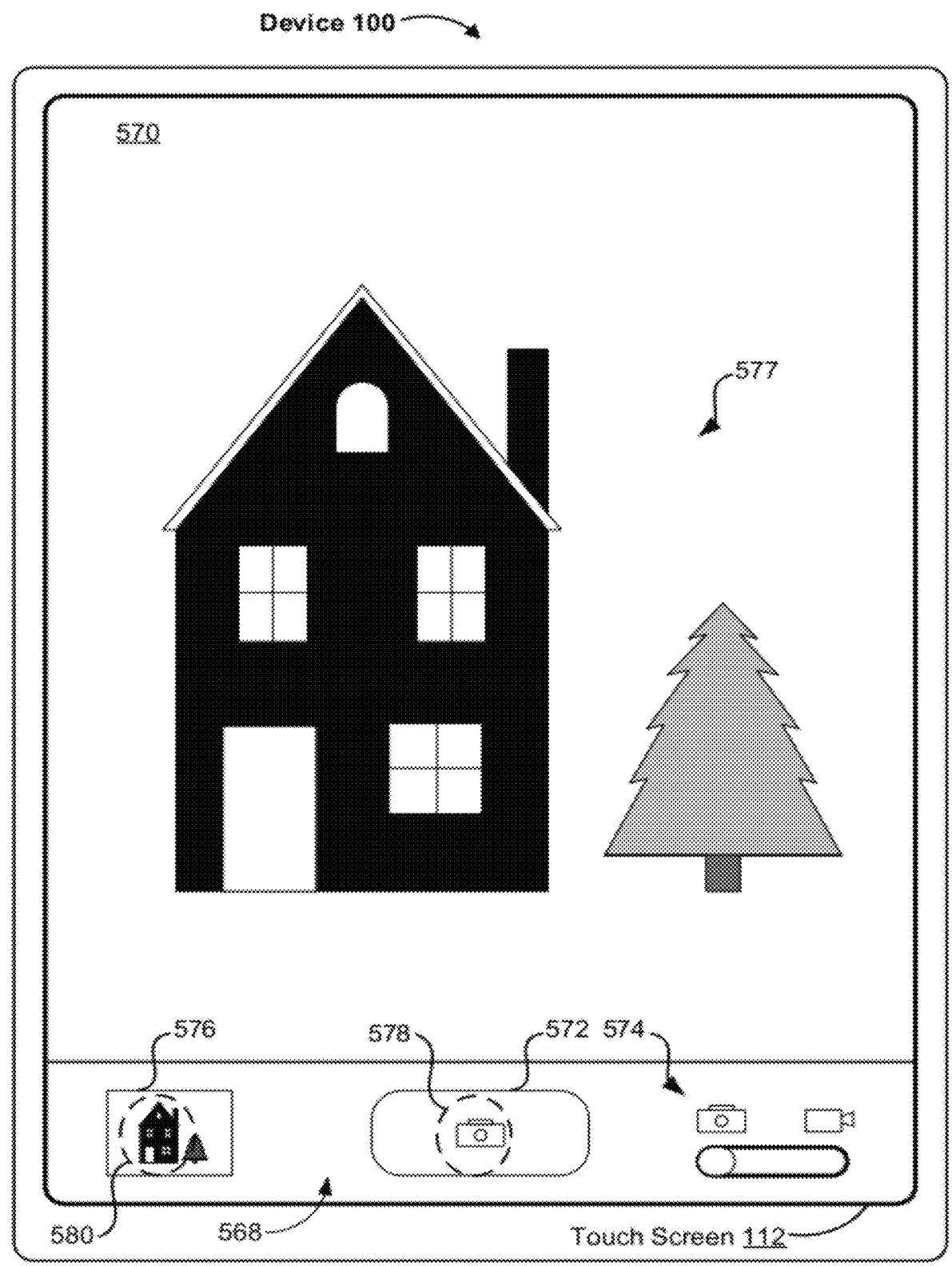

Returning to FIG. 5C, in response to the detection of gesture 510-E on icon 506-E, camera interface 568 of camera application 143 is displayed on touch screen 112, as shown in FIG. 5L. Camera interface 568 includes viewfinder area 570, shutter icon 572, image/video toggle switch 574, and camera roll icon 576. When the camera interface 568 is activated, a live image preview 577 is displayed in viewfinder area 570. In response to the detection of gesture (e.g., gesture 578) on shutter icon 572, a still image is captured and saved into camera roll 159, and a thumbnail preview of the just-captured image is displayed in camera roll icon 576. In response to activation of toggle switch 572, camera application 143 switches between still image capture mode and video capture mode (while still in the restricted session).

Figure 5M:
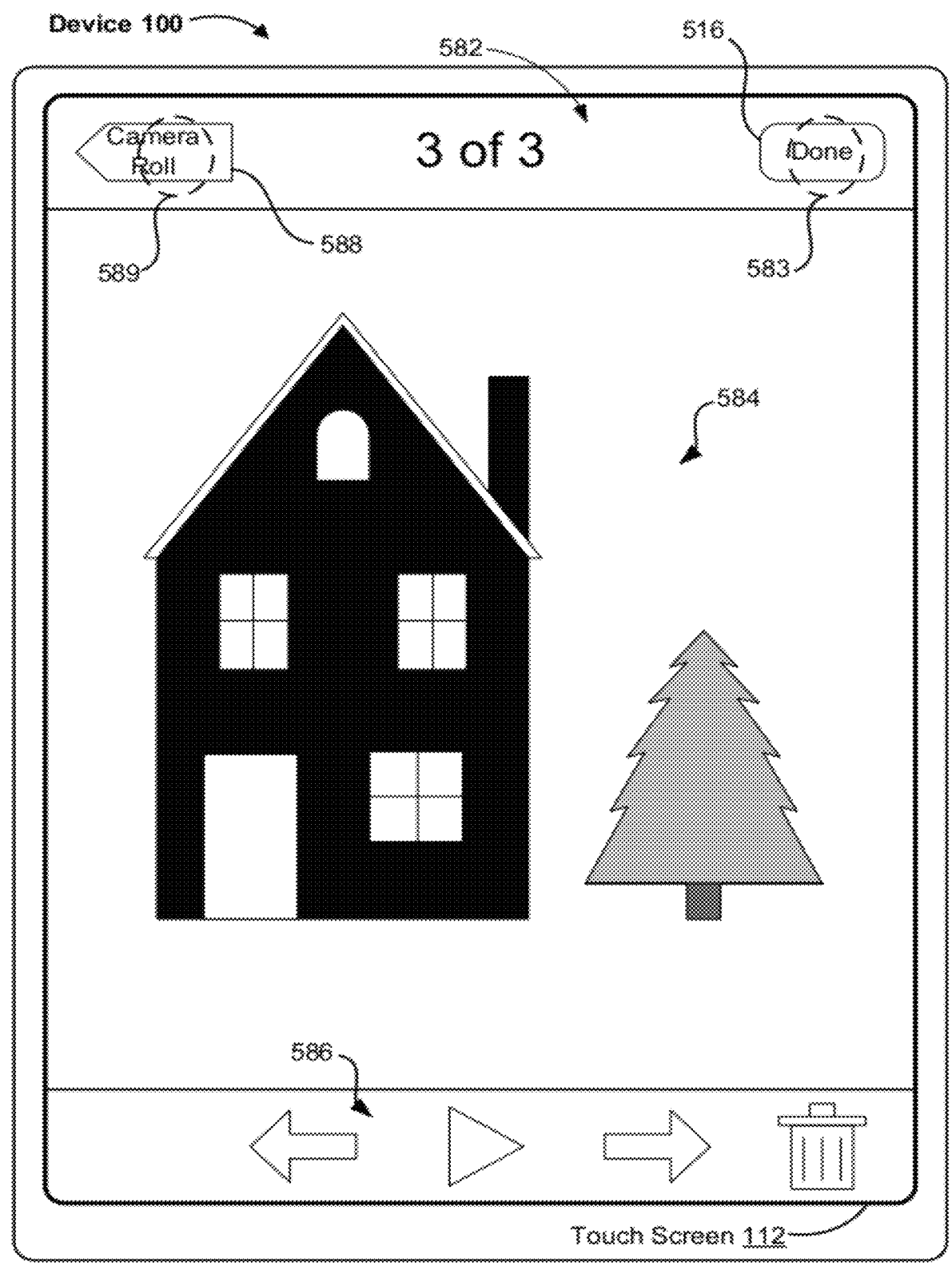

In response to the detection of a gesture (e.g., gesture 580) on camera roll icon 576, camera roll image viewer interface 582 of camera application 143 is displayed along with the image(s) 584 in camera roll 159 that satisfy one or more predefined presentation criteria, as shown in FIG. 5M. Camera roll image viewer interface 582 includes controls 586 for browsing through images in camera roll 159 that satisfy the presentation criteria, starting a slideshow of said images, or deleting a currently displayed image. Camera roll image viewer interface 582 also includes "done" icon 516 and navigation icon 588. In response to the detection of a gesture (e.g., gesture 583) on "done" icon 516, display of camera roll image viewer interface 582 is replaced by display of camera interface 568, as in FIG. 5L. In response to the detection of a gesture (e.g., gesture 589) on navigation icon 588, display of camera roll image viewer interface 582 is replaced by display of camera roll thumbnails interface 590 of camera application 143, as shown in FIG. 5N.

Camera roll thumbnails interface 590 includes zero or more thumbnails 592 of images in camera roll 159 that are captured by camera application 143 and which satisfy the one or more predefined presentation criteria. In response to selection of a thumbnail 592 (e.g., by performing a gesture on the respective thumbnail 592 in thumbnails interface 590), the image corresponding to the selected thumbnail 592 is displayed in camera roll image viewer interface 582. Also included in thumbnails interface 590 are "done" icon 516 and type selection icons 594. In response to the detection of a gesture (e.g., a tap gesture) on "done" icon 516, camera interface 568 is displayed while still in the restricted session and a new image may be captured. In response to selection of a type selection icon ("all," "photos," "videos"), thumbnails 592 displayed in thumbnails interface 590 may be switched amongst both photos (still images) and videos, just photos, or just videos.

The images (e.g., image 584) and thumbnails 592 that are displayed or presented in image viewer interface 582 and thumbnails interface 590, respectively, satisfy one or more predefined presentation criteria. In some embodiments, the presentation criterion is that an image (or for a thumbnail, the image corresponding to the thumbnail), in order to be presented in image viewer interface 582 and thumbnails interface 590 while in the restricted session, must be generated (captured) by camera application 143 while in a restricted session. In other words, only images captured in camera application 143 in a restricted session (i.e., captured in camera application 143 while device 100 is locked with respect to the other applications) and corresponding thumbnails are presented in image viewer interface 582 and thumbnails interface 590, respectively, while in the restricted session, and images generated in camera application 143 while device 100 is unlocked and corresponding thumbnails are not presented in image viewer interface 582 and thumbnails interface 590, and thus are inaccessible for viewing while in a restricted session. Images captured in any restricted session, and corresponding thumbnails, are accessible for viewing in camera application 143 while device 100 is unlocked. The presentation criteria are further described below with reference to FIG. 6.

Figure 5N:
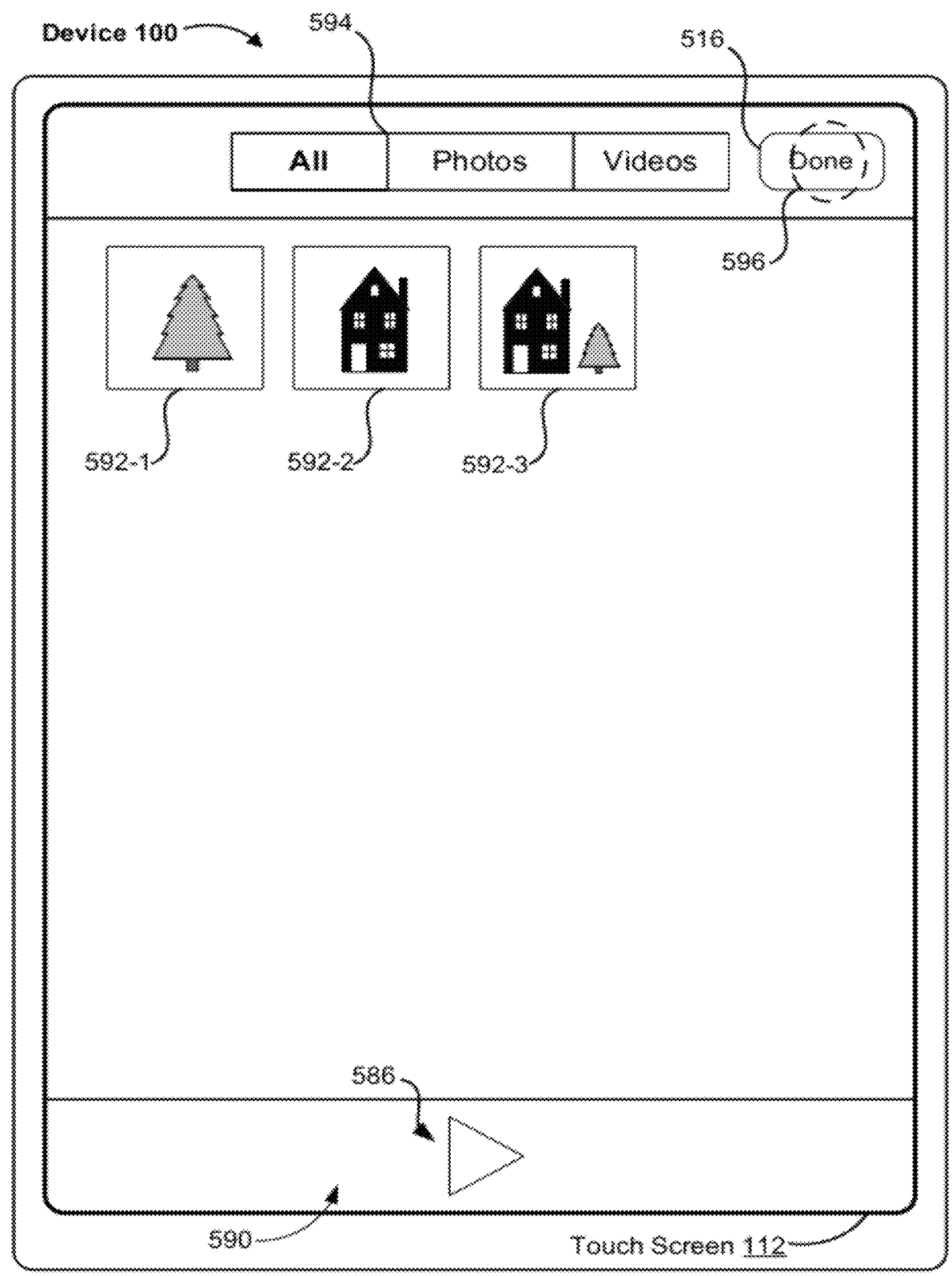
Figure 5O:
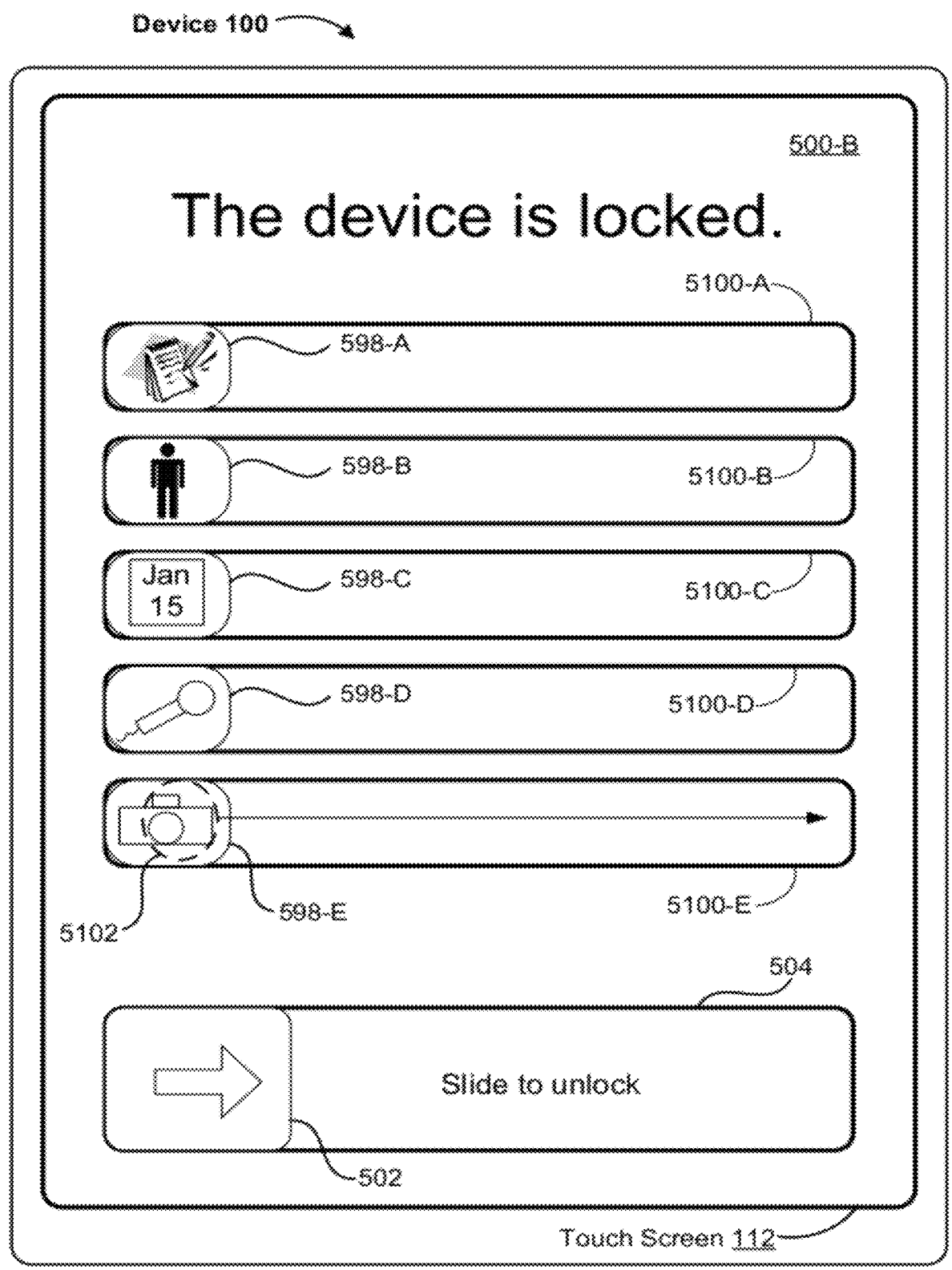

Camera application 143 may be deactivated, and the restricted session ended, by activating, for example, push button 206 or home/menu button 204 while image viewer interface 582 or thumbnails interface 590 is displayed in the restricted session, as in FIGS. 5M and 5N, respectively. In response to activation of push button 206 or home/menu button 204, the restricted session is ended and device 100 is locked with respect to camera application 143 as well as to other applications. Activation of push button 206 or home/menu button 204 while device 100 is locked results in the display of locked device interface 500-A, as in FIG. 5A or 5C.

It should be appreciated that while FIGS. 5L thru 5N were described above with respect to still images, the description of these figures apply analogously to videos.

Depending on the embodiment, the icons or buttons for accessing applications from locked device screen 500 may be presented in other ways, and/or the procedure for accessing the applications in restricted sessions varies. For example, FIG. 5O illustrates an alternative locked device screen 500-B. Icons corresponding to notes application 153, contacts application 137, calendar application 148, voice/audio recorder application 163, and camera application 143 are slider objects 598-A thru 598-E, respectively, in channels 5100-A thru 5100-E, respectively. To access an application from locked device screen 500-B, the corresponding slider object is dragged across its corresponding channel. For example, gesture 5102 is detected dragging slider object 598-E, corresponding to camera application 143, across channel 5100-E. In response to completion of the dragging, camera interface 568 is displayed as in FIG. 5L. In some other embodiments, other ways of presenting the icons and/or of accessing the applications from the locked device screen include presenting the icons corresponding to the applications as icons that change slider object 502 into a slider object for activating a corresponding application.

In some embodiments, when locked device screen 500-A or 500-B is displayed, icons 506 (FIG. 5A) or slider objects 598 (FIG. 5O), respectively, may be hidden pending additional input. For example, home/menu button 204 may be pressed twice (e.g., as in a double click) to activate display of icons 506 or slider objects 598.

In some embodiments, more or less icons 506 may be displayed in locked device interface 500-A than as shown in FIG. 5A or 5C. For example, a user may, in an options configuration interface, specify which applications are to be accessible when device 100 is locked, and thus the corresponding icons are displayed in locked device interface 500-A.

Figure 6:
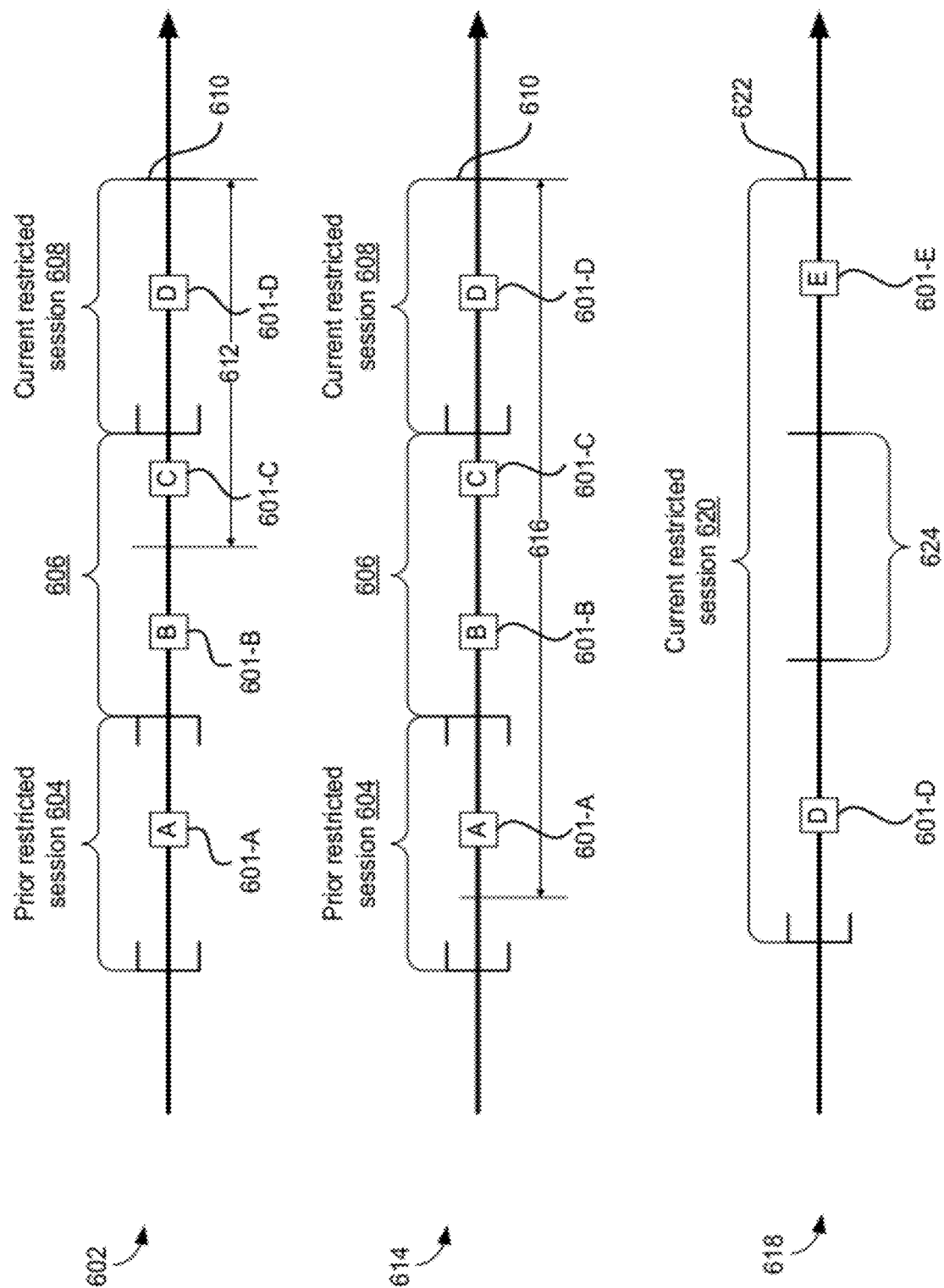
FIG. 6 illustrates example timelines of content generation in a restricted application in accordance with some embodiments.

FIG. 6 illustrates example timelines of image captures and presentation criteria, in accordance with some embodiments. As described above, when an application is in the restricted session, only content (e.g., images, calendar events, contacts, notes, voice recordings, etc.) captured by the application that satisfies one or more predefined presentation criteria are accessible. The timelines depicted in FIG. 6 help illustrate the application of the presentation criteria. For sake of convenience, the timelines depicted in FIG. 6 will be described with respect to capture of still images using camera application 143, but it should be appreciated that the description applies analogously to other content as well.

Timeline 602 includes current restricted session 608 for camera application 143, prior restricted session 604 for camera application 143, and period 606 during which camera application 143 was accessed while device 100 was unlocked (i.e., camera application 143 was accessed without the limitations of a restricted session) or was inactive. The current time is marked as time 610 in current restricted session 608. Images 601-A thru 601-D were captured at various times as shown in timeline 602.

In some embodiments, the presentation criterion is that an image must be captured during any restricted session in order to be accessible in the current restricted session. Under this criterion, images 601-B and 601-C are inaccessible at current time 610 as they were captured outside of a restricted session.

In some embodiments the criterion is that an image must be captured during the current restricted session in order to be accessible in the current restricted session. Under this criterion, images 601-A thru 601-C are inaccessible at current time 610 as they were captured outside of the current restricted session.

In some embodiments, the criterion is that an image must be captured within a predefined amount of time from current time 610, regardless of whether the image was captured in a restricted session or not, in order to be accessible in the current restricted session. In timeline 602, the predefined amount of time is interval 612. Under this criterion, in timeline 602, images 601-C and 601-D are accessible at current time 610 but images 601-A and 601-B are not. If the predefined amount of time is longer, as in timeline 614, which is the same as timeline 602 except that interval 612 is replaced by longer interval 616, then images 601-A thru 601-D are all accessible.

In some embodiments, the criteria are that an image must be captured within a predefined amount of time from current time 610 and be captured in a restricted session, in order to be accessible in the current restricted session. Under these criteria, in timeline 602, images 601-A thru 601-C are inaccessible at current time 610. In timeline 614, images 601-B and 601-C are inaccessible at current time 610.

In some embodiments, the criteria are that an image must be captured within a predefined amount of time from current time 610 and be captured in the current restricted session, in order to be accessible in the current restricted session. Under these criteria, in timeline 602 or 614 images 601-A thru image 601-C are inaccessible at current time 610.

In some embodiments, the criteria are that an image must be captured during the current restricted session and that a period of inactivity or idleness in camera application 143 after the image is captured is less than a predefined threshold. In timeline 618, images 601-D and 601-E were taken prior to current time 622 during current restricted session 620, and current restricted session 620 includes period of inactivity 624. Under the criteria, if period of inactivity 624 is greater than the predefined threshold, image 601-D is inaccessible at current time 622.

In some embodiments, in a restricted session an application has write-only rights and read rights are limited to content written (i.e., generated) in a restricted session. The criteria described above with respect to FIG. 6 may be viewed as additional limitations on the read rights.

FIGS. 7A-7C are flow diagrams illustrating a method 700 of accessing one restricted application in a plurality of restricted applications on a locked device in accordance with some embodiments. The method 700 is performed at an electronic device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 700 may be combined and/or the order of some operations may be changed.

As described below, the method 700 provides a way to access one of several applications on a locked device by bypassing the password protection on the device. The method reduces the number of inputs required on the user's part when accessing an application on a locked device, thereby creating a more efficient human-machine interface. Further, enabling a user to quickly access certain applications in a restricted session on a locked device allows the user to take advantage of content generation opportunities where time is critical, yet still maintains acceptable device security.

While the device is in a locked, passcode-protected state (702), the device displays a lock screen user interface on the display (704). The lock screen user interface includes a plurality of restricted application launch icons, and each restricted application launch icon corresponds to an application. In some embodiments, the passcode is a password entered in the device (e.g., via a keyboard). In some embodiments, the passcode is a series of gestures on the touch-sensitive surface of the electronic device that are used to authenticate a user of the device. In some embodiments, a restricted application launch icon looks the same as the corresponding application launch icon that is displayed when the device is in an unlocked state. In some embodiments, to indicate that the corresponding application will open in a restricted session, a restricted application launch icon has a distinct appearance from the corresponding application launch icon that is displayed when the device is in an unlocked state. In some embodiments, the restricted application launch icons include a restricted camera application launch icon that corresponds to a camera application configured to take still and/or video images. In some embodiments, the camera application can be launched in a restricted session via a hardware button on the device, such as a shutter button, in addition to or in place of launching the camera application via a restricted camera application launch icon.

For example, FIGS. 5A and 5C shows locked device interface 500-A displayed on touch screen 112. Locked device interface 500-A includes icons 506 corresponding to respective applications to be launched in respective restricted sessions.

The device detects user input to activate a respective restricted application launch icon (706). In some embodiments, the input is a gesture, such as a tap gesture or a drag gesture, on the respective restricted application launch icon. For example, in FIG. 5C, a respective gesture 510 is detected on a respective icon 506. In some embodiments, the input includes interaction with another icon (e.g., movement of slider object 502 in FIG. 5C) while the respective restricted application launch icon is highlighted or otherwise visually distinguished from the other restricted application launch icons in the plurality of restricted application launch icons.

In response to detecting the user input to activate the respective restricted application launch icon (708), the device starts a restricted session for a respective application that corresponds to the respective restricted application launch icon (710). The respective application is configured to generate one or more content items while in the restricted session. For example, in response to detection of gesture 510-A on icon 506-A, new note entry user interface 511 of notes application 153 is displayed, as shown in FIG. 5D.

Also in response to detecting the user input to activate the respective restricted application launch icon (708), the device maintains the device in the locked, passcode-protected state for applications in the device other than the respective application (712). Note that activating the respective application in the restricted session includes bypassing input of the passcode. Thus, the device maintains the locked, passcode-protected state for other applications in the device besides the respective application. For example, when new note entry user interface 511 of notes application 153 is displayed, as in FIG. 5D, device 100 is locked with respect to applications other than notes application 153.

In some embodiments, while the respective application is in the restricted session (714), the respective application is enabled to present one or more content items generated by the respective application while in the restricted session (716), and the respective application is disabled from presenting any content items in the respective application that were not generated while in the restricted session (718). In some embodiments, one of the criteria described below in method 800 is used to determine the conditions in which the respective application is disabled from presenting content items generated by the respective application. For brevity, those criteria are not repeated here.

In some embodiments, the plurality of restricted application launch icons include one or more of a restricted note taking application launch icon, a restricted calendar application launch icon, a restricted contact list application launch icon, and a restricted voice recorder application launch icon (720). For example, in FIG. 5C, icons 506 include icon 506-A corresponding to notes application 153, icon 506-B corresponding to contacts application 137, icon 506-C corresponding to calendar application 148, and icon 506-D corresponding to voice/audio recorder application 163. Also included is icon 506-E corresponding to camera application 143.

In some embodiments, the respective restricted application launch icon is a restricted note taking application launch icon, the respective application is a note taking application, and the note taking application is configured to generate notes while in the restricted session (722). For example, icon 506-A corresponds to notes application 153, and notes application 153 is configured to generate notes in the restricted session (e.g., in response to user inputs received in new note entry user interface 511).

In some embodiments, while the note taking application is in the restricted session (724), the note taking application is enabled to display one or more notes generated by the note taking application while in the restricted session (726), and the note taking application is disabled from displaying any notes in the note taking application that were not generated while in the restricted session (728). In some embodiments, one of the criteria described below in method 800 is used to determine the conditions in which the note taking application is disabled from presenting notes generated by the note taking application. For brevity, those criteria are not repeated here.

In some embodiments, the respective restricted application launch icon is a restricted calendar application launch icon, the respective application is a calendar application, and the calendar application is configured to generate calendar events while in the restricted session (730). For example, icon 506-C corresponds to calendar application 148, and calendar application 148 is configured to generate calendar events in the restricted session (e.g., in response to user inputs received in new calendar event user interface 546).

While the calendar application is in the restricted session (732), the calendar application is enabled to display one or more calendar events generated by the calendar application while in the restricted session (734), and the calendar application is disabled from displaying any calendar events in the calendar application that were not generated while in the restricted session (736). In some embodiments, one of the criteria described below in method 800 is used to determine the conditions in which the calendar application is disabled from presenting calendar events generated by the calendar application. For brevity, those criteria are not repeated here.

In some embodiments, the respective restricted application launch icon is a restricted contact list application launch icon, the respective application is a contact list application, and the contact list application is configured to generate new contact list entries while in the restricted session (738). For example, icon 506-B corresponds to contacts application 137, and contacts application 137 is configured to generate contact entries in the restricted session (e.g., in response to user inputs received in new contact entry user interface 534).

In some embodiments, while the contact list application is in the restricted session (740), the contact list application is enabled to display one or more contact list entries generated by the contact list application while in the restricted session (742), and the contact list application is disabled from displaying any contact list entries in the contact list application that were not generated while in the restricted session (744). In some embodiments, one of the criteria described below in method 800 is used to determine the conditions in which the contacts application is disabled from presenting contact entries generated by the contacts application. For brevity, those criteria are not repeated here.

In some embodiments, the respective restricted application launch icon is a restricted voice recorder application launch icon, the respective application is a voice recorder application, and the voice recorder application is configured to generate voice recordings while in the restricted session (746). For example, icon 506-D corresponds to voice/audio recorder application 163, and voice/audio recorder application 163 is configured to generate voice recordings in the restricted session (e.g., in response to user inputs received in new voice recording user interface 558).

In some embodiments, while the voice recorder application is in the restricted session (748), the voice recorder application is enabled to play one or more voice recordings generated by the voice recorder application while in the restricted session (750), and the voice recorder application is disabled from playing any voice recordings in the voice recorder application that were not generated while in the restricted session (752). In some embodiments, one of the criteria described below in method 800 is used to determine the conditions in which the voice recorder application is disabled from presenting voice recordings generated by the voice recorder application. For brevity, those criteria are not repeated here.

In some embodiments, the plurality of restricted application launch icons is user configurable (754). In some embodiments, a user can select (e.g., via a settings menu or other interface reconfiguration process) which applications can be launched in a restricted session via a corresponding restricted application launch icon on the lock screen user interface. Thus, a user can customize the lock screen user interface to show restricted application launch icons for applications that the user wants quick access to, without displaying additional icons for other applications. For example, a user may specify which applications can be launched in a restricted session on device 100, and thus specify which icons 506 are displayed on locked device interface 500-A.

Additionally, it should be noted that details of other processes described herein with respect to methods 800 and 900 (e.g., FIGS. 8 and 9 respectively) are also applicable in an analogous manner to method 700 described above with respect to FIGS. 7A-7C. For example, the respective applications described above with reference to method 700 may have one or more of the characteristics of the respective applications described herein with reference to method 800 or the camera application described herein with reference to method 900. For brevity, these details are not repeated here.

FIG. 8 is a flow diagram illustrating a method 800 of presenting content generated in a restricted application session in accordance with some embodiments. The method 800 is performed at an electronic device (e.g., device 300, FIG. 3, or portable multifunction device 100, FIG. 1) with a display, a touch-sensitive surface, and a plurality of applications. In some embodiments, the display is a touch screen display and the touch-sensitive surface is on the display. In some embodiments, the display is separate from the touch-sensitive surface. Some operations in method 800 may be combined and/or the order of some operations may be changed.

As described below, the method 800 provides security to content on a locked device. When access to an application in a restricted session is allowed on a locked device, which bypasses password protection, there is a risk that device content may be exposed to unauthorized users. This method reduces such risk by restricting the content that an application may present based on predefined restricted session access criteria.

The device starts a restricted session for a first application while maintaining the device in a locked, passcode-protected state for applications in the device other than the respective application (802). Exemplary applications that may be opened in a restricted session include a note taking application, a calendar application, a contact list application, a voice recorder application and a camera application, as described above in method 700. For example, in response to detection of gesture 510-E on icon 506-E, camera interface 568 of camera application 143 is displayed, as shown in FIG. 5L; camera application 143 is started in a restricted session.

While the first application is in the restricted session (804), the device generates (e.g., creates, captures) one or more content items in the first application (806) (e.g., generating notes in notes application 153, generating calendar entries in calendar application 148, generating contact entries in contacts application 137, generating voice recordings in voice recordings application 163, or capturing images or videos in camera application 143 in response to user inputs).

The device receives a request to present one or more content items in the first application (808) (e.g., detecting a gesture on icon 518 in FIG. 5D to display notes 530, detecting a gesture on icon 538 in FIG. 5F to display contacts 542, detecting a gesture on icon 538 in FIG. 5H to display calendar events, detecting a gesture on icon 562 in FIG. 5J to display voice recordings, or detecting a gesture on icon 588 to display image thumbnails).

In response to receiving the request to present one or more content items in the first application (810), the device presents content items or representations thereof (e.g., thumbnail images or other icons representing content items) that meet restricted session access criteria for the first application (812), and does not present content items or representations thereof that fail to meet the restricted session access criteria for the first application (814). For example, in FIG. 5N, thumbnails 592 that are displayed correspond to images that meet the restricted session access criteria (e.g., captured in a restricted session), and thumbnails corresponding to images that fail to meet these criteria are excluded from display.

In some embodiments, the restricted session access criteria include that, to be presented, a content item or representation thereof was created during the restricted session for the first application (816). For example, as described above with respect to FIG. 6, a criterion may be that a content item is generated during the current restricted session. Under this criterion, in timeline 602, images 601-A thru 601-C are inaccessible at current time 610.

In some embodiments, the restricted session access criteria include that, to be presented, a content item or representation thereof was created within a predefined time of a current time (818) (e.g., within 10 minutes, 1 hour, or 1 day of the current time, independent of whether the content item was created during the restricted session for the first application, during a prior restricted session, or while the device was unlocked and the first application was operated in a normal (unrestricted) session). For example, as described above with respect to FIG. 6, if the criterion is that the content item be generated within a predefined amount of time 612 from the current time 610 without regard to whether the item was generated in a restricted session or not, in timeline 602 images 601-A and 601-B are inaccessible at current time 610 but images 601-C and 61-D are accessible at current time 610.

In some embodiments, the restricted session access criteria include that, to be presented, a content item or representation thereof was created during the restricted session for the first application and within a predefined time of a current time (820). For example, as described above with respect to FIG. 6, if the criterion is that the content item be generated within a predefined amount of time 612 from the current time 610 and be generated in the current restricted session, in timeline 602 images 601-A thru 601-C are inaccessible at current time 610 and image 601-D is accessible at current time 610.

In some embodiments, the restricted session access criteria include that, to be presented, a content item or representation thereof was created during the restricted session for the first application and a current time period of inactivity for the first application in the restricted session is less than a predefined threshold (822) (e.g., 5, 8, 10, or 15 minutes or any reasonable time period). For example, after 8 minutes of inactivity, images taken with the camera application during a restricted session can no longer be viewed in the restricted session. The user needs to unlock the device to view these images, as well as the other images previously stored on the device. Under this criterion, in timeline 618 in FIG. 6, if period of inactivity 624 is longer than the threshold, image 601-D is inaccessible at current time 622.

In some embodiments, the device deactivates the first application in the restricted session and returns the entire device to the locked, passcode-protected state when one or more deactivation conditions are met, such as detecting activation of a hardware or software button (e.g., a quit, done, or power-off button, home/menu button 204, push button 206) or detecting a time period of inactivity for the first application in the restricted session that is greater than a predefined threshold (e.g., 5, 8, 10, or 15 minutes or any reasonable time period).

Additionally, it should be noted that details of other processes described herein with respect to methods 700 and 900 (e.g., FIGS. 7A-7C and 9 respectively) are also applicable in an analogous manner to method 800 described above with respect to FIG. 8. For example, the respective applications described above with reference to method 800 may have one or more of the characteristics of the respective applications described herein with reference to method 700 or the camera application described herein with reference to method 900. For brevity, these details are not repeated here.

FIG. 9 is a flow diagram illustrating a method 900 of launching a camera application in accordance with some embodiments. The method 900 is performed at an electronic device (e.g., device 300, FIG. 3, or portable multifunction device 100, FIG. 1) with a display, a touch-sensitive surface, one or more processors, random access memory, and a camera. In some embodiments, the display is a touch screen display and the touch-sensitive surface is on the display. In some embodiments, the display is separate from the touch-sensitive surface. Some operations in method 900 may be combined and/or the order of some operations may be changed.

As described below, the method 900 provides a faster way to launch a camera application. By performing the various operations involved in the launching of the camera application concurrently, there is less delay between the user input to launch the camera application and the camera application being actually ready for use.

The device detects an input to launch a camera application that controls the camera (902) (e.g., an application configured to take still images and/or video images with the camera hardware). In some embodiments, the device detects a gesture at a location on the touch-sensitive surface that corresponds to a launch icon for the camera application. In some embodiments, the device detects activation of a hardware button associated with the camera application, such as a shutter button. For example, a gesture may be detected on the icon corresponding to camera application 143 (FIG. 4A). As another example, in FIG. 5C, gesture 510-E is detected on icon 506-E corresponding to camera application 143.

In response to detecting the input to launch the camera application, the device concurrently (904) (e.g., via a dual-core or multi-core processor) loads instructions for controlling a user interface for the camera application in the random access memory (906), allocates a portion of the random access memory to instructions for a digital image pipeline (908), and initializes (e.g., powers up) one or more hardware components in the camera (910). For example, in response to the input to launch the camera application, the device loads instructions in camera module 143 for controlling the camera application user interface into the random access memory portions of memory 102, allocates a portion of random access memory to digital image pipeline 161, and powers up camera hardware components such as optical sensor(s) 164 and optical sensor(s) controller 158.

In some embodiments, initializing one or more hardware components in the camera includes initializing an image capture sensor (e.g., a CMOS or CCD image sensor chip) and an image signal processor (912). For example, initializing the hardware components includes initializing optical sensor(s) 164 and optical sensor(s) controller 158 (FIG. 1A).

When loading instructions for controlling the user interface, allocating the portion of the random access memory, and initializing one or more hardware components are complete, the device displays a live image preview in the user interface for the camera application on the display (918). The live image preview is typically displayed as soon as the last of these concurrent processes is complete. For example, when the above-described concurrent loading, allocating, and initializing are complete, live image preview 577 is displayed in viewfinder area 570, as in FIG. 5L.

In some embodiments, in response to detecting the input to launch the camera application, the device concurrently loads data corresponding to a camera roll for the camera application in the random access memory, the camera roll including images taken previously with the camera application (914); and when loading instructions for controlling the user interface, loading data corresponding to the camera roll, allocating the portion of the random access memory, and initializing one or more hardware components are complete, the device displays a live image preview in the user interface for the camera application on the display (920). In other words, the concurrent procedures described above (906, 908, 910) further include concurrent loading of data corresponding to a camera roll (e.g., camera roll 159) for the camera application in the random access memory. When procedures 906, 908, 910, and 914 are all complete, live image preview 577 is displayed in viewfinder area 570, as in FIG. 5L.

In some embodiments, the loading of data corresponding to the camera roll is performed in the background (916).

In some embodiments, the electronic device is a portable electronic device configured to operate a plurality of applications including the camera application and a phone application (922). For example, device 100 (FIG. 1A) includes multiple applications including camera application 143 and telephone application 138.

It should be noted that details of other processes described herein with respect to methods 700 and 800 (e.g., FIGS. 7A-7C and 8 respectively) are also applicable in an analogous manner to method 900 described above with respect to FIG. 9. For example, the camera application described above with reference to method 900 may have one or more of the characteristics of the respective applications described herein with reference to method 700 or 800. For brevity, these details are not repeated here.

Figure 10:
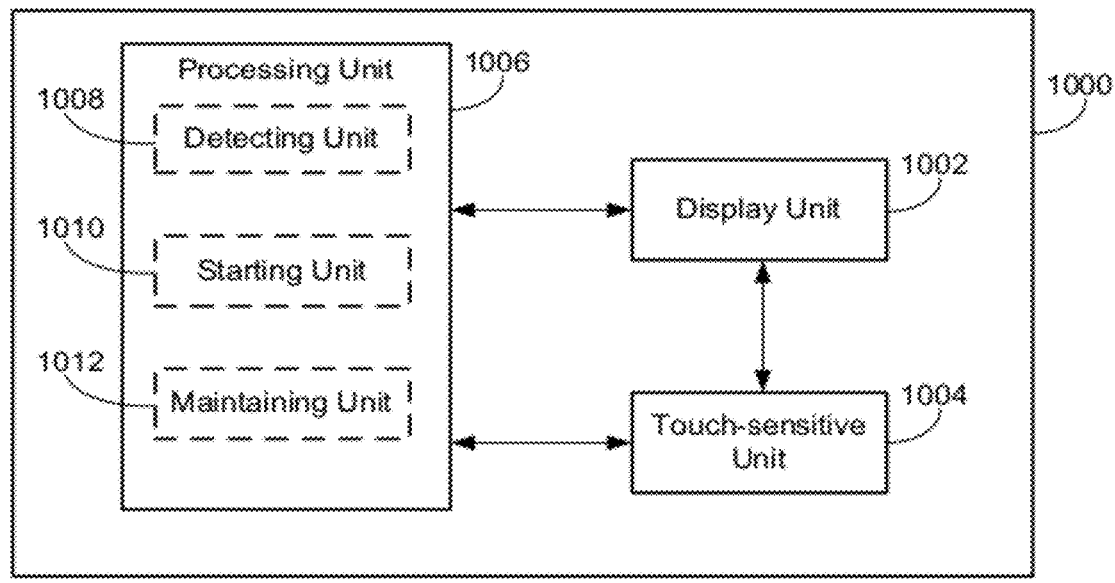
FIG. 10 is a functional block diagram of an electronic device in accordance with some embodiments.

In accordance with some embodiments, FIG. 10 shows a functional block diagram of an electronic device 1000 configured in accordance with the principles of the invention as described above. The functional blocks of the device may be implemented by hardware, software, or a combination of hardware and software to carry out the principles of the invention. It is understood by persons of skill in the art that the functional blocks described in FIG. 10 may be combined or separated into sub-blocks to implement the principles of the invention as described above. Therefore, the description herein may support any possible combination or separation or further definition of the functional blocks described herein.

As shown in FIG. 10, an electronic device 1000 includes a display unit 1002 configured to display a lock screen user interface on the display unit 1002 while the electronic device is in a locked, passcode-protected state, the lock screen user interface including a plurality of restricted application launch icons, each restricted application launch icon corresponding to an application; a touch-sensitive surface unit 1004 configured to receive user inputs; and a processing unit 1006 coupled to the display unit 1002 and the touch-sensitive surface unit 1004. In some embodiments, the processing unit 1006 includes a detecting unit 1008, a starting unit 1010, and a maintaining unit 1012.

The processing unit 1006 is configured to: while the electronic device is in a locked, passcode-protected state: detect user input to activate a respective restricted application launch icon (e.g., with the detecting unit 1008); and, in response to detecting the user input to activate the respective restricted application launch icon: start a restricted session for a respective application that corresponds to the respective restricted application launch icon, wherein the respective application is configured to generate one or more content items while in the restricted session (e.g., with the starting unit 1010); and maintain the device in the locked, passcode-protected state for applications in the device other than the respective application (e.g., with the maintaining unit 1012).

In some embodiments, while the respective application is in the restricted session: the respective application is enabled to present one or more content items generated by the respective application while in the restricted session; and the respective application is disabled from presenting any content items in the respective application that were not generated while in the restricted session.

In some embodiments, the plurality of restricted application launch icons include one or more of a restricted note taking application launch icon, a restricted calendar application launch icon, a restricted contact list application launch icon, and a restricted voice recorder application launch icon.

In some embodiments, the respective restricted application launch icon is a restricted note taking application launch icon, the respective application is a note taking application, and the note taking application is configured to generate notes while in the restricted session.

In some embodiments, while the note taking application is in the restricted session: the note taking application is enabled to display one or more notes generated by the note taking application while in the restricted session; and the note taking application is disabled from displaying any notes in the note taking application that were not generated while in the restricted session.

In some embodiments, the respective restricted application launch icon is a restricted calendar application launch icon, the respective application is a calendar application, and the calendar application is configured to generate calendar events while in the restricted session.

In some embodiments, while the calendar application is in the restricted session: the calendar application is enabled to display one or more calendar events generated by the calendar application while in the restricted session; and the calendar application is disabled from displaying any calendar events in the calendar application that were not generated while in the restricted session.

In some embodiments, the respective restricted application launch icon is a restricted contact list application launch icon, the respective application is a contact list application, and the contact list application is configured to generate new contact list entries while in the restricted session.

In some embodiments, while the contact list application is in the restricted session: the contact list application is enabled to display one or more contact list entries generated by the contact list application while in the restricted session; and the contact list application is disabled from displaying any contact list entries in the contact list application that were not generated while in the restricted session.

In some embodiments, the respective restricted application launch icon is a restricted voice recorder application launch icon, the respective application is a voice recorder application, and the voice recorder application is configured to generate voice recordings while in the restricted session.

In some embodiments, while the voice recorder application is in the restricted session: the voice recorder application is enabled to play one or more voice recordings generated by the voice recorder application while in the restricted session; and the voice recorder application is disabled from playing any voice recordings in the voice recorder application that were not generated while in the restricted session.

In some embodiments, the plurality of restricted application launch icons is user configurable.

Figure 11:
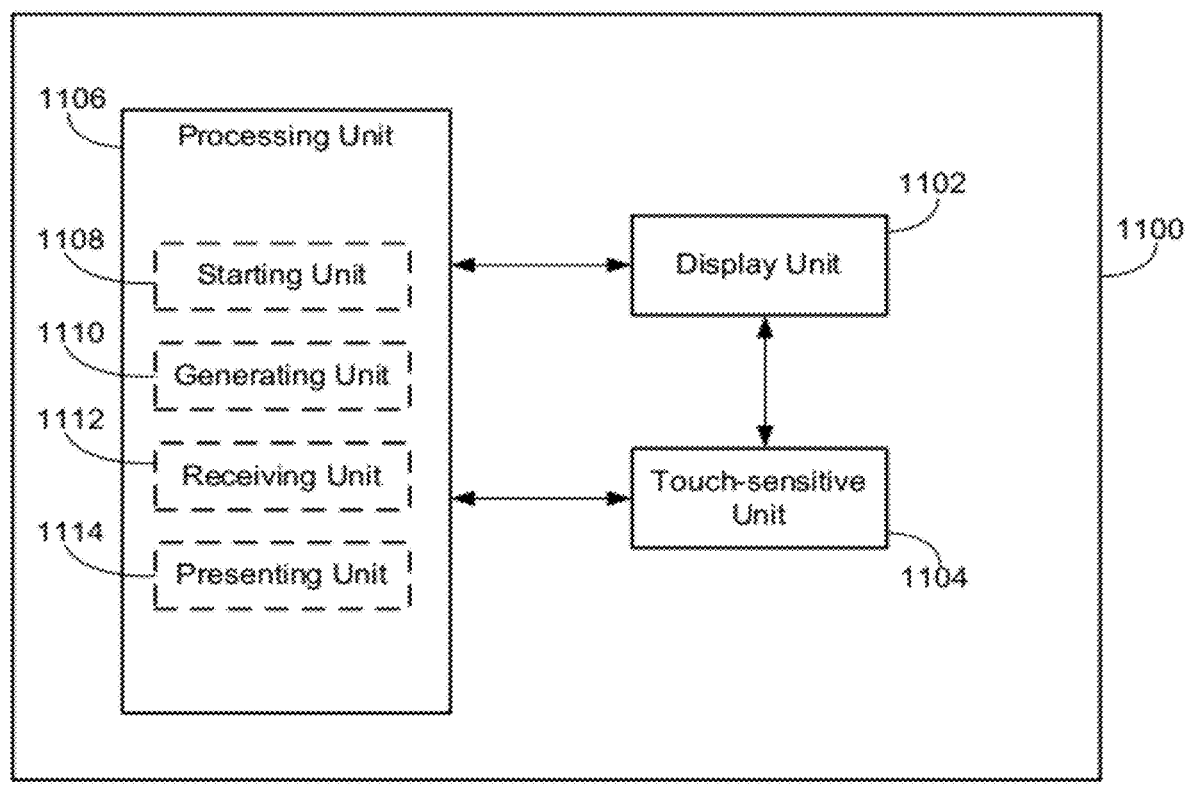
FIG. 11 is a functional block diagram of an electronic device in accordance with some embodiments.

In accordance with some embodiments, FIG. 11 shows a functional block diagram of an electronic device 1100 configured in accordance with the principles of the invention as described above. The functional blocks of the device may be implemented by hardware, software, or a combination of hardware and software to carry out the principles of the invention. It is understood by persons of skill in the art that the functional blocks described in FIG. 11 may be combined or separated into sub-blocks to implement the principles of the invention as described above. Therefore, the description herein may support any possible combination or separation or further definition of the functional blocks described herein.

As shown in FIG. 11, an electronic device 1100 includes a display unit 1102; a touch-sensitive surface unit 1104 configured to receive requests; and a processing unit 1106 coupled to the display unit 1102 and the touch-sensitive unit. In some embodiments, the processing unit 1106 includes a starting unit 1108, a generating unit 1110, a receiving unit 1112, and a presenting unit 1114.

The processing unit 1106 is configured to: start a restricted session for a first application while maintaining the device in a locked, passcode-protected state for applications in the device other than the first application (e.g., with the starting unit 1108); while the first application is in the restricted session: generate one or more content items in the first application (e.g., with the generating unit 1110); receive a request to present one or more content items in the first application (e.g., with the receiving unit 1112); and, in response to receiving the request to present one or more content items in the first application: present content items or representations thereof that meet restricted session access criteria for the first application (e.g., with the presenting unit 1114); and not present content items or representations thereof that fail to meet the restricted session access criteria for the first application.

In some embodiments, the restricted session access criteria include that, to be presented, a content item or representation thereof was created during the restricted session for the first application.

In some embodiments, the restricted session access criteria include that, to be presented, a content item or representation thereof was created within a predefined time of a current time.

In some embodiments, the restricted session access criteria include that, to be presented, a content item or representation thereof was created during the restricted session for the first application and within a predefined time of a current time.

In some embodiments, the restricted session access criteria include that, to be presented, a content item or representation thereof was created during the restricted session for the first application and a current time period of inactivity for the first application in the restricted session is less than a predefined threshold.

Figure 12:
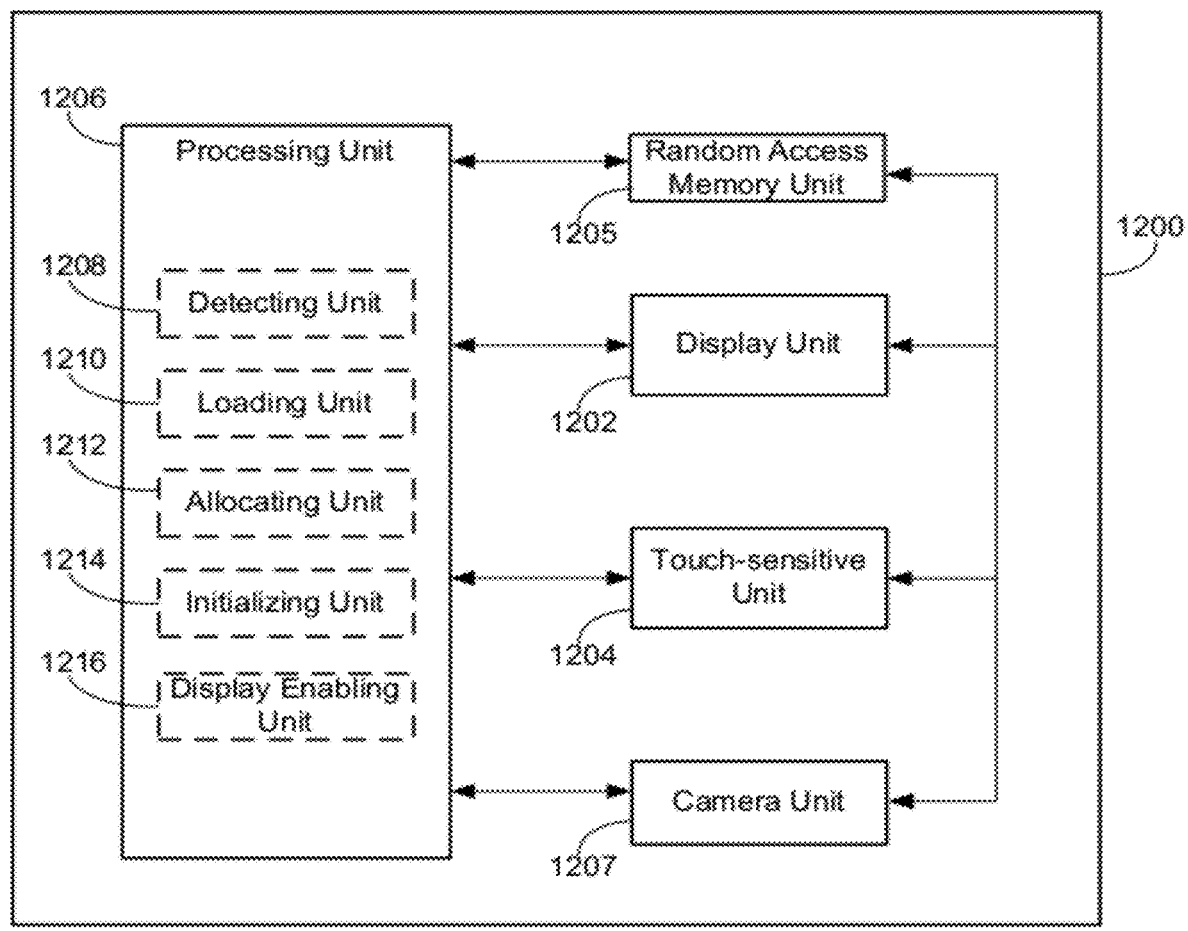
FIG. 12 is a functional block diagram of an electronic device in accordance with some embodiments.

In accordance with some embodiments, FIG. 12 shows a functional block diagram of an electronic device 1200 configured in accordance with the principles of the invention as described above. The functional blocks of the device may be implemented by hardware, software, or a combination of hardware and software to carry out the principles of the invention. It is understood by persons of skill in the art that the functional blocks described in FIG. 12 may be combined or separated into sub-blocks to implement the principles of the invention as described above. Therefore, the description herein may support any possible combination or separation or further definition of the functional blocks described herein.

As shown in FIG. 12, an electronic device 1200 includes a display unit 1202; a touch-sensitive surface unit 1204 configured to receive inputs; a random access memory unit 1205; a camera unit 1207; and a processing unit 1206 coupled to the display unit 1202 and the touch-sensitive surface unit 1204 and the random access memory unit 1205 and a camera unit 1207. In some embodiments, the processing unit 1206 includes a detecting unit 1208, a loading unit 1210, an allocating unit 1212, an initializing unit 1214, and a display enabling unit 1216.

The processing unit 1206 is configured to: detect an input to launch a camera application that controls the camera unit 1207 (e.g., with the detecting unit 1208); in response to detecting the input to launch the camera application, concurrently: load instructions for controlling a user interface for the camera application in the random access memory unit 1205 (e.g., with the loading unit 1210); allocate a portion of the random access memory unit 1205 to instructions for a digital image pipeline (e.g., with the allocating unit 1212); and initialize one or more hardware components in the camera unit 1207 (e.g., with the initializing unit 1214); and when loading instructions for controlling the user interface, allocating the portion of the random access memory unit 1205, and initializing one or more hardware components are complete, enable display of a live image preview in the user interface for the camera application on the display unit 1202 (e.g., with the display enabling unit 1216).

In some embodiments, initializing one or more hardware components in the camera unit 1207 includes initializing an image capture sensor and an image signal processor.

In some embodiments, the processing unit 1206 is configured to: in response to detecting the input to launch the camera application, concurrently load data corresponding to a camera roll for the camera application in the random access memory unit 1205, the camera roll including images taken previously with the camera application (e.g., with the loading unit 1210); and when loading instructions for controlling the user interface, loading data corresponding to the camera roll, allocating the portion of the random access memory unit 1205, and initializing one or more hardware components are complete, displaying a live image preview in the user interface for the camera application on the display unit 1202 (e.g., with the display enabling unit 1216).

In some embodiments, the loading of data corresponding to the camera roll is performed in the background.

In some embodiments, the electronic device is a portable electronic device configured to operate a plurality of applications including the camera application and a phone application.

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A and 3) are all included within the scope of protection of the invention.

The operations described above with reference to FIGS. 7A-7C, 8, 9 may be implemented by components depicted in FIGS. 1A-1B. For example, with reference to FIGS. 7A-7C, detection operation 706, starting operation 710, and maintaining operation 712 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
while an electronic device with a display and a touch-sensitive surface is in a locked, passcode-protected state:
displaying a lock screen user interface on the display, the lock screen user interface including a restricted application launch icon corresponding to a respective application;
detecting user input to activate the restricted application launch icon; and,
in response to detecting the user input to activate the restricted application launch icon:
starting a restricted session for the respective application that corresponds to the restricted application launch icon; and
maintaining the device in the locked, passcode-protected state for applications in the device other than the respective application;
while the respective application is in the restricted session:
generating and storing a first content item in the respective application;
receiving a request to present stored content items in the respective application, wherein the stored content items include the first content item, one or more second content items generated during the restricted session, and one or more third content items not generated during the restricted session; and
in response to receiving the request to present stored content items in the respective application:
presenting the first content item and one or more second content items or representations thereof that meet restricted session access criteria for the respective application, wherein the restricted session access criteria include that, to be presented in the restricted session, a respective content item in the stored content items be generated during the restricted session; and
not presenting the one or more third content items or representations thereof that fail to meet the restricted session access criteria for the respective application.

2. The method of claim 1, wherein the restricted application launch icon is a restricted note taking application launch icon, a restricted calendar application launch icon, a restricted contact list application launch icon, or a restricted voice recorder application launch icon.

3. The method of claim 1, wherein the restricted application launch icon is a restricted note taking application launch icon, the respective application is a note taking application, and the note taking application is configured to generate notes while in the restricted session.

4. The method of claim 3, wherein, while the note taking application is in the restricted session:
the note taking application is enabled to display one or more notes generated by the note taking application while in the restricted session; and
the note taking application is disabled from displaying any notes in the note taking application that were not generated while in the restricted session.

5. The method of claim 1, wherein the restricted application launch icon is a restricted calendar application launch icon, the respective application is a calendar application, and the calendar application is configured to generate calendar events while in the restricted session.

6. The method of claim 5, wherein, while the calendar application is in the restricted session:
the calendar application is enabled to display one or more calendar events generated by the calendar application while in the restricted session; and
the calendar application is disabled from displaying any calendar events in the calendar application that were not generated while in the restricted session.

7. The method of claim 1, wherein the restricted application launch icon is a restricted contact list application launch icon, the respective application is a contact list application, and the contact list application is configured to generate new contact list entries while in the restricted session.

8. The method of claim 7, wherein, while the contact list application is in the restricted session:
the contact list application is enabled to display one or more contact list entries generated by the contact list application while in the restricted session; and
the contact list application is disabled from displaying any contact list entries in the contact list application that were not generated while in the restricted session.

9. The method of claim 1, wherein the restricted application launch icon is a restricted voice recorder application launch icon, the respective application is a voice recorder application, and the voice recorder application is configured to generate voice recordings while in the restricted session.

10. The method of claim 9, wherein, while the voice recorder application is in the restricted session:
the voice recorder application is enabled to play one or more voice recordings generated by the voice recorder application while in the restricted session; and
the voice recorder application is disabled from playing any voice recordings in the voice recorder application that were not generated while in the restricted session.

11. The method of claim 1, wherein the restricted application launch icon is user configurable.

12. A method, comprising:
at an electronic device with a display, a touch-sensitive surface, and a plurality of applications:
starting a restricted session for a first application while maintaining the device in a locked, passcode-protected state for applications in the device other than the first application;
while the first application is in the restricted session:
generating and storing a first content item in the first application;
receiving a request to present stored content items in the first application, wherein the stored content items include the first content item, one or more second content items generated during the restricted session, and one or more third content items not generated during the restricted session; and,
in response to receiving the request to present stored content items in the first application:
presenting the first content item and one or more second content items or representations thereof that meet restricted session access criteria for the first application, wherein the restricted session access criteria include that, to be presented in the restricted session, a respective content item in the stored content items be generated during the restricted session; and
not presenting the one or more third content items or representations thereof that fail to meet the restricted session access criteria for the first application.

13. The method of claim 12, wherein the restricted session access criteria include that, to be presented in the restricted session, a respective content item in the stored content items be generated during the restricted session for the first application and within a predefined time of a current time.

14. The method of claim 12, wherein the restricted session access criteria include that, to be presented in the restricted session, a respective content item in the stored content items be generated during the restricted session for the first application and a current time period of inactivity for the first application in the restricted session is less than a predefined threshold.

15. An electronic device, comprising:
a display;
a touch-sensitive surface; one or more processors; memory; and
one or more programs, wherein the one or more programs are stored in the memory and configured to be executed by the one or more processors, the one or more programs including instructions for:
while the electronic device is in a locked, passcode-protected state:
displaying a lock screen user interface on the display, the lock screen user interface including a restricted application launch icon corresponding to a respective application;
detecting user input to activate the restricted application launch icon; and,
in response to detecting the user input to activate the restricted application launch icon:
starting a restricted session for the respective application that corresponds to the restricted application launch icon; and
maintaining the device in the locked, passcode-protected state for applications in the device other than the respective application;
while the respective application is in the restricted session:
generating and storing a first content item in the respective application;
receiving a request to present stored content items in the respective application, wherein the stored content items include the first content item, one or more second content items generated during the restricted session, and one or more third content items not generated during the restricted session; and
in response to receiving the request to present stored content items in the respective application:
presenting the first content item and one or more second content items or representations thereof that meet restricted session access criteria for the respective application, wherein the restricted session access criteria include that, to be presented in the restricted session, a respective content item in the stored content items be generated during the restricted session; and
not presenting the one or more third content items or representations thereof that fail to meet the restricted session access criteria for the respective application.

16. The electronic device of claim 15, wherein the restricted application launch icon is a restricted note taking application launch icon, a restricted calendar application launch icon, a restricted contact list application launch icon, or a restricted voice recorder application launch icon.

17. The electronic device of claim 15, wherein the restricted application launch icon is a restricted note taking application launch icon, the respective application is a note taking application, and the note taking application is configured to generate notes while in the restricted session.

18. The electronic device of claim 17, wherein, while the note taking application is in the restricted session:
the note taking application is enabled to display one or more notes generated by the note taking application while in the restricted session; and
the note taking application is disabled from displaying any notes in the note taking application that were not generated while in the restricted session.

19. The electronic device of claim 15, wherein the restricted application launch icon is a restricted calendar application launch icon, the respective application is a calendar application, and the calendar application is configured to generate calendar events while in the restricted session.

20. The electronic device of claim 19, wherein, while the calendar application is in the restricted session:
the calendar application is enabled to display one or more calendar events generated by the calendar application while in the restricted session; and
the calendar application is disabled from displaying any calendar events in the calendar application that were not generated while in the restricted session.

21. The electronic device of claim 15, wherein the restricted application launch icon is a restricted contact list application launch icon, the respective application is a contact list application, and the contact list application is configured to generate new contact list entries while in the restricted session.

22. The electronic device of claim 21, wherein, while the contact list application is in the restricted session:
the contact list application is enabled to display one or more contact list entries generated by the contact list application while in the restricted session; and
the contact list application is disabled from displaying any contact list entries in the contact list application that were not generated while in the restricted session.

23. The electronic device of claim 15, wherein the restricted application launch icon is a restricted voice recorder application launch icon, the respective application is a voice recorder application, and the voice recorder application is configured to generate voice recordings while in the restricted session.

24. The electronic device of claim 23, wherein, while the voice recorder application is in the restricted session:
the voice recorder application is enabled to play one or more voice recordings generated by the voice recorder application while in the restricted session; and
the voice recorder application is disabled from playing any voice recordings in the voice recorder application that were not generated while in the restricted session.

25. The electronic device of claim 15, wherein the restricted application launch icon is user configurable.

26. A non-transitory computer readable storage medium storing one or more programs, the one or more programs comprising instructions, which when executed by an electronic device with a display and a touch-sensitive surface, cause the device to:
while the electronic device is in a locked, passcode-protected state:
display a lock screen user interface on the display, the lock screen user interface including a restricted application launch icon corresponding to a respective application;
detect user input to activate the restricted application launch icon; and,
in response to detecting the user input to activate the restricted application launch icon:
start a restricted session for the respective application that corresponds to the restricted application launch icon; and
maintain the device in the locked, passcode-protected state for applications in the device other than the respective application;
while the respective application is in the restricted session:
generate and store a first content item in the respective application;
receive a request to present stored content items in the respective application, wherein the stored content items include the first content item, one or more second content items generated during the restricted session, and one or more third content items not generated during the restricted session; and
in response to receiving the request to present stored content items in the respective application:
present the first content item and one or more second content items or representations thereof that meet restricted session access criteria for the respective application, wherein the restricted session access criteria include that, to be presented in the restricted session, a respective content item in the stored content items be generated during the restricted session; and
not present the one or more third content items or representations thereof that fail to meet the restricted session access criteria for the respective application.

27. The non-transitory computer readable storage medium of claim 26, wherein the restricted application launch icon is a restricted note taking application launch icon, a restricted calendar application launch icon, a restricted contact list application launch icon, or a restricted voice recorder application launch icon.

28. The non-transitory computer readable storage medium of claim 26, wherein the restricted application launch icon is a restricted note taking application launch icon, the respective application is a note taking application, and the note taking application is configured to generate notes while in the restricted session.

29. The non-transitory computer readable storage medium of claim 28, wherein, while the note taking application is in the restricted session:
the note taking application is enabled to display one or more notes generated by the note taking application while in the restricted session; and
the note taking application is disabled from displaying any notes in the note taking application that were not generated while in the restricted session.

30. The non-transitory computer readable storage medium of claim 26, wherein the restricted application launch icon is a restricted calendar application launch icon, the respective application is a calendar application, and the calendar application is configured to generate calendar events while in the restricted session.

31. The non-transitory computer readable storage medium of claim 30, wherein, while the calendar application is in the restricted session:
the calendar application is enabled to display one or more calendar events generated by the calendar application while in the restricted session; and
the calendar application is disabled from displaying any calendar events in the calendar application that were not generated while in the restricted session.

32. The non-transitory computer readable storage medium of claim 26, wherein the restricted application launch icon is a restricted contact list application launch icon, the respective application is a contact list application, and the contact list application is configured to generate new contact list entries while in the restricted session.

33. The non-transitory computer readable storage medium of claim 32, wherein, while the contact list application is in the restricted session:
the contact list application is enabled to display one or more contact list entries generated by the contact list application while in the restricted session; and
the contact list application is disabled from displaying any contact list entries in the contact list application that were not generated while in the restricted session.

34. The non-transitory computer readable storage medium of claim 26, wherein the restricted application launch icon is a restricted voice recorder application launch icon, the respective application is a voice recorder application, and the voice recorder application is configured to generate voice recordings while in the restricted session.

35. The non-transitory computer readable storage medium of claim 34, wherein, while the voice recorder application is in the restricted session:
the voice recorder application is enabled to play one or more voice recordings generated by the voice recorder application while in the restricted session; and
the voice recorder application is disabled from playing any voice recordings in the voice recorder application that were not generated while in the restricted session.

36. The non-transitory computer readable storage medium of claim 26, wherein the restricted application launch icon is user configurable.

37. An electronic device, comprising:
a display;
a touch-sensitive surface; one or more processors;
memory;
a plurality of applications; and
one or more programs, wherein the one or more programs are stored in the memory and configured to be executed by the one or more processors, the one or more programs including instructions for:
starting a restricted session for a first application while maintaining the device in a locked, passcode-protected state for applications in the device other than the first application;
while the first application is in the restricted session:
generating and storing a first content item in the first application;
receiving a request to present stored content items in the first application, wherein the stored content items include the first content item, one or more second content items generated during the restricted session, and one or more third content items not generated during the restricted session; and,
in response to receiving the request to present stored content items in the first application:
presenting the first content item and one or more second content items or representations thereof that meet restricted session access criteria for the first application, wherein the restricted session access criteria include that, to be presented in the restricted session, a respective content item in the stored content items be generated during the restricted session; and
not presenting the one or more third content items or representations thereof that fail to meet the restricted session access criteria for the first application.

38. The electronic device of claim 37, wherein the restricted session access criteria include that, to be presented in the restricted session, a respective content item in the stored content items be generated during the restricted session for the first application and within a predefined time of a current time.

39. The electronic device of claim 37, wherein the restricted session access criteria include that, to be presented in the restricted session, a respective content item in the stored content items be generated during the restricted session for the first application and a current time period of inactivity for the first application in the restricted session is less than a predefined threshold.

40. A non-transitory computer readable storage medium storing one or more programs, the one or more programs comprising instructions, which when executed by an electronic device with a display, a touch-sensitive surface, and a plurality of applications, cause the device to:
start a restricted session for a first application while maintaining the device in a locked, passcode-protected state for applications in the device other than the first application;
while the first application is in the restricted session:
generate and store a first content item in the first application;
receive a request to present stored content items in the first application, wherein the stored content items include the first content item, one or more second content items generated during the restricted session, and one or more third content items not generated during the restricted session; and,
in response to receiving the request to present stored content items in the first application:
present the first content item and one or more second content items or representations thereof that meet restricted session access criteria for the first application, wherein the restricted session access criteria include that, to be presented in the restricted session, a respective content item in the stored content items be generated during the restricted session; and
not present the one or more third content items or representations thereof that fail to meet the restricted session access criteria for the first application.

41. The non-transitory computer readable storage medium of claim 40, wherein the restricted session access criteria include that, to be presented in the restricted session, a respective content item in the stored content items be generated during the restricted session for the first application and within a predefined time of a current time.

42. The non-transitory computer readable storage medium of claim 40, wherein the restricted session access criteria include that, to be presented in the restricted session, a respective content item in the stored content items be generated during the restricted session for the first application and a current time period of inactivity for the first application in the restricted session is less than a predefined threshold.

* * * * *

UNITED STATES PATENT AND TRADEMARK OFFICE
CERTIFICATE OF CORRECTION

PATENT NO. : 11,165,963 B2  
APPLICATION NO. : 13/243045  
DATED : November 2, 2021  
INVENTOR(S) : Richard R. Dellinger et al.

Page 1 of 1

It is certified that error appears in the above-identified patent and that said Letters Patent is hereby corrected as shown below:

On the Title Page

Item (75), Inventors, after "Richard R. Dellinger, San Jose, CA (US); Nikhil Bhogal, San Francisco, CA (US)" insert -- Greg Christie, San Jose, CA (US); Scott J. Forstall, Los Altos, CA (US) --.

Signed and Sealed this  
First Day of April, 2025

Coke Morgan Stewart  
*Acting Director of the United States Patent and Trademark Office*